(12) United States Patent
Watanabe et al.

(10) Patent No.: US 10,693,636 B2
(45) Date of Patent: Jun. 23, 2020

(54) AUTHENTICATED NETWORK

(71) Applicants: Guigen Xia, Hangzhou (CN); Hiroshi Watanabe, Kanagawa-ken (JP)

(72) Inventors: Hiroshi Watanabe, Kanagawa-ken (JP); Atsuhiro Kinoshita, Kanagawa-ken (JP)

(73) Assignees: Guigen Xia, Hangzhou (CN); Hiroshi Watanabe, Kanagawa-ken (JP)

( * ) Notice: Subject to any disclaimer, the term of this patent is extended or adjusted under 35 U.S.C. 154(b) by 230 days.

(21) Appl. No.: 15/871,178

(22) Filed: Jan. 15, 2018

(65) Prior Publication Data

US 2018/0270058 A1 Sep. 20, 2018

(30) Foreign Application Priority Data

Mar. 17, 2017 (JP) .................................. 2017-053289

(51) Int. Cl.
*H04L 9/08* (2006.01)
*H04L 29/08* (2006.01)
(Continued)

(52) U.S. Cl.
CPC .......... *H04L 9/0861* (2013.01); *G06F 21/602* (2013.01); *G06F 21/73* (2013.01);
(Continued)

(58) Field of Classification Search
CPC ... H04L 9/0861; H04L 9/3297; H04L 69/323; H04L 9/3278; H04L 9/3236;
(Continued)

(56) References Cited

U.S. PATENT DOCUMENTS 9,292,710 B2 3/2016 Kim et al.
9,830,593 B2 * 11/2017 Myers ................ G06Q 20/3678
(Continued)

FOREIGN PATENT DOCUMENTS

JP 2013131868 A 7/2013

OTHER PUBLICATIONS

Min et al., "A Permissioned Blockchain Framework for Supporting Instant Transaction and Dynamic Block Size", 2016, IEEE, pp. 90-96. (Year: 2016).*
(Continued)

*Primary Examiner* — Matthew Smithers
(74) *Attorney, Agent, or Firm* — Alan D. Kamrath; Karin L. Williams; Mayer & Williams PC

(57) ABSTRACT

An authenticated network having a plurality of nodes is disclosed. Each node includes a transaction unit and an identification core. The identification core includes a key generator. The key generators of the identification cores generate a plurality of unique pairs of secret and public keys. The public key serves as a logical address of the transaction unit. Another authenticated network having a plurality of nodes is also disclosed, in which the identification core further includes a private key. The key generators of the identification cores generate a plurality of public keys from the private keys of the identification cores. Each public key serves as a logical address of the transaction unit of a corresponding node. One of the public keys and one of the private keys form a unique pair. Thus, the transaction unit manages the information communication among the plurality of nodes. The identification core manages an authentication of the nodes.

20 Claims, 46 Drawing Sheets

(51) Int. Cl.
*H04L 9/32* (2006.01)
*G06F 21/60* (2013.01)
*G06F 21/73* (2013.01)
*H04L 29/06* (2006.01)

(52) U.S. Cl.
CPC .......... *H04L 9/3236* (2013.01); *H04L 9/3278* (2013.01); *H04L 9/3297* (2013.01); *H04L 69/323* (2013.01); *H04L 69/22* (2013.01); *H04L 2209/38* (2013.01)

(58) Field of Classification Search
CPC ... H04L 2209/38; H04L 69/22; H04L 63/083; H04L 63/06; H04L 9/30; H04L 9/0822; G06F 21/73; G06F 21/602
See application file for complete search history.

(56) References Cited

U.S. PATENT DOCUMENTS

| | | | |
|---|---|---|---|
| 2008/0237506 A1 | 10/2008 | Ophey et al. | |
| 2013/0047209 A1 | 2/2013 | Satoh et al. | |
| 2015/0207627 A1 | 7/2015 | Yamamoto et al. | |
| 2015/0356523 A1* | 12/2015 | Madden | G06Q 20/065 705/76 |
| 2015/0371224 A1* | 12/2015 | Lingappa | G06Q 20/3829 705/71 |
| 2016/0154979 A1 | 6/2016 | Kim et al. | |
| 2017/0046526 A1* | 2/2017 | Chan | G06Q 20/0655 |
| 2017/0316390 A1* | 11/2017 | Smith | G06Q 20/407 |
| 2018/0076957 A1* | 3/2018 | Watanabe | G06Q 20/3829 |
| 2018/0101829 A1* | 4/2018 | Narasimhan | G06Q 20/065 |
| 2018/0234413 A1* | 8/2018 | Watanabe | H04L 9/3239 |
| 2018/0254841 A1* | 9/2018 | Nannra | H04L 69/28 |
| 2018/0268386 A1* | 9/2018 | Wack | G06Q 20/102 |
| 2019/0066228 A1* | 2/2019 | Wright | H04L 9/0844 |
| 2019/0208414 A1* | 7/2019 | Roennow | G06F 16/1824 |
| 2019/0288854 A1* | 9/2019 | Xie | H04L 63/08 |

OTHER PUBLICATIONS

Christidis et al., "Blockchains and Smart Contracts for the Internet of Things", 2016, IEEE, pp. 2292-2303. (Year: 2016).*

Zhang et al., "An IoT Electric Business Model Based on the Protocol of Bitcoin", 2015, IEEE, pp. 184-191. (Year: 2015).*

Fatemeh Tehranipoor, Nima Karimian, Kan Xiao and John Chandy, DRAM based Intrinsic Physical Unclonable Functions for System Level Security, ACM Great Lakes Symposium on VLSI (GLSVLSI), May 20-22, 2015, 6 pages, Association for Computing Machinery (ACM), Philadelphia, PA, USA.

Taher Elgamal, A Public Key Cryptosystem and a Signature Scheme Based on Discrete Logarithms,IEEE Transactions on Information Theory, Jul. 1985, 4 pages, vol. IT-31, No. 4, IEEE, USA.

Author unknown. 'Software that can change the MAC address freely AnalogX AnonyMAC Windows 7 compatible'. In PC Explore: Freesoft and WebService [online]. Mar. 5, 2011. Retrieved from the Internet: <URL:http://pc.mogeringo.com/archives/1826> (This reference shows a software "AnalogX AnonyMAC" and user instruction thereof for freely modifying MAC address. Such software enables counterfeiting of MAC address and may cause problem of network security. ).

R.L.Rivest, A. Shamir, and L. Adleman, A Method for Obtaining Digital Signatures and Pubic-Key Cryptosystems, Communications of the ACM, Feb. 1978, pp. 120-126, vol. 21, Issue 2, ACM, Inc., USA.

* cited by examiner

AUTHENTICATED NETWORK

CROSS REFERENCE TO RELATED APPLICATIONS

The application claims the benefit of Japanese application serial No. 2017-053289, filed on Jun. 27, 2017, and the entire contents of which are incorporated herein by reference.

BACKGROUND OF THE INVENTION

1. Field of the Invention

The present invention is related to the technology to identify the connected devices in the network.

The number of the developing devices connected to the internet is increased as years. The configuration of the network has become complicated and diversified. However, it may be roughly classified into Client-Server (CS) type where the servers having a specialized function take a role of central nodes (stem nodes) and Peer-to-Peer (P2P) type where all nodes are connected on even ground without any stem node. However, both types include at least one smallest network unit, as illustrated in FIG. 1.

Like this, the network may generally comprise nominal points (nodes) and communication lines (link). In FIG. 1, the first node 2001 and the second node 2002 are linked by the signal transmission pathway 1000 serving as a communication line. For example, the first node 2001 and the second node 2002 exchange a protocol data unit via the signal transmission pathway 1000. The first node 2001 and the second node 2002 treat a protocol data unit according to the protocols having a certain extent of consistency.

There are names commonly used for protocol data units, including "frame," "packet," "segment" and so on. These names are used separately regarding the communication hierarchy (communication layer or layer) and defined by the concept of the whole network system. For example, as illustrated in FIG. 2, there are physical layer (layer-1), data link layer (layer-2), network layer (layer-3), transport layer (layer-4), and upper layer (layer-5) from the bottom up. However, this communication configuration is one of the examples and not beyond. Under a different concept, for example, the transport layer may be divided into three layers to form seven layers. Anyway, in general, the protocol data unit is called a frame in the data link layer (layer-2), a packet in the network layer (layer-3), and a segment in the transport layer (layer4).

In general, the information communication via the internet may be to exchange the suitable-sized pieces of divided digital data among nodes serving as information terminals in the network. A loaf of pieces of data attached with control information necessary to the management in the network is called a protocol data unit. The regular arrangement of the pieces of data and the related control information are called a format. The format and its usage are regulated by a kind of procedure called a protocol. Two nodes mutually making information communication must be subject to protocols having a certain extent of consistency.

The illustration may be continued with the configuration of the five layers in FIG. 2 as follows:

A TCP header is attached to this data. The TCP is an abbreviation of transmission control protocol, that is, a kind of protocol. Thus, a data attached with TCP header is called a segment. The communication layer to treat a segment is the transport layer (layer-4).

A segment attached with an internet protocol header (IP header) is a protocol data unit which is called a packet. The communication layer treating a packet is the network layer (layer-3) and the related protocol is the IP. There are several versions such as IPv4 and IPv6, for example.

A packet to be attached with an Ethernet (Trademark) protocol header (Ethernet header) is a protocol data unit which is called a frame. The communication layer treating a frame is the data link layer (layer-2) and the related protocol is the Ethernet.

The Ethernet standard also involves the conversion to the physical layer at the bottom (layer-1), that is, the conversion to an optical signal or an electrical signal. The converted frame is forwarded to a cable such as 10BASE-T and so forth.

The communication hierarchy configures a nesting structure, wherein each layer is independent from the other. More concretely, as illustrated in FIG. 2, the format of the segment in the layer 4 (transport layer), which is a data attached with a TCP header only, involves the format of layer-5 (upper layer), which is just data with no revision. By this way, the TCP header and the original data are not confused irreversibly. In a similar way, the format of the packet of layer-3 (network layer), in which an IP header is attached with only a segment, involves the format of the layer-4 (transport layer) with no revision. By this way, an IP header and a segment are not compounded irreversibly. In addition, the format of a frame of layer-2 (data link layer), in which a packet is attached with an Ethernet header and an FCS, involves the format of layer-3 (network layer), which is a packet with no revision. By this way, an Ethernet header and an FCS are not compounded with a packet irreversibly. Here, FCS is an abbreviation of frame check sequence, which is used for checking if a packet is appropriately received.

According to such a configuration, the upper layers are free from any change in the format or protocol in the lower layers.

For example, in FIG. 2, the original data is not influenced at all by replacing a TCP header with another header in the layer-4 (transport layer). That is, the layer-5 (upper layer) is not influenced at all even by making any change in the layer-4 (transport layer).

Similarly, the segment is not influenced at all by changing an IP header from IPv4 to IPv 6 in the layer-3 (network layer). That is, the layer-4 (transport layer) is not influenced at all even by making any change in the layer-3 (network layer). The layer-5 (upper layer) is free from any change with no change in the layer-4 (transport layer).

In addition, the packet is not influenced at all by replacing an Ethernet header with another in the layer-2 (data link layer). For example, the packet is free from any change by changing the protocol from Ethernet to Point-to-Point Protocol (PPP). Accordingly, the layer-3 (network layer) is not influenced at all even though making any changes in the layer-2 (data link layer). The layer-4 (transport layer) is free from any change with no change in the layer-3 (network layer). The layer-5 (upper layer) is also free from any change with no change in the layer-4 (transport layer).

In addition, the layer-2 (data link layer) is not influenced at all even though making any change in the layer-1 (physical layer). For example, when a signal transmission pathway is changed from optical fibers to wireless LAN, the contents of the information (frame) to be transmitted via the optical fibers must be identical to that via the wireless LAN. The layer-3 (network layer) is free from any change with no change in the layer-2 (data link layer). The layer-4 (transport layer) is free from any change with no change in the layer-3

(network layer). The layer-5 (upper layer) is also free from any change with no change in the layer-4 (transport layer).

By this way, it is found that any upper communication layer is free from any change even though making any change in any lower layer. This is a design to remove a barrier to the incoming revolution of the technologies.

On the other hand, the present invention is related to the bottom two layers of the physical layer and the data link layer. For this reason, any data to be transmitted in the logical layers (upper than or equal to layer-3) is free from any change due to the present invention.

In order to configure the network as a physical substance, it may be necessary for information apparatuses (hardware) to be nominal points of the network (nodes) and signal transmission pathways to link nodes. The signal transmission pathways may be either wired or wireless. Furthermore, plurality of kinds of signals may be possible. Roughly classifying the signal transmission pathways, for example, they are electrical signals or optical signals. In other words, nodes are physically linked with wired or wireless and optical or electrical signal transmission pathways in the network. The layer regulating such a physical link and transmission standard is the physical layer (layer-1).

The protocols to be adopted in a same layer must have a certain extent of consistency with each other. However, the protocols to be used in different layers may not have any consistency with each other. In other words, to design the hierarchy is to design the relationship among a plurality of protocols. In the above, the physical layer and the data link layer are assumed to be different layers (layer-1 and layer-2), whereas, in a different concept of hierarchy, they may belong to the same layer which is subject to the same Ethernet protocol. In other words, they are regarded as the same layer. In this event, the number of layers is decreased by one to be four. Moreover, the formats of the transport layer (layer-4) and the network layer (layer-3) are combined to be called TCP/IP standard. Or, there may be a hierarchy concept of fractionalization. For example, in the OSI reference model, the upper layer is further divided into three layers including session layer (layer-5), presentation layer (layer-6), and application layer (layer-7) from the bottom up.

The configuration of the network is generally confusing, but both ends of the signal transmission pathways must be terminated with nodes, respectively. FIG. 1 is the simplest example of such a unit of the network. Information to be input to the first node 2001 from some kind of source may be converted (coded) into a protocol data unit according to a predetermined format and then transmitted to the second node 2002 via the signal transmission pathway 1000. The second node 2002 may inversely convert (decode) the received protocol data unit according to a predetermined format which has a certain consistency with the format that the first node 2001 is subject to, and then reproduce the original data before being input to the first node 2001. By this way, a piece of data converted (coded) into a protocol data unit may be exchanged in the network. This is a basic configuration of the data transfer.

As mentioned above in FIG. 1, two nodes terminating a signal transmission pathway 1000 (first node 2001 and second node 2002) must be subject to the protocols having a certain extent of consistency with each other. If those protocols have low consistency, the signal transmission pathway may regard the first node 2001 and the second node 2002 as being disconnected.

In the case that the communication corresponding to FIG. 1 is the communication in the transport layer (layer-4), the protocol data unit is a segment and the conversion protocol is TCP. For example, if the first node 2001 receives a data, a TCP header is attached to it according to the format of the TCP standard so as to form a segment. This segment is forwarded to the second node 2002 via the signal transmission pathway 1000. The second node 2002 receives the segment and then inversely converts (decode) it according to the format of the TCP standard, so as to reproduce the original data. More concretely, the second node 2002 removes the TCP header from the received segment.

In the case that the communication corresponding to FIG. 1 is the communication in the network layer (layer-3), the protocol data unit is a packet and the conversion protocol is IPv4, IPv6 and so forth. For example, if the first node 2001 receives a data (a segment in this event), an IP header is attached to this segment according to the format of IPv4 or IPv6 standard to form a packet. This packet is transmitted to the second node 2002 via the signal transmission pathway 1000. The second node 2002 receives the packet and then inversely converts (decode) it according to the format of IPv4 or IPv6 standard. Thus, the original segment is reproduced. More concretely, the IP header is removed from the packet. Or, the TCP header is also removed to reproduce the data.

In the case that the communication corresponding to FIG. 1 is the communication in the data link layer (layer-2), the protocol data unit is a frame. For example, if the first node 2001 receives a data (a packet in this event), the packet is attached with an Ethernet header according to the format of the Ethernet standard to form a frame. In the Ethernet standard, a frame check sequence (FCS) is also attached to a frame for checking if the packet is appropriately received. The frame generated like this is transmitted to the second node 2002 via the signal transmission pathway 1000. The second node 2002 receives this frame and then inversely converts (decode) it to recover the original packet according to the format of the Ethernet standard. More concretely, it is checked if the packet is appropriately received by checking the FCS, and then the repair or the request of resending are executed as necessary. If it is confirmed that the packet is appropriately received, the Ethernet header and the FCS are removed.

In the above, the uni-direction transmission of the data from the first node to the second node has been illustrated. However, the utilization method of the protocol is free from the change in the transmission direction. In this event, at first, the information input to the second node 2002 is converted (coded) into a protocol data unit according to a predetermined format. Then, it is transmitted to the first node 2001 via the signal transmission pathway 1000. The first node 2001 inversely converts (decodes) the received protocol data unit to reproduce the original data before being input to the second node 2002.

Moreover, in the case that the first node 2001 is a relay from any third node to the second node 2002, the first node 2001 is able to transfer a protocol data unit to be received from the third node to the second node 2002 via the signal transmission pathway 1000 with no decoding. Or, it is also able for the first node 2001 to transfer it to the second node 2002 via the signal transmission pathway 1000 after editing a part of the received protocol data unit (header for example). As a result of this edit, the protocol data unit is appended with some kind of code which indicates that it goes through the first node 2001 with or without intention. The second node 2002 inversely converts (decodes) the protocol data unit to be received to reproduce the data before being input to any third node according to a predetermined format.

More concretely, the header corresponding to the layer under consideration is edited and then transferred. For example, in the case that the first node 2001 serving as a relay is in the data link layer (layer-2), it is possible to transfer a frame after editing the Ethernet header of the frame. More concretely, a predetermined authentication of the first node 2001 serving as a relay is appended to the Ethernet header. This transit point is recognized as an address having a physical substance (physical address).

Or, in the case that the first node 2001 serving as a relay is in the network layer (layer-3), a TCP/IP header of a packet is edited and then the packet is transferred. For example, at least one predetermined authentication for the first node 2001 serving as a relay in the system is added to the TCP/IP header. Thus, when the second node 2002 receives a protocol data unit, it is possible to trace through which addresses the protocol data unit has gone. Those transit points are recognized as addresses having no physical substance (logical address). This logical address is called an IP address in particular. The IP address, for example, is a proper address allocated to an operating system. The addresses in the layers which are upper than or equal to the layer-3 (network layer) are all logical addresses and then have no relation with the physical substance.

That is, in the network of TCP/IP standard, any nodes and any signal transmission pathways are virtual substances defined logically and have no relation with the physical substance. In contrast, in the network of the Ethernet standard (data link layer), any nodes and any signal transmission pathways all have physical substances. For example, in the data link layer, it may be always able to answer questions such as: to which terminal this node corresponds? To which LAN cable this signal transmission pathway corresponds?

For example, in the case that a packet is input to the first node 2001 serving as a relay from any third node in the network layer (layer-3), this packet is converted into a frame according to the Ethernet standard, and then transferred to the second node 2002 via the signal transmission pathway 1000. Thus, the first node 2001, the second node 2002, and the signal transmission pathway all have physical substances. Accordingly, the physical address indicating the physical existence of the first node serving as a relay is attached to the frame.

Or, in the case that a segment is input to the first node 2001 serving as a relay from any third node in the transport layer (layer-4), this segment is converted into a packet according to the IP standard, and then transferred to the second node 2002 via the signal transmission pathway 1000 in the network layer. Thus, the first node 2001, the second node 2002 and the signal transmission pathway 1000 are all logical substances with no relation to any physical substances. Accordingly, the logical addresses indicating the logical existence of the first node serving as a relay is attached to the packet.

It is self-evident that the physical address and the logical address are different as follows. For example, suppose that an electronic apparatus configuring the first node 2001 serving as a relay is replaced. In this event, the operating system of the electronic apparatus configuring the relay node before the replacement (old electronic apparatus) must be re-installed into the electronic apparatus configuring the relay node after the replacement (new electronic apparatus). Thus, the physical address which is the authentication proper to the electronic apparatus having the physical substance must be replaced. On the other hand, the logical address proper to the operating system is taken over as the IP address of the third node even after the replacement. This is one of the reasons that the logical network (TCP/IP network) has been extensively adopted.

FIG. 3 illustrates the relation between the physical network and the logical network on the communication hierarchy. There are physical nodes linked to each other under the physical layer at the bottom of the hierarchy, which comprises a LAN cable, optical or ADSL lines or WiFi and so forth. The physical addresses are used to authenticate and link those physical nodes to each other in the physical layer. There is the data link layer just above the physical layer. There is the logical layer-1 thereabove. The logical layer-1, for example, is subject to the TCP/IP protocol. There are logical nodes in the logical layer-1, above which the logical network is configured. The logical addresses (IP address and so forth) are used to authenticate and link those logical nodes to each other in the logical layer-1.

By this way, the data link layer is between the logical network and the physical network and then those networks are associated by the data link layer. However, this doesn't mean the linkage of the logical nodes and the physical nodes. It is because that the physical addresses and the logical addresses are completely independent from each other.

The target to which the wicked hackers attack is mainly the logical layer. Since the whole logical layer is administrated in the logical space, the attack is also completed only in the logical space. Accordingly, as long as the target is connected to the network, the hackers can always attack it even from the backside of the earth. As for the physical layer, it may be also possible to take over the physical addresses to hijack the apparatuses.

Once a vulnerability of the logical layer-1 is found and the security is broken, as illustrated in FIG. 4, the logical layer-2 is developed to fix the vulnerability and then used in the network. In this example, HTTP/SLL is adopted but what is illustrated here is not limited to HTTP/SSL. What is important is that the logical layer-2 is laminated on the logical layer-1 and then the logical addresses are used in the logical layer-2. The logical nodes mutually recognize themselves in the logical layer-2 and then select some of other logical nodes for connection.

Once a vulnerability of the logical layer-2 is found and then the security is broken, as illustrated in FIG. 5, the logical layer-3 is developed to fix the vulnerability and then used in the networked. In this example, OAuth and DKIM are adopted but what is illustrated here is not limited to them. What is important is that the logical layer-3 is laminated on the logical layer-2 and then the logical addresses are used in the logical layer-3. The logical nodes mutually recognize themselves in the logical layer-3 and then select some of other logical nodes for connection.

By this way, it is found that the attack by the hackers and the lamination of the logical nodes are limitless. Furthermore, no matter how many logical layers are laminated, the logical addresses and the physical addresses are not related. This means that the hackers can still attack the physical layer even though any security technologies are configured above the logical layers. In particular, the attack to the physical layer is significant in the Internet-of-Things (IoT), wherein the nodes having physical substances configure a broad network.

In the network before IoT, the protection of the logical nodes is enough. However, after the era of IoT begins, it has been a significant problem as to how to safely administrate the connected apparatuses (industrial facility, industrial robots, electric appliance, infrastructure facility, auto-driving vehicle and so forth).

On the other hand, a significant revolution has come in the security technologies for the logical layer recently. It is called block chain. The block chain is a public ledger system, which has been invented to disable the manipulation of the transaction data of crypto currency called bitcoin. As described in detail below, in short, it is a system where an unspecified large number of logical nodes connected in a certain logical layer mutually put themselves under surveillance and then irregular manipulation and transaction are prohibited. Thanks to block chain, it may become possible to make safe international or domestic remittance not via any bank. In other words, the remittance fee is limitlessly close to zero because a bank is not used. Furthermore, the governments or tax authorities become able to monitor the whole transaction in the network. In addition, no one can manipulate the transaction record.

The block chain enables substantial cost down and time saving of the financial services which are completely executed in the logical layer. Thus, it can be regarded as a great reform since the entry of the internet which has realized the substantial cost down and time saving of the information communication. FIG. 6 is a conceptual illustration wherein this block chain is implemented into the communication hierarchy. There is the logical layer-3 on the block chain layer and further the whole logical nodes are distributed thereon. The communication among those logical nodes cannot be manipulated in public with the public ledger system made by block chain. The tax authorities and the intelligence agencies of various countries may also join the block chain surveillance.

Hereinafter, the block chain is illustrated briefly.

The block chain is a public ledger system on the peer-to-peer (P2P) type network. In the configuration of the P2P network, any servers taking central roles are not assumed. The whole nodes (nominal points) connected to the network are non-central and are equal to each other. It is necessary to make sure the security of the network by mutually putting the whole nodes under surveillance. Thereby, the block chain is able to provide applications having been unable in the client-server type network which assumes the servers taking central roles (core) in the network.

What is most important is the remittance system by cryptocurrency which is called bitcoin. In the bitcoin, at first, the record of the past transactions and the name of the account to take the initiative of the new transaction are combined and then encrypted to form an electronic signature. The new transaction is executed by transferring the electronic signature to the destination node. By this way, there is no bank in any options of transaction process. The updated and transferred transaction record is put under surveillance by a large number of other non-central nodes and then authorized in a similar manner to the majority decision. However, it is called "signed" to encrypt the record of the past transactions and the name of the account to take the initiative of the new transaction with a private key like this so as to generate an electronic signature.

The transfer of the transaction record is identical to the remittance. The authorized transaction record is treated as being similar to currency. Thus, the transaction is continued without any specialized central existence like the bank.

The encryption to be used for electronic signature flowing in the network is a general one called public key encryption which is famous with a metaphor of Alice and Bob. As illustrated in FIG. 7, Alice sends her public key to Bob in advance. This public key is permitted to be stolen by someone in the network. Bob encrypts a letter with Alice's public key and then sends it to Alice. The private key forming a unique pair with Alice's public key is necessary to decode this encrypted letter. Accordingly, as long as the encryption is not broken, the content of the letter cannot be read even though it is stolen by someone. It is because only Alice has the private key. Alice can decrypt the encryption of Bob's letter with her own private key and then read it.

By this way, the public key may be exposed to the network. Accordingly, the parties to which Alice sends her public key are not only Bob. However, only Alice having the private key can decrypt the letters to be encrypted by the public key and read it, as long as the encryption is not broken. The public key and private key must be generated as a pair, while it should be practically impossible to reproduce the private key from the public key. Moreover, the letter encrypted by the private key can be decoded by the public key.

Another important role of the public key is the address for sending a letter to Alice, that is, Alice's address in the network. Once Bob exposes the encrypted letter to the network, any receivers connected to the network can take it. However, they cannot read it as long as they cannot decrypt it. No way to read it is similar to no receiving it. Accordingly, only Alice can read it; which is similar to that it is sent only to Alice. Thus, it is clarified that another role of the public key is the address in the network. Thereby, the public key used in bitcoin is so-called bitcoin address.

FIG. 8 illustrates an example of a basic concept of a wallet to store cryptocurrency and so forth. This is a common composition among the cryptocurrencies like bitcoin and so forth. The address in the network is allocated to the wallet in advance. Somewhat having monetary value (currencies or coins equivalent to them) is stored as the content of the wallet. Furthermore, it may be able to attach an electronic signature comprising the address and the content to the wallet utilizing some kind of encryption technology.

As illustrated in FIG. 9, for example, such a wallet may be used by installing a special application in hardware such as personal computers, tablets, smartphones, smart cards and so forth. In this event, the content of the wallet is saved as digital data in the storage of hardware in which the special application is installed. It is necessary for supervisors or the owners of the hardware to manage such a digital data in the electronic transaction assuming the P2P, for example, with responsibility. With this regard, it is different from the client-server type. In the client-server type, the financial organizations and so forth must have the obligation to deal with it with responsibility. In the electronic transaction with the P2P, the existence such as financial organization having a central role is unnecessary.

FIG. 10 illustrates the chain of the transactions (N−2, N−1), (N−1, N), (N, N+1) . . . . The transaction (N−2, N−1) is the transaction from the wallet (N−2) to the wallet (N−1). The transaction (N−1, N) is the transaction from the wallet (N−1) to the wallet (N). The transaction (N, N+1) is the transaction from the wallet (N) to the wallet (N+1). However, N is an arbitrary natural number.

Suppose that the content of the wallet, for example, is 1000 JPY remitted from somewhere. The sender of this 1000 JPY is assumed to be the wallet (N−2) and the electronic signature (N−2) is appended to the 1000 JPY. However, 1000 JPY is an example and not beyond. The content may be any digital information which is equivalent to or convertible to other monetary values. The wallet (N−1) includes the contents of 1000 JPY, the private key (N−1) which is used for generating the next electronic signature, and the public key (N−1) which makes a unique pair with the private key (N−1). As mentioned above, the public key (N−1) is the address of the wallet (N−1) in the network. An example may be the bitcoin address.

Next, the hash value (N−1) is generated from the public key (N−1), the content of the wallet (N−1) and the electronic signature (N−2) by using hash function (SHA-256 as an example). This hash value (N−1) is transferred to the wallet (N) and then the wallet (N) stores it as the content of it. On the other hand, the public key (N) which is the address of the wallet (N) and the hash value (N−1) which is the content of the wallet (N) are encrypted using the private key (N−1) of the sender and then transferred to the wallet (N) with the hash value (N−1).

Thus, the wallet (N) includes the hash value (N−1), the electronic signature (N−1), and further a pair of proper public key (N) and the private key (N). Thereby, the remittance of 1000 JPY from the wallet (N−1) to the wallet (N) is completed.

The hash value (N−1) includes the information that this 1000 JPY comes from the wallet (N−1). However, since the hash is unable to be inversely transformed unlike encryption, it is impossible to read the information included in the hash value (N−1) by the inverse-transformation. Then, the electronic signature (N−1) is attached to the hash value (N−1). This electronic signature (N−1) is generated by collecting the public key (N) and the hash value (N−1) and encrypting them with the private key (N−1). Accordingly, in order to confirm if the electronic signature (N−1) is really from the wallet (N−1), the electronic signature (N−1) may be decrypted with the public key (N−1) and then compared with the public key (N) and the hash value (N−1) which are stored in the wallet (N). As long as the encryption is not broken, it may be confirmed that the electronic signature (N−1) is certainly encrypted by the private key (N−1) if they are coincident. Otherwise, the electronic signature should be doubted. Or if they are coincident with the electronic signature (N−1) decrypted by another public key, for example, the public key (Q), it may be found that a fraudulence transaction was made in the wallet (Q) whose address is the public key (Q).

However, another method is necessary to prove no fraudulence transaction in the hysteresis. It is because it is impossible to negate the possibility that a person regularly owning the private key (N−1) executes the fraudulent action only with the electronic signature. For example, it may be possible for the owner to abuse a private key. In the bitcoin assuming the P2P, such a fraudulent action may be protected by "Proof-of-Work" (PoW). This is recognized to be generally proceeded successfully. The Proof-of-Work" (PoW) may be described below.

Generally in the client-server type network, an authentic third party is necessary to confirm the regularity of the transactions. It may be, for example, a financial organization which is trustful and takes a central node (server) in the network of reliability. In other words, the owner of the wallet (N−1) is able to remit to the owner of the wallet (N) via a certain financial organization. However, there is no method to perfectly prove the reliability of those central nodes. Then, the confirmation requests are sent to the sender at every remittance. Some remittance may be executed across a plurality of financial organizations, which causes a large number of confirmation requests. In addition, each confirmation process spends more than a designed cost. Thus, the remittance fee has a designed lower bound. For example, suppose the lower bound is 500 JPY. In this event, 500 JPY should be paid for every remittance of less than 500 JPY.

Thus, it is found that the client-server type is not suitable to any business assuming numerous small remittances.

Subsequently in FIG. 10, the hash value (N) is generated from the public key (N), the content of the wallet (N) (the hash value (N−1) as an example), and the electronic signature (N−1) using the hash function (SHA-256 as an example). The wallet (N) sends this hash value (N) to the wallet (N+1) and then the wallet (N+1) stores it as the content of the wallet (N+1). On the other hand, the public key (N+1) which is the address of the wallet (N+1) and the hash value (N) are encrypted to form the electronic signature (N) using the private key (N) in the wallet (N). Subsequently, the electronic signature (N) is sent to the wallet (N+1) with the hash value (N).

From the above, it is found that the transaction (N−1, N) from the wallet (N−1) to the wallet (N) is recorded by the hash value (N−1) in the wallet (N). In a similar way, it is found that the transaction from the wallet (N) to the wallet (N+1) is recorded by the hash value (N) in the wallet (N+1). Thus, it is found that the content of any wallets includes the hysteresis of the past whole transactions in a manner of chain reactions. In other words, the latest hash value represents the hysteresis of the whole past transactions.

On the other hand, the number of the wallets to remit to a wallet is not limited to one unlike the example of FIG. 10. Actually, in many cases, a plurality of wallets may remit to a wallet. Or, a wallet may remit to a plurality of wallets. Thus, the transaction hysteresis may be more complicated, and may lead to extraordinarily costs if any of those confirmation processes is executed in the client-server type network.

Moreover, in order to record the whole past transactions in the P2P, any node may have to retroactively store the whole past transaction record all over the world. This may cause the storage of the hardware in which the special application of wallet is installed to be saturated. However, there is just one hash value including the latest transaction record. It is so-called the root of Merkle. Accordingly, the history can be retroactively traced from the root of Merkle. It may configure a tree diagram wherein many branches come from the root of Merkle, as illustrated in FIG. 11. This is called the Merkle tree diagram. For example, the hash value (ABCD), which is the root of Merkle, is connected to the hysteresises corresponding to the hash value (AB) and the hash value (CD). The hash value (AB) is further connected to the hash value (A) and the hash value (B) which respectively correspond to the past records: i.e., the transaction (A) and the transaction (B). The hash value (CD) is further connected to the hash value (C) and the hash value (D) which respectively correspond to the past records: i.e., the transaction (C) and transaction (D).

To begin with, however, it is impossible to go back the hysteresis of transactions by decoding the hash values since they cannot be inversely transformed. For example, one of the methods to actually go back the hysteresis of the past transactions of the content of the wallet (N) (the hash value (N−1)) is at first to select any other wallet (M), to decode the electronic signature (N−1) with the public key (M), and then to compare the decoded results with the public key (N) and the hash value (N−1). If they are not coincident, another wallet (M+1) is selected and then the similar procedure is executed using the public key (M+1). If they are coincident, the transaction is turned out to be the remittance from the wallet (M+1). In this event, M+1 is turned out to be identical to N−1. Subsequently, the public key (N−2) of the wallet (N−2) including the hash value (N−3) is traced back by repeating this procedure. Here, M and N are arbitral natural numbers.

It is thereby logically possible to go back the hysteresis of past transactions, but it is generally unnecessary to go back it one by one using hash values like this. Rather, hundreds or thousands of transactions are collected together to form a block and then it may be preferable to approve that those transactions are real with some kind of method. In concrete, the latest hash value (ABCD for example) may be adopted as a symbol while disposing the hash values other than the root of Merkle (ABCD for example). A loaf of transactions which are represented by a symbol is called a block. Thus, it may be possible to save the storages of hardware in which the special application of wallet is installed.

It is approved that a block of past transactions represented by a root of Merkle (the hash value (ABCD) in the above example) is real by sealing it with a timestamp. Thus, the authorized block is released in the network. This release is an operation (work) similar to the date authentication that the documents are carried to a notary's public office and sealed with date there. In bitcoin, the release of a new block is called registering. A person registering a block is given a fixed reward for the compensation of authorization work. For the first 210,000-th registrations, the reward is 50 BTC every registration, where BTC is a unit of bitcoin. In the registrations from 210,000-th to 420,000-th, the reward is 25 BTC. In other words, the reward is reduced by half for every 210,000 registrations and then the reward becomes zero at the 6,929,999-th registration.

There is no notary's public office (an example of central node) in P2P. Then, an unspecified large number of users of bitcoin who work in P2P may approve and seal a loaf of transactions for notary. However, only one user may be able to release (register) a new block by sealing it with timestamp at each registration. Accordingly, a plurality of users contends to the authorization work for aiming the reward to be given by the registration.

By using FIG. 12 as an example, this authorization work is briefly illustrated. At first, some kind of hash value related to an authorized past block may be obtained. Next, a loaf of unauthorized transactions existing in the network may be found and then the root of Merkle of the loaf (hash value) may be obtained. A variable nonce value may be added to those two hash values and then hashed to form a block hash. In this event, the SHA-256 is used as a hash function in bitcoin. Of course, other hash function may be used to generate a block hash.

The nonce value is generally any value of 32 bits. The hash value generated with the addition of this nonce value (block hash here) is a value of 256 bits. Two to the power of 256 is larger than 10 to the power of 77. Then, it is turned out that the block hash has huge freedom. First several bits are able to be made zero by tuning the said nonce value. As an example, the probability that the first 16 bits are all zero in a newly generated block hash is one to two to the power of 16, i.e., 1 to 65,536. That is, it hardly occurs by chance. A suitable operation (work) is necessary to mine such a nonce value.

However, the hash function is irreversible. Thus, it is impossible to find a nonce value to make the first several bits zero (16 bits in this example) by the inverse transformation. That is, the hashing must be repeated while tuning the nonce value and continued until the first several bits of the hash value are made all zero. By this way, it is turned out that a sufficient number of computers is required to define the nonce value to generate a block. For the compensation, a reward (fixed bitcoin) is given. Since it is similar to mining gold, this operation is called mining. The users of bitcoin to mine for aiming this reward are called miners.

In the P2P network, the nodes to mine differ from any node with a special central function. Any node can execute the mining as long as it has a suitable computer resource. Miners, more precisely, the nodes that those miners use in the P2P network may execute a dialed search in the network while tuning the nonce value. And then, they may find a loaf of unauthorized transactions, the hash value of which loaf is all zero in the first several bits. In other words, they may go around and mine throughout the network while tuning the nonce value. By this way, it is generally unnecessary to tune the nonce value of a specialized loaf of unauthorized transactions.

Thus, if a block hash where the first several bits are all zero (16 bits in this example) is mined, the loaf of the unauthorized transactions corresponding to this block hash is permitted to be linked as a newly approved block to the said past block having been authorized. That is, it is the block linkage condition to make the first several bits all zero in the hash value of the loaf. And then, a miner having firstly mined the block hash to satisfy this condition is permitted to register. Several blocks are linked by repeating this operation (mining) and then the block chain is formed.

From mentioned above, the reliability of the currency is identical to the reliability of the transaction record in bitcoin. The block chain ensures the reliability for the notary's public. It becomes hard to manipulate the transaction record as the chain is lengthened. For example, once a part of the block data is edited, the linkage condition of the neighboring blocks (first several bits are all zero in the block hash) cannot be satisfied. Thus, the nonce values of those neighboring blocks must be revised to satisfy this condition. As mentioned above, since the hash function is irreversible, a sufficient calculation is necessary. However, once tuning the nonce values of the neighboring blocks, the nonce values of further neighboring blocks must be also tuned. At last, all the nonce values of the whole blocks linked in the block chain must be tuned to revise a part of data. This may certainly consume a further huge amount of computing ability. Thus, it becomes hard at an exponential rate to manipulate the transaction record as the block chain is lengthened.

Nevertheless, there may be a couple of weak points of the block chain. At first, the encryption is broken and then the private keys are stolen to be used. The public keys which are addresses of the wallets are exposed to the network. If successfully breaking the encryption to reproduce a private key from a public key, it can be able to freely counterfeit an electronic signature by other person's account. This makes the electronic signature invalid. Then, the whole transaction may be made unreliable.

The biggest threat for the encryption is the quantum computer. If it is assumed that a block is generated every 10 minutes, it can be estimated that the last bitcoin may be mined in around 2140. It is not improbable to successfully develop quantum computer until then. Thus, since the electronic signature assuming today's encryption may become invalid, the block chain may fall out of use until the final bitcoin will be mined. However, it is still long time until then. Anyway, with no theoretical evidence, it may be expected that the block chain will be extensively used in the coming ten years or several ten years all over the world.

On the other hand, the counterfeit of the currency is the manipulation and irregular copy of the hysteresis of past transactions. Since the electronic signature is attached to the transaction record as the evidence that the confirmation of the transaction is successful, the counterfeit of the currency is the counterfeit of the electronic signature. As long as the encryption is not broken, only the owner of the sending wallet with the private key necessary to an electronic signature can generate the electronic signature. In contrary, even though the encryption is not broken, a regular user of the private key is never waiting to manipulate the past transaction record. As mentioned above, however, once the block chain is founded, it is difficult even for the regular user of the private key to manipulate all nonce values configuring the block chain. That is, as the block chain is lengthened, it becomes hardly manipulated or edited by going back the past transactions. This is the system of "Proof-of-Work" (PoW).

However, in the case that a new transaction is executed, there is a method that the regular user of the private key can handle an improper transaction. For example, while a regular transaction (N, N+1) is carried out from the wallet (N) to the wallet (N+1), the owner of the wallet (N) generates an electronic signature (N') by abusing the private key (N) and then remits to the wallet (M), before the abuse is found. That is, it is identical to improperly issue coins. This is called double transaction problem.

Like this, the transaction (N, M) is improper. The owner of the wallet (M) may believe the electronic signature (N') and then continue the next transaction to remit to the wallet (M+1). The owner of the wallet (N+1) may also believe the electronic signature (N) and then continue the next transaction to remit to the wallet (N+2). The improper transaction is just only the transaction (N, M), but after that the transaction (M+1, M+2), the transaction (M+2, M+2) . . . may be continued. Thus, a new block may be formed by collecting them.

However, the regular block not including the improper transaction (N, M) has existed before the double transaction was operated in the wallet (N). Accordingly, as long as the generation speed of the blocks to derive from the block including the improper transaction (N, M) dominates that of the regular block, the longer block should be regarded as the regular block. In the block chain, the authenticity is determined with the length of the chain.

However, when the computational ability of the party to act wrong dominates the computational ability distributed to the other miners all over the world, the chain including an improper transaction may can be longer than the regular chain. This is called "51% attack".

It is sometimes discussed that the 51% attack is unrealistic due to a poor effectiveness of the cost. However, it may be an exception that the 51% attack is executed as a cyber-attack to weaken the financial base of a certain group. For example, suppose that the Fintech 2.0 on the base of block chain has been extensively spread in a certain large country. A certain small country may throw the national defense expenditure into the mining in order to paralyze the financial system of this big country. This may cost less than the development of the nuclear weapon. Moreover, some players may temporarily acquit the ability of 51% attack with the advance in cloud mining.

This may force the large country to be attacked to join the block chain. Then, it may be no problem that several countries join the block chain so that no country can execute the 51% attack. By this way, the block chain may be able to take such an additional advantage of international infrastructure of information communication, although it is P2P.

Such an idea of public ledger that the reliability is ensured by sharing the transaction hysteresis in the network and leaving the authorization works to the miners is expected to be extensively used as the infrastructure of information communication other than bitcoin. Because it may actually disable for the manipulation of the past transactions at the least cost. The database actually impossible to be manipulated may be, for example, demanded by healthcare to use the daily-increasing cumulative medical data, the stock exchange to use daily-increasing cumulative transaction data, and every possible information service to use daily-increasing cumulative big data. Thus, it gives rise the world-wide trend of technological innovation called the Fintech 2.0.

Another point to suppress the 51% attack is, at first, to limit the number of the attacking nodes. If the addresses allocated to the nodes are logical addresses like IP addresses, it is possible for the attackers to take a limitless number of attacking nodes. Accordingly, the whole nodes to be linked to P2P should be allocated with physical addresses to be linked to CPUs or other physical existences. This concept is so-called One-CPU-One-Vote (OCOV). For example, one-ballot-one-voter is an indispensable condition in a system like majority decision.

It is thus turned out to be necessary to associate private key and individual authentication having the physical substance. However, the private key is a product of software technology and then has no relation with the physical substance. From the first, the software is developed to work equally in any information appliance designed and manufactured with an identical specification. Therefore, the software has no relationship with the physical substances. Nevertheless, the network is configured by an aggregate of numerous information apparatuses and wired or wireless signal transmission pathways to link those information apparatuses. It is self-evident that the signal transmission pathways are physical substances as well as the electric apparatuses. Here may be a hint to associate the private key and the physical substance.

In concrete, it is to link the public keys and the physical addresses with some kind of method to avoid the manipulation.

Returning to FIG. 6, the physical and logical addresses are still disconnected. This certainly tells us that the merit of block chain is powerless against the network of the nodes having the physical substances, that is, IoT, as well as the measure to the 51% attack. However, to fix this problem is to enable for bringing the public ledger system into IoT while defending the 51% attack.

The physical address is discussed below.

FIG. 13 briefly illustrates an example of the usages of the media-access controller (MAC) address having been most extensively used as physical address.

The MAC addresses are a kind of code information which is allocated as proper control numbers to Ethernet cards installed in the information apparatuses. A typical Ethernet card 3000, for example, includes an arithmetic processor unit for MAC 3020 and a non-volatile memory chip 3010 to record MAC address.

The MAC address is standardized by the Institute of Electrical and Electronic Engineers (IEEE) as an assembly of numeral progressions with the length being 48 bits (6 bytes), as illustrated in FIG. 14; and accordingly the information quantity is about 280 trillion. The upper 24 bits (the left half in the example of FIG. 14) is called vendor code 3071 and allocated to every vendor. The lower 24 bits (the right half in the example of FIG. 14) is called serial number 3072 and allocated with no duplication by every vendor. The last 2 bits in the vendor code 3071 are UL bit and IG bit. Thus, the MAC address is represented by dividing a numeral progression of 48 bits including UL bit and IG bit into every 8 bits to be written in hexadecimal notation.

If the MAC address is a global address, the UL bit is 1. Otherwise, UL bit is 0. That is, in the case of global address (UL bit=1), the MAC addresses must be allocated with no duplication all over the world. Another 1 bit among 24 bits of the vendor code is allocated to what is called IG bit. In the case of IG bit=0, the communication is unicast communication. Otherwise, the communication is multicast communication. The unicast communication is to send the data (frame) to a uniquely selected destination in the network of the information apparatus. In contrary, the multicast communication is to send the data (frame) to multiply selected destinations in the network of the information apparatuses. Thus, 46 bits left by excluding 2 bits of UL bit and IG bit from 48 bits is to be the actual freedom of the MAC address. It is estimated to be about 70 trillion.

It should be noted here that the MAC addresses should be allocated across the information apparatuses not to be currently used but also not to be used by revoke and loss with no duplication all over the world. At present, MAC address doesn't still dry up. However, in the coming era of IoT, the number of the physical nodes to be actively connected to the network is expected to be more than 10 trillion. However, since the MAC address is editable, it is able to re-use the MAC addresses not to be used due to some reason or other. It thus appears possible to avoid the dry up. However, it is a fact that the edit of the MAC address enables for the falsification and the spoofing of the MAC address. This can be seen at http://pc.mogeringo.com/archives/1826.

By this way, the MAC address is a code written in a non-volatile memory 3010 and then allocated to an Ethernet card 3000 including the non-volatile memory. Then, it is editable. Accordingly, the MAC address cannot ensure ONE-CPU-ONE-VOTE.

Thus, it is obvious that "un-editable physical address" is necessary to replace the MAC address. To realize it, any method may be preferable such as: software, network, hardware and so forth. Anyway, there may be software technologies, network technologies, hardware technologies or those combined technologies to realize the identification devices; and furthermore, they may be able to be incorporated into the semiconductor chips respectively having the physical substances.

From the viewpoint like this, the physical unclonable function (PUF) has drawn considerable attention in recent years (see Japan Patent Publication Nos. 2009-519473, 2015-201884 and 2013-131868 and PCT Patent Publication No. 2011118548). This serves as individual authentication of the semiconductor chips by using the physical properties which are specific to every semiconductor chip in a similar way to individual authentication of the persons by using bio-information such as fingerprints, retina and so forth. In addition, the property is physically unclonable. The other major requirements for PUF are: (1) different inputs to the same PUF must cause different outputs (input independency). (2) Different PUFs to be input with the same input must cause different outputs (output independency). (3) It must be impossible to predict the output in response to an unknown input, even while a set of inputs and outputs is stolen (unpredictability of output). (4) The relation between input and output must be stable and reliable (Reliability of input-output).

In the case of the IC chip products (semiconductor chip products), there are two types of PUFs as follows: One is to use the optical characteristics of forming agent sealing chip (coating PUF). The other is to use the characteristics related to the chip itself (chip PUF). In recent years, the technologies to equip with the latter chip PUF into chip have drawn more attention. It is because the theft of the encryption keys and chip counterfeit have been more concerned.

The chip PUF is mainly divided into two types: to use the dispersion of the circuits and to use the dispersion of the miniaturized structures other than circuits (fabrication PUF) (see Japan Patent Publication No. 2015-201884). The circuit PUF is further divided into a delay PUF to use the wiring delay of the circuits (see PCT Patent Publication No. 2011118548), and a metastability PUF to use the metastability of the circuits (see Japan Patent Publication No. 2013-131868). The delay PUF is to use the uncontrollable dispersion of the operation time of the plurality of circuits integrated with the same design specification in IC. The typical examples of the used circuits are an arbiter circuit, a glitch circuit, a ring oscillation circuit and so forth. The circuit used in the metastability PUF is mainly Static Random Access Memory (SRAM hereinafter) and latch circuit (butterfly circuit).

However, there is a fatal weak point in the circuit PUF. The individual difference is too small; and then the output is unstable and unfavorable to satisfy the condition (Reliability of input-output). Furthermore, it is too sensitive to the external environment such as temperature change and then is weak to the fault attack. Then, it is necessary to append the additional amplifier and temperature sensor circuits. By this way, the load on design is increased and then more cost of the identification device is necessary to be embedded into chip. The cost increase must be avoided in the mass-product chip if possible, even though the state of the quantity is also sensitive, since more parts are necessary to cooperate with the encryption devices other than PUF in the chip. It must be avoided that PUF causes an added cost as much as possible.

The fabrication PUF is to use random short due to the fabrication variance of the inter-layer via to be purposely integrated. It is possible to solve most of the weak points of the circuit PUF. However, special structures having never been used in the conventional semiconductor products are necessary to be integrated and then may generally increase the load on the fabrication process. Therefore, it may be hard to be generally widespread.

Apart from the above, the reliability of the electron devices is used to form PUF (see Japan Patent Publication No. 2015-139010), but the reliability itself is lower and then does not satisfy the reliability of input-output. Furthermore, another PUF is reported, which uses the dispersion of the capacitors of dynamic random access memory (DRAM hereinafter) on turning the switch on (which can be seen from the academic paper entitled "DRAM based Intrinsic Physical Unclonable Functions for System Level Security"). This theoretically has a common problem with the latch circuit PUF. That is, the individual difference is too small for this to be tough to the fault attack using the change of the environment factors.

As mentioned above, there are problems that should be respectively solved in various types of the invented PUFs.

SUMMARY OF THE INVENTION

The present invention is invented in the view of the circumstances mentioned above and then aims at providing a technology to avoid an illegal falsification of the physical address and a method to secure the administration of the hardware network.

It is an objective of the invention to configure the corresponding relationship between the logical addresses and the hardwares and to improve the reliability of the internet-of-things (IoT).

The physical address of the apparatus (hardware) to be a physical node connecting to the internet-of-things, or, a code information proper to this hardware, is connected to a logical address of a logical node in the logical network. This is to form a unique correspondence relationship between the physical address and the logical address with an electronic signature technology or an encryption key technology. Therefore, a public ledger technology that prohibits the falsification of the record of the information transaction among the logical nodes is able to improve the security and the reliability of the Internet-of-things.

The present invention adopts the following methods to solve the above-mentioned problem.

The authenticated network including a plurality of nodes is disclosed. Each of the plurality of nodes includes a transaction unit and an identification core. The identification core includes a key generator. The key generators of the identification cores of the plurality of nodes generate a plurality of unique pairs of secret and public keys. The public key serves as a logical address of the transaction unit. The transaction unit manages information communication among the plurality of nodes. The identification core manages an authentication of the plurality of nodes.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

By this invention, a technology is provided where a physical address is uniquely given to a network node really having a physical substance and the falsification of the physical address is avoided by a public ledger. Then, the information communication among the hardwares connecting to IoT may become secure.

The preferred embodiments for carrying out the present invention are concretely illustrated as follows.

As mentioned above, by using the network technologies, software technologies, and hardware technologies, or the combination thereof, the identification device is provided to realize the non-editable physical address.

By precisely designing the configuration to use such properties, it becomes possible to utilize excellent functions of block chain which is powerful in the network of the logical nodes (logical network) to the network of the physical nodes (physical network). The concrete illustration is carried out using the drawings as follows.

The first embodiment is described as follows.

Figure 1:
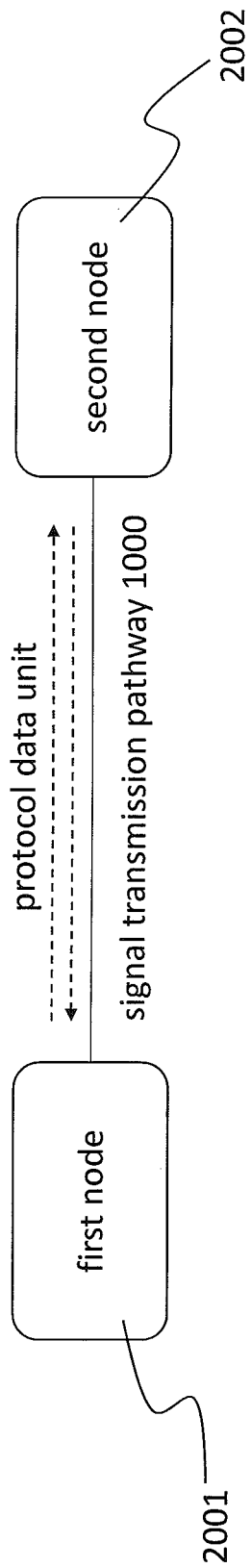
FIG. 1 illustrates the smallest unit of the network system.
Figure 2:
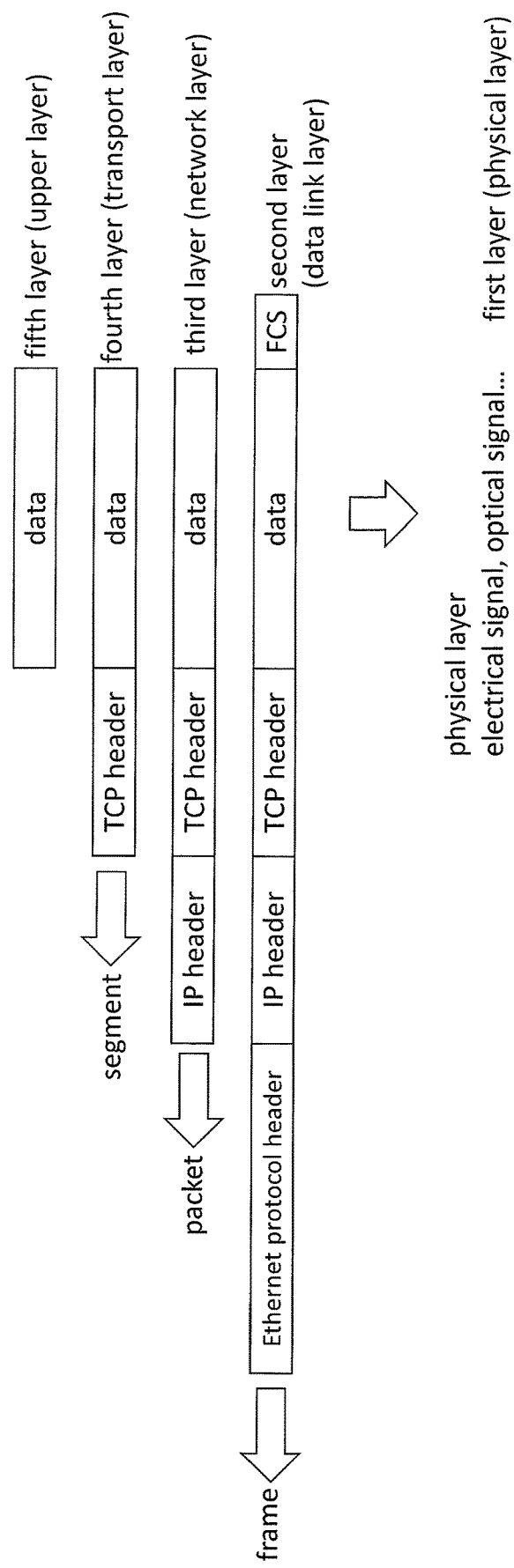
FIG. 2 illustrates the configuration of the communication layers.
Figure 3:
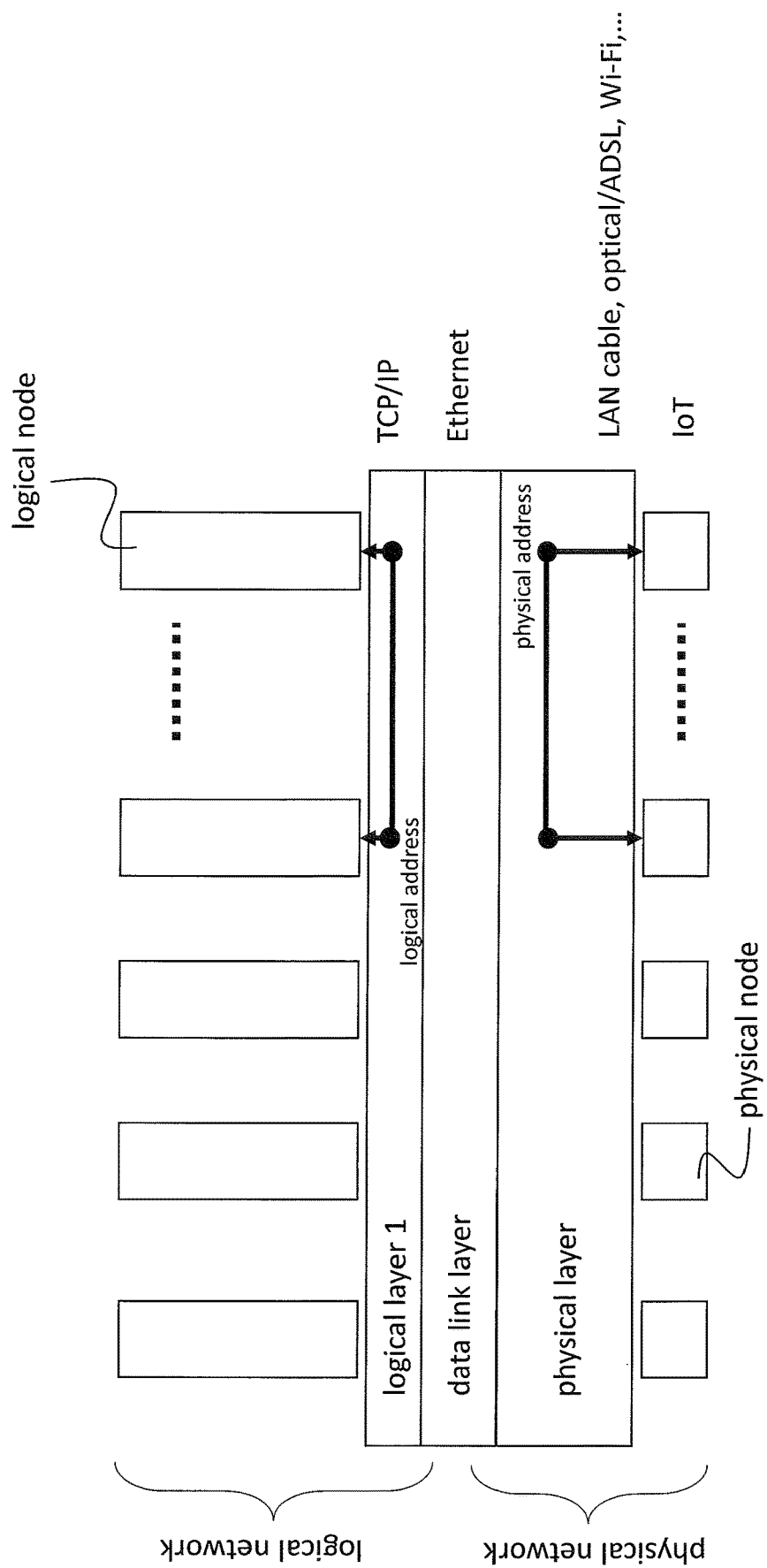
FIG. 3 illustrates the relationship of the logical network and the physical network.
Figure 4:
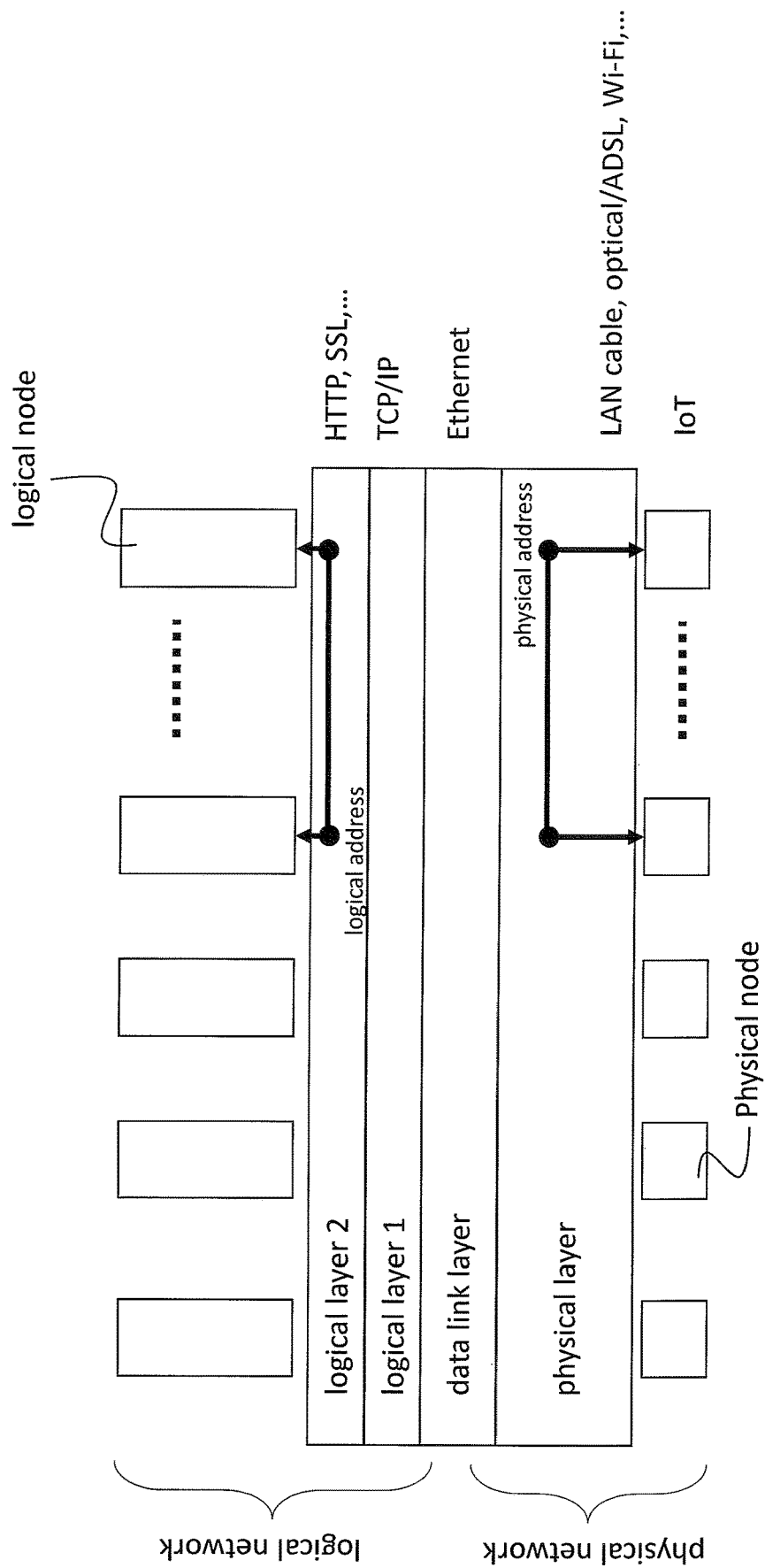
FIG. 4 illustrates the relationship of the logical network and the physical network.
Figure 5:
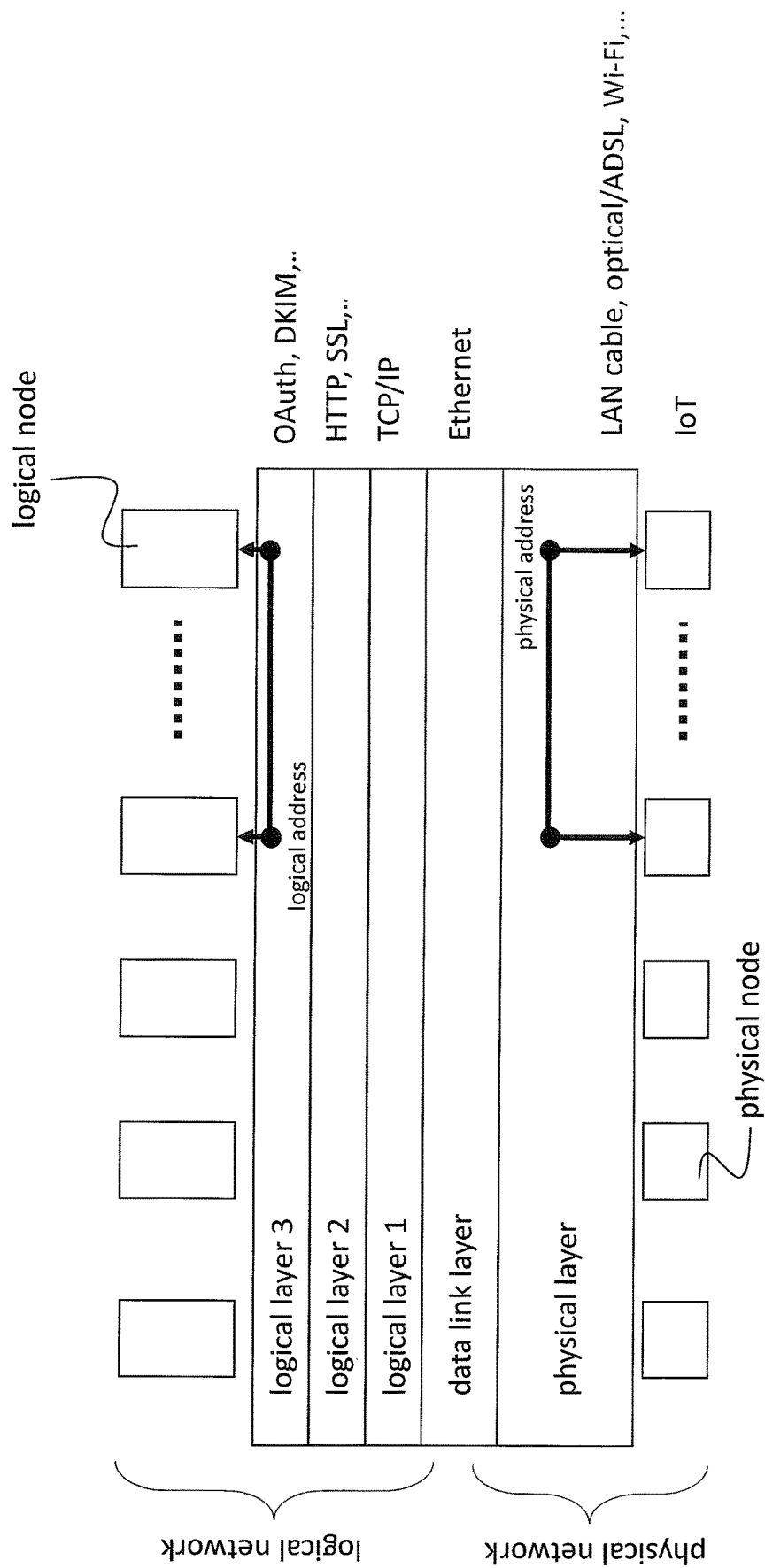
FIG. 5 illustrates the relationship of the logical network and the physical network.
Figure 6:
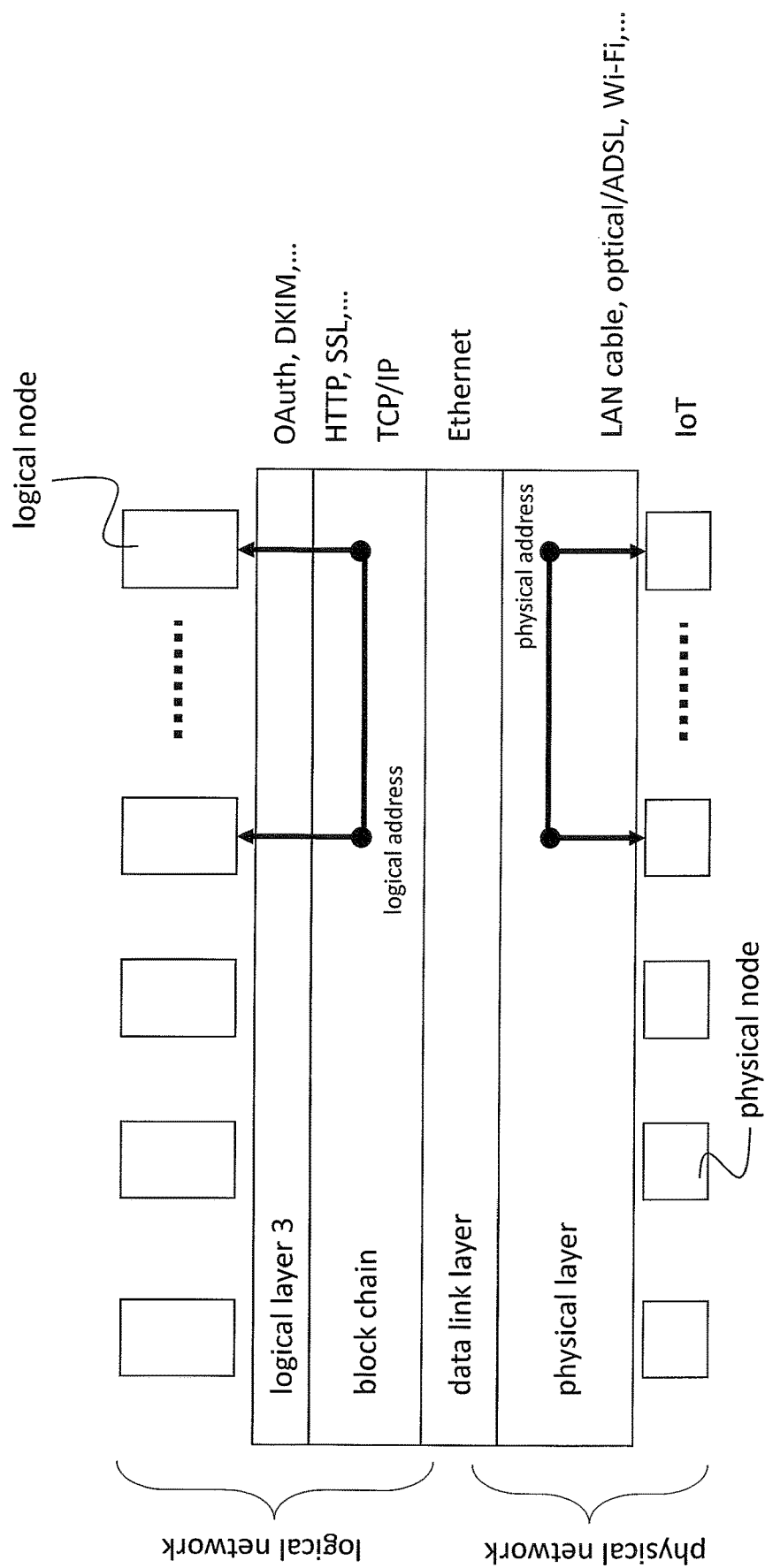
FIG. 6 illustrates the relationship of the logical network and the physical network.
Figure 7:
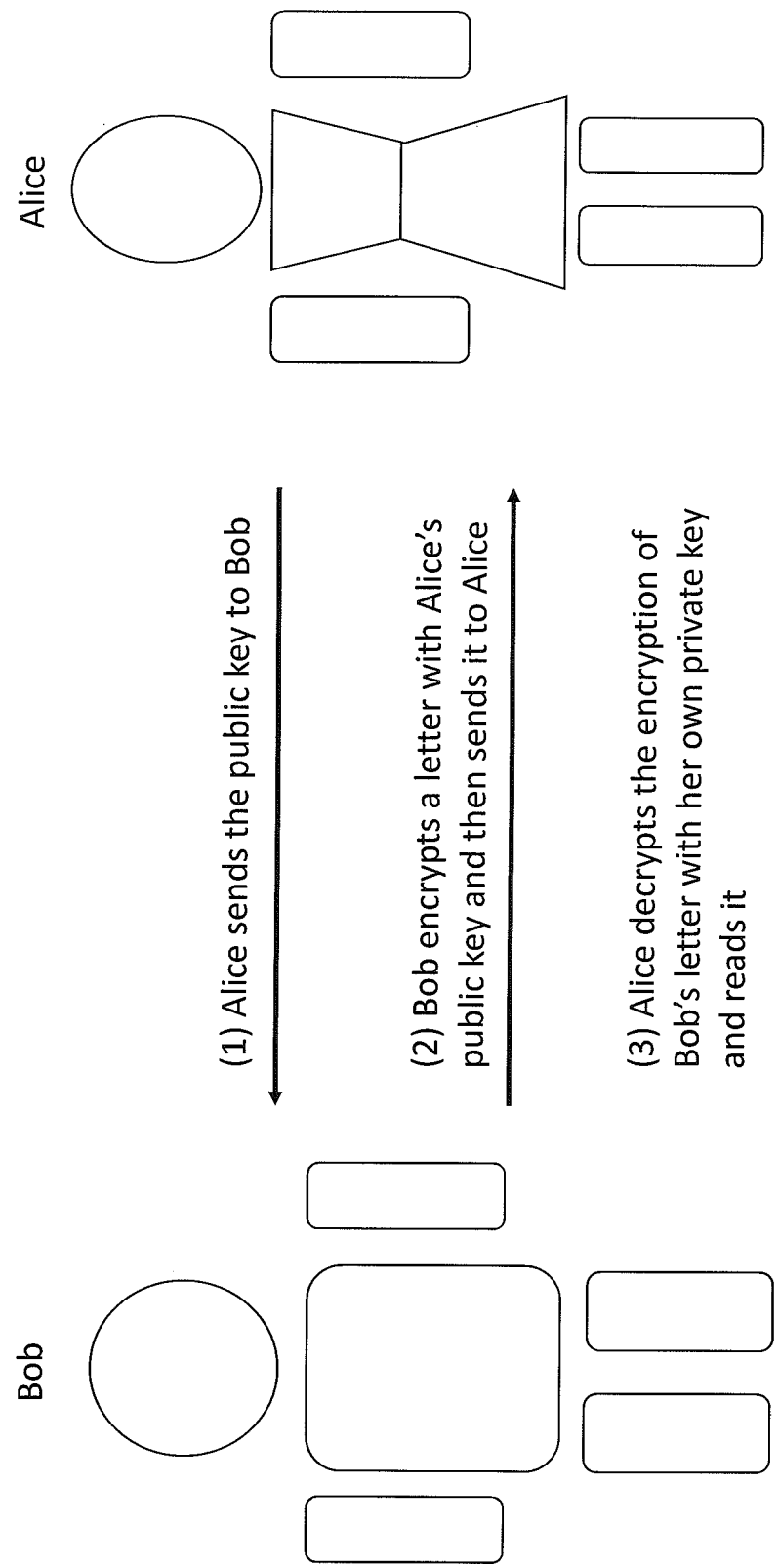
FIG. 7 illustrates the configuration of the public key encryption.
Figure 8:
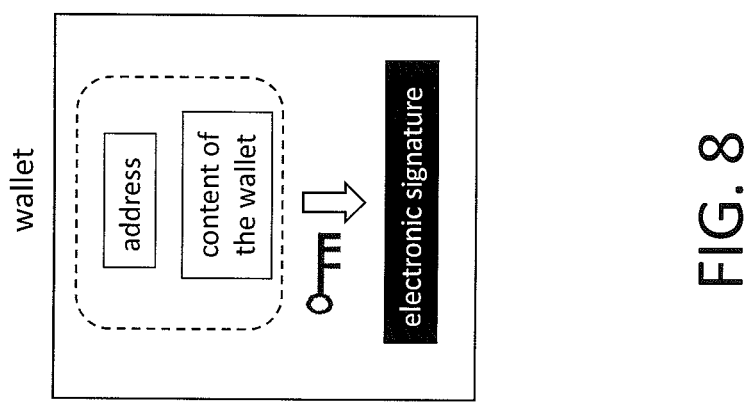
FIG. 8 illustrates the configuration of cryptocurrency.
Figure 9:
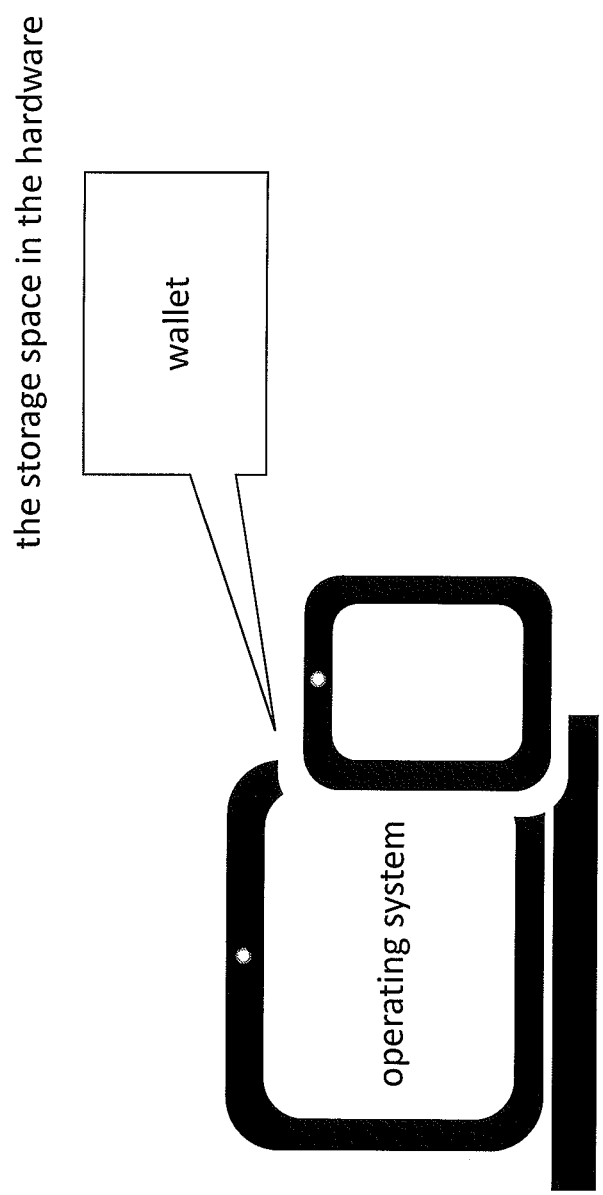
FIG. 9 illustrates the configuration of cryptocurrency.
Figure 15:
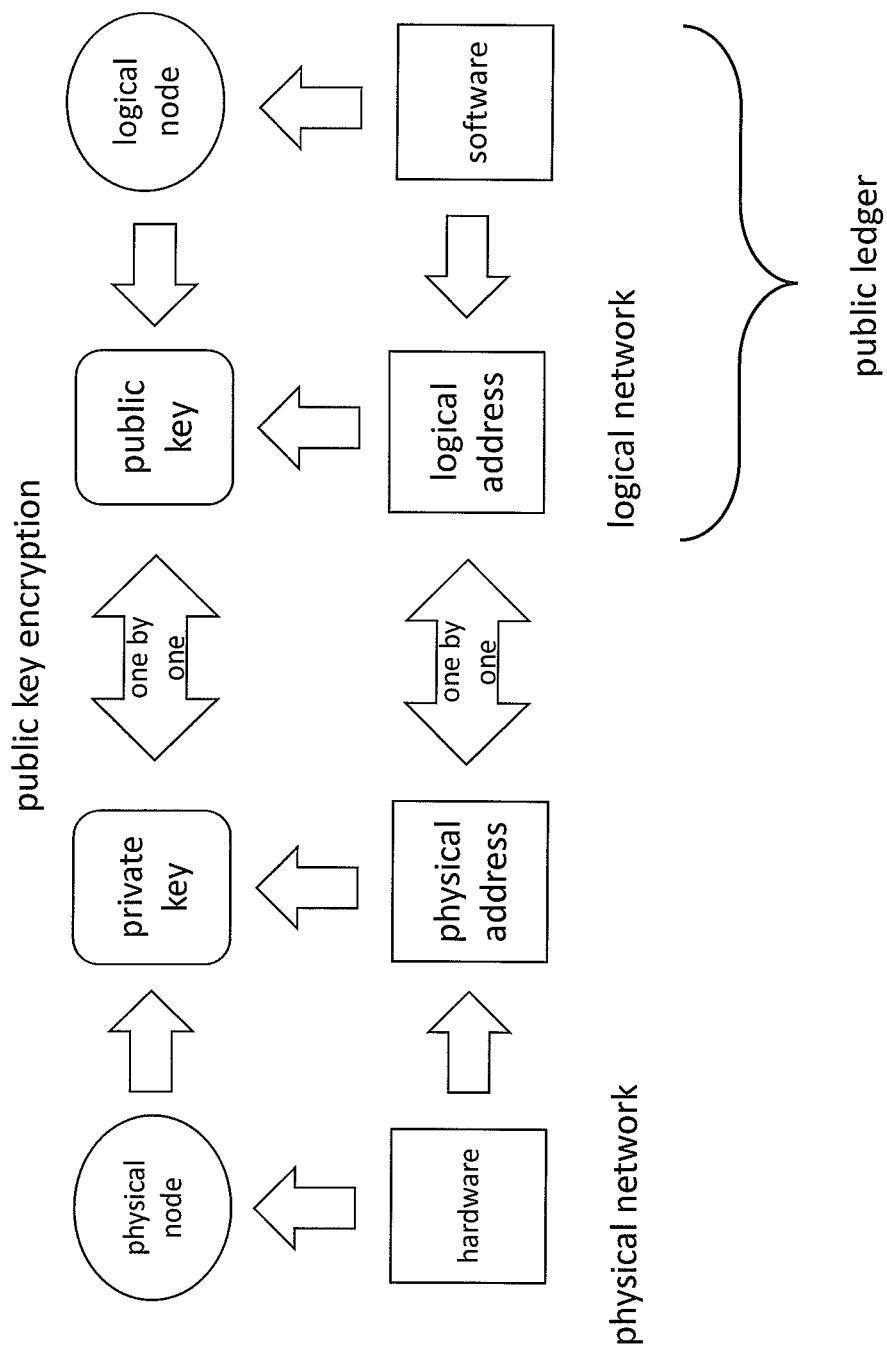
FIG. 15 illustrates an example of the concepts associated with the physical network and the logical network.

FIG. 15 illustrates the configuration of the physical network including the hardwares with the identification devices related to the present invention and with the logical network where a public ledger is utilized. The hardwares have physical substances to be nodes forming the physical network and then regarded as physical nodes. A predetermined physical address may be uniquely linked with a private key in some kind of manner. The logical node having a logical address that is a public key forming a unique linkage with the private key by the public key encryption may form a unique linkage with the physical node or hardware corresponding to this. By this way, the communication layer where a logical address and a physical address form a unique linkage may be called the identification layer. This is a concept not seen in FIG. 2.

Figure 10:
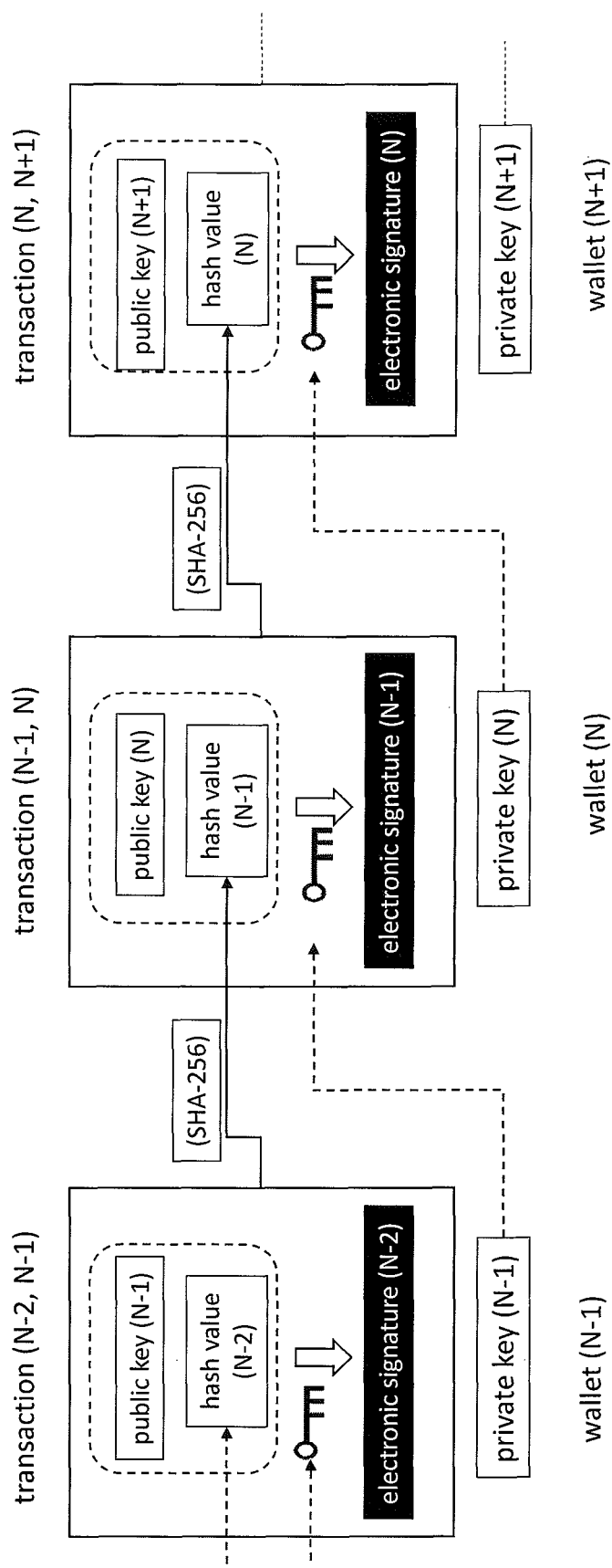
FIG. 10 illustrates the configuration of the transaction of the cryptocurrency.
Figure 11:
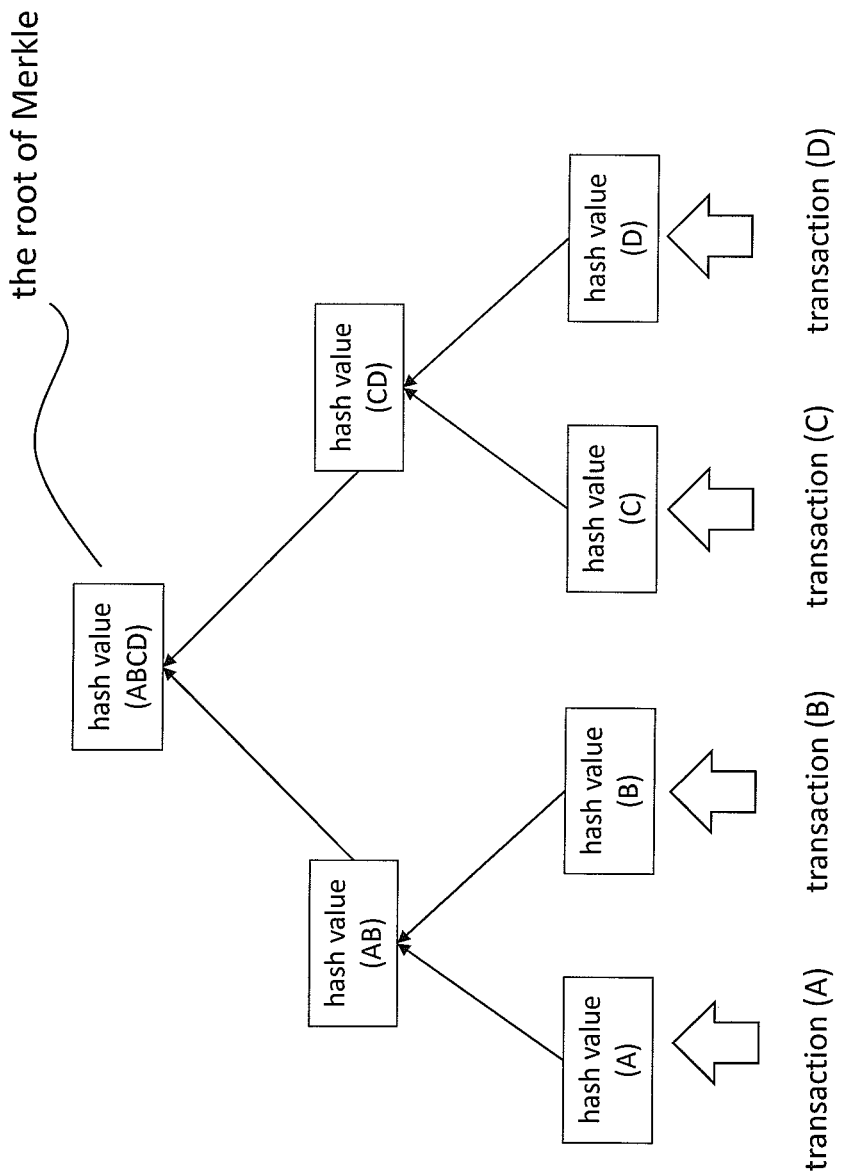
FIG. 11 illustrates the Merkle's tree diagram.

As illustrated in FIG. 10, information may be exchanged among the logical nodes respectively having the logical addresses which are public keys linking to the said physical addresses. The hash value (N−1), which is a context of the wallet (N), is generated by hashing the hash value (N−2) which is a context of the wallet (N−1), the public key (N−1) which is the logical address, and the electronic signature (N−2). However, the wallet (N−1), the wallet (N), the wallet (N+1) . . . correspond to the logical node (N−1), the logical node (N), the logical node (N+1) . . . , respectively.

Suppose that the physical address (N−1) which is the physical address of a physical node forming a unique linkage with the logical node (N−1) is altered. The private key (N−1) forming a unique linkage with this physical address (N−1) also forms a unique linkage with the public key (N−1) that is the logical address of the logical node (N−1). Accordingly, to alter the physical address (N−1) is to alter the public key (N−1).

As illustrated in FIG. 10, the public key (N−1) is hashed together with the hash value (N−2) and the electronic signature (N−2) to form the hash value (N−1). Accordingly, the falsification of the public key (N−1) is the falsification of the hash value (N−1). In general, the hash value (N−1) is not always the latest hash value, that is, the root of Merkle. However, the falsification of a part of the Merkle's tree must be identical to the falsification of the root of Merkle.

Figure 12:
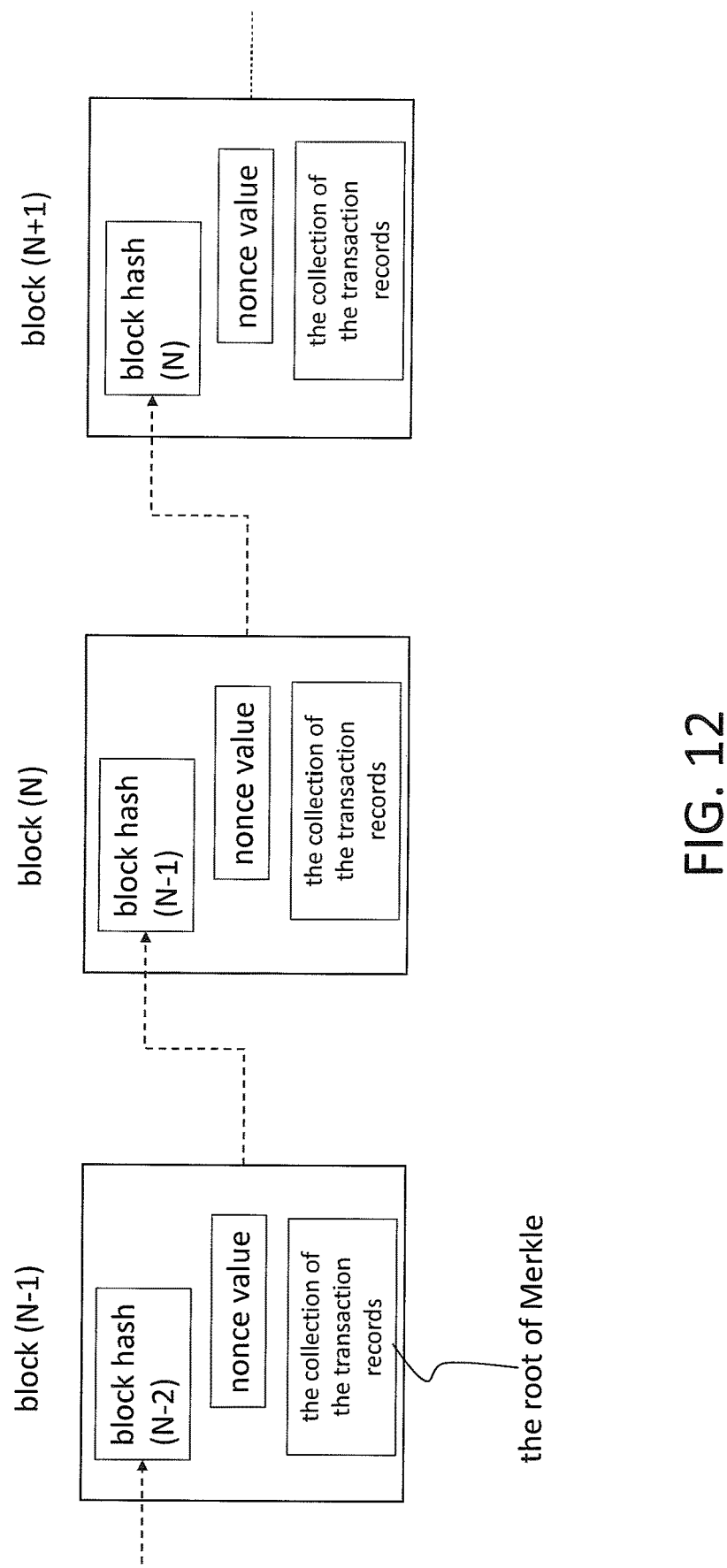
FIG. 12 illustrates the configuration of the block chain.
Figure 13:
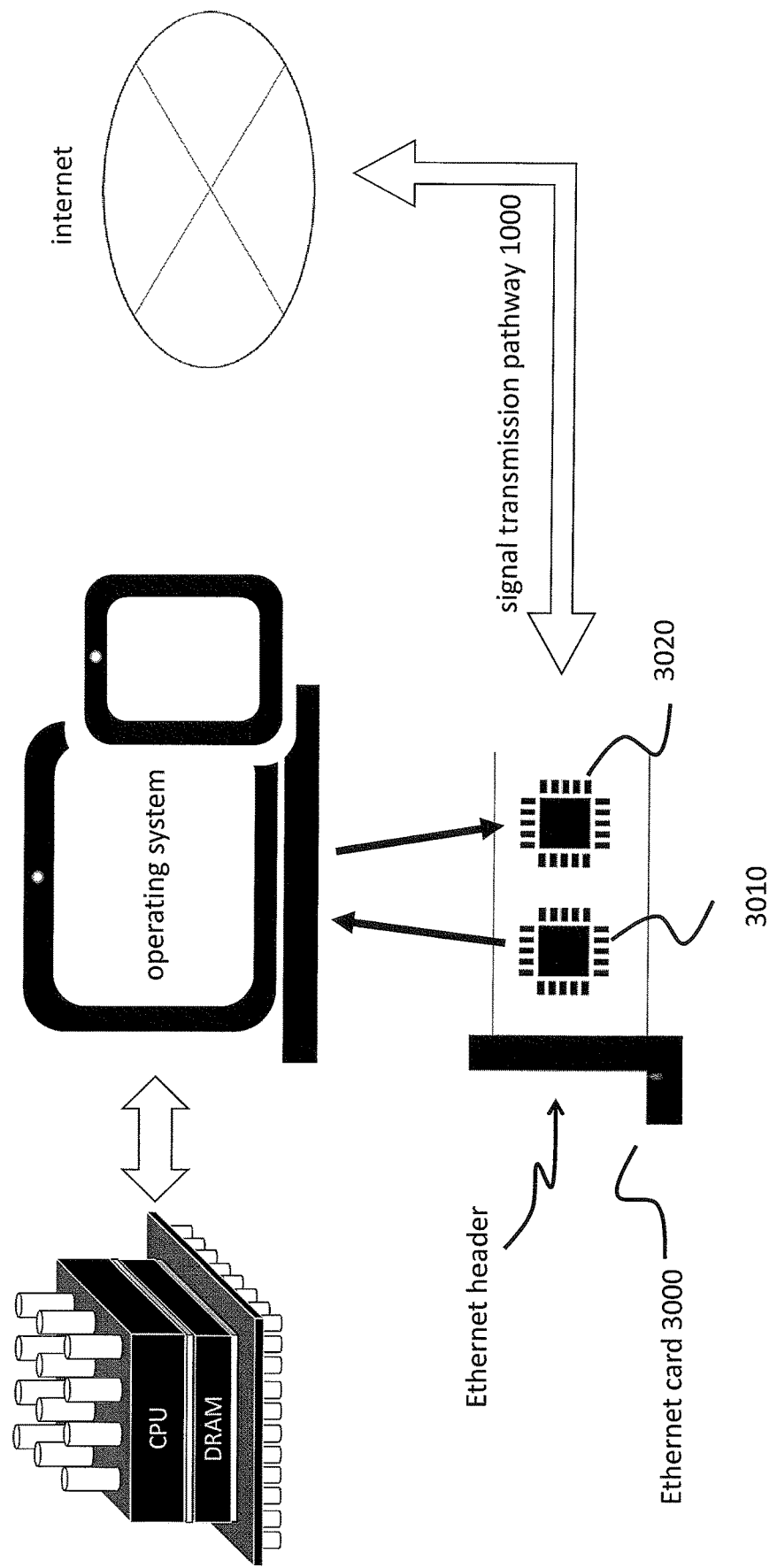
FIG. 13 illustrates the configuration of the usage of the MAC address.
Figure 14:
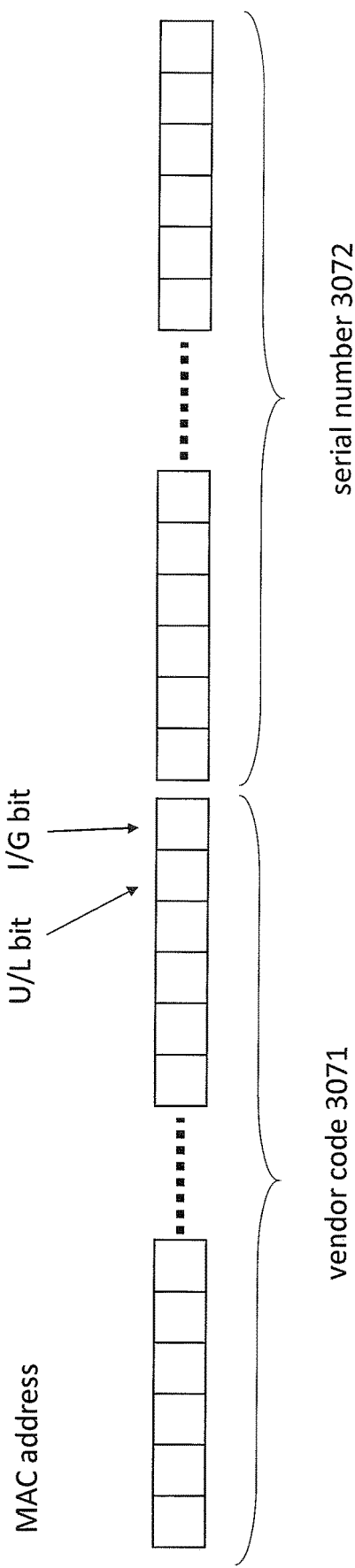
FIG. 14 illustrates the format of the MAC address.

As illustrated in FIG. 12, the block hash (N−1) composing a content of the block (N) is formed by hashing the whole block (N−1). The block hash (N−1) includes the Root of Merkle (N−1). If this Root of Merkle is altered as mentioned above, the linkage condition between the block hash (N−1) and the block hash (N) is broken. Accordingly, to recover the linkage condition, the nonce value of the block hash (N−1) is necessary to be re-tuned. For example, it is necessary to re-calculate the nonce value to make all the first 16 bits of the block hash (N−1) zero. However, more than the designed load of computation is necessary since the hash function is irreversible.

Even though succeeding in making all the first 16 bits of the block hash (N−1) zero by tuning the nonce value, as an example, the bits later than those first 16 bits may be altered as long as the Root of Merkle is altered. At last, the block hash (N−1) is altered and then the linkage condition between the block (N) and the block (N+1) is broken. In a similar way as mentioned above, more than the designed load of computation is necessary to recover the linkage condition. In addition, the linkage condition between the block (N+1) and the block (N+2) is broken. By this way, as long as the block chain is long enough, more calculation is limitlessly necessary to recover the broken linkage conditions.

Then, as long as a sufficiently long block chain is formed, it is practically impossible to alter even a part of the physical addresses in the network. Thus, non-editable physical address is possible to be realized by using the physical address connecting to the private key with a public ledger technology like block chain and so forth.

Figure 16:
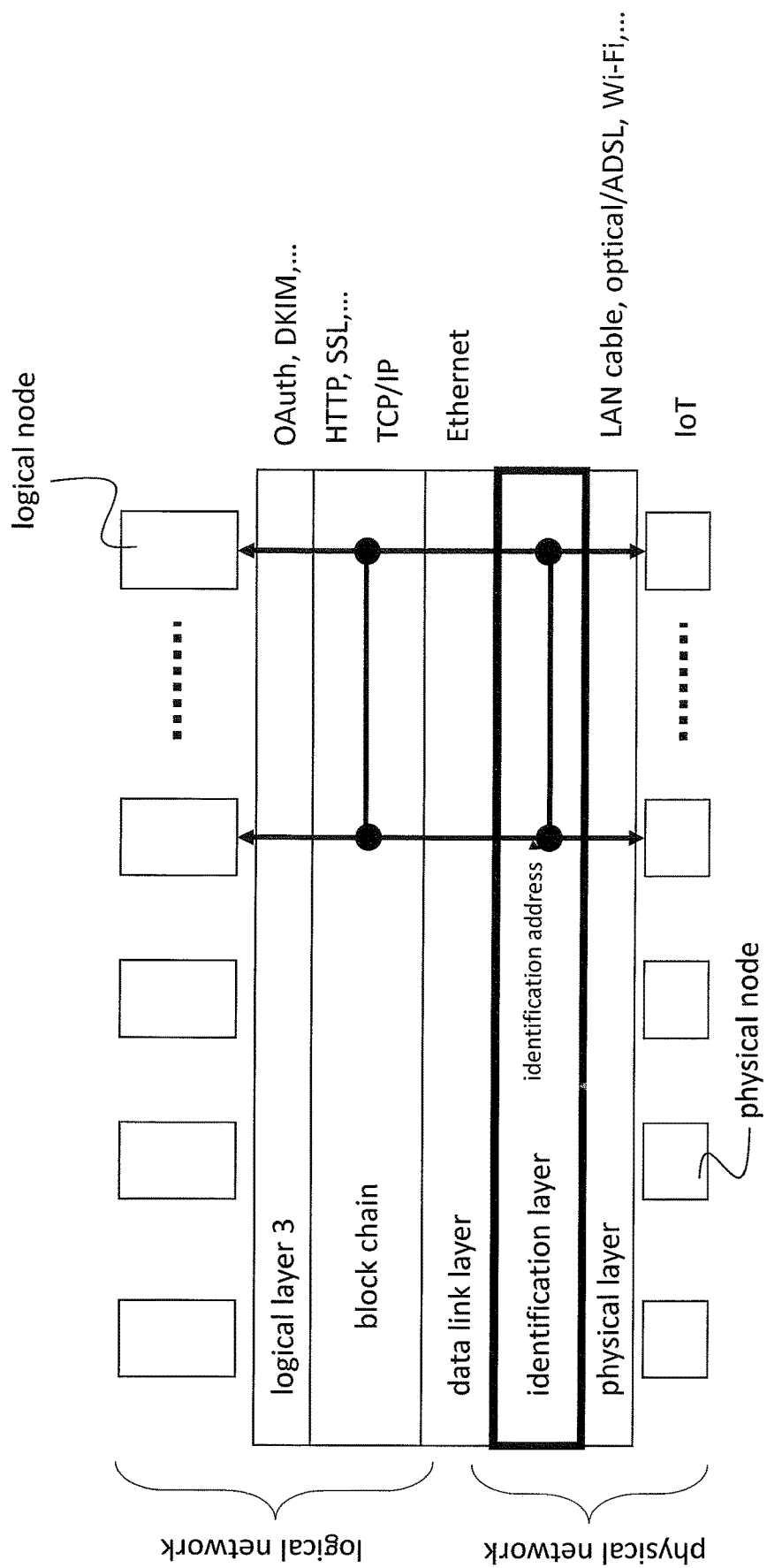
FIG. 16 illustrates that the identification layer related to the present invention is inserted in the communication layer.

In FIG. 16, it is illustrated that the logical addresses and the physical addresses are respectively linked. At first, the identification layer is conceptually formed between the data link layer and the physical layer. Furthermore, this private key and the physical address respectively make a unique relationship with the public key encryption. By this way, the logical address and the physical address are associated with an identification address in the identification layer. In the example of FIG. 15, the private key corresponds to an identification address. Thus, a logical node existing above the logical layer and a physical node existing below the physical layer are linked with no falsification.

Figure 17:
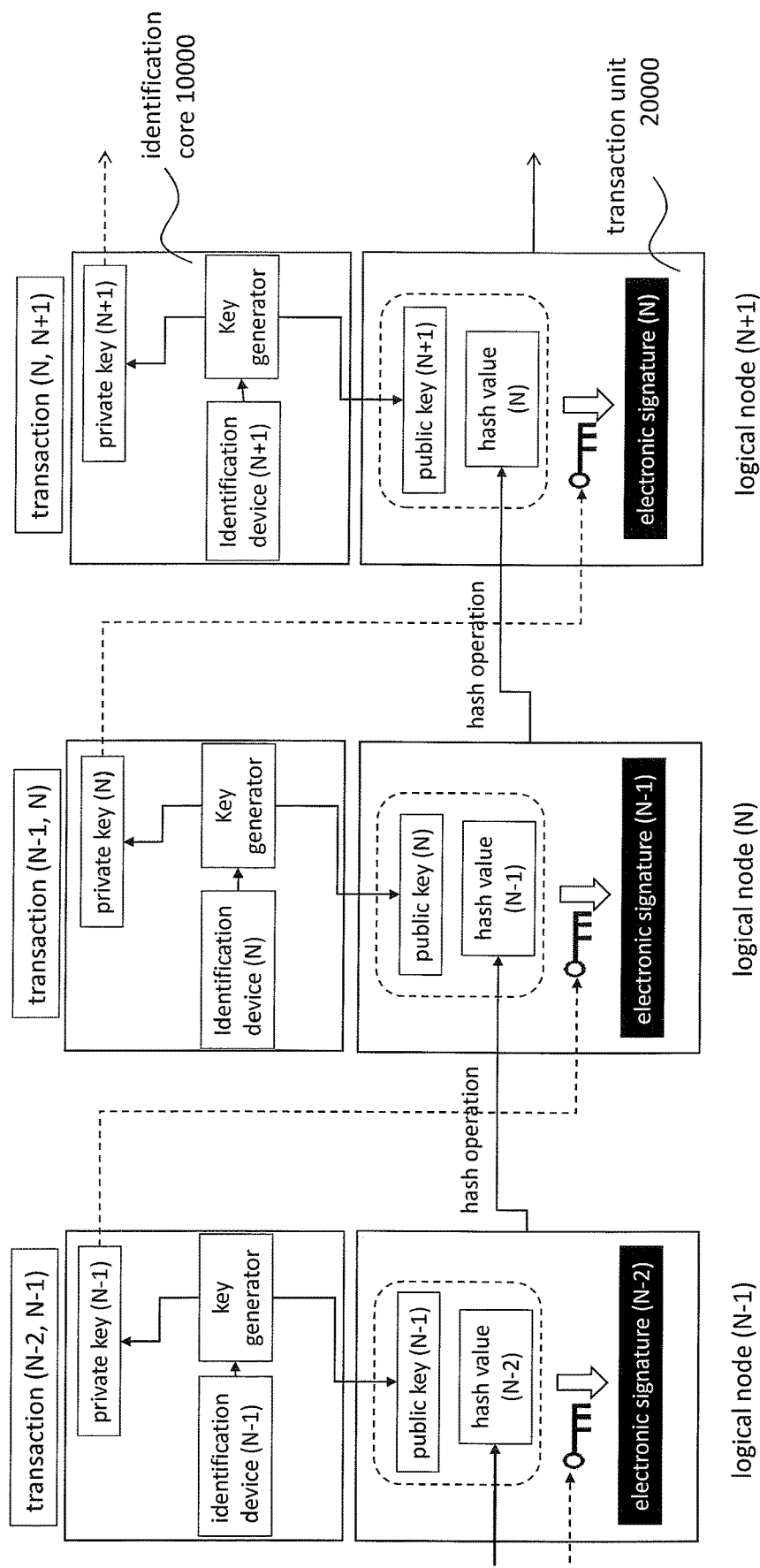
FIG. 17 illustrates an example of the introduction method of the identification core related to the present invention.

FIG. 17 illustrates an example that the transaction (N−2, N−1) is executed from the logical node (N−2) to the logical node (N−1), the transaction (N−1, N) is executed from the logical node (N−1) to the logical node (N), and the transaction (N, N+1) is executed from the logical node (N) to the logical node (N+1), where N is an arbitrary integer allocated to the physical nodes connecting to the network by some kind of method. The logical node (N) is equivalent to the wallet (N). In each logical node, the transaction unit 20000 includes a public key, a hash value and an electronic signature. On the contrary, the identification core 10000 includes a key generator, an identification device and a private key in the upper row.

To actually follow the operation, the wallet (N) at the center in the bottom column may be considered. The hash value (N−1) is the content of the wallet (N) and is generated in the previous wallet (N−1) by the following method. First, the public key (N−1) which is the logical address of the wallet (N−1) in the network (bitcoin address in bitcoin), the hash value (N−2) which is the content of the wallet (N−1), and the electronic signature (N−2) are hashed together. The hash function may be used to hash them. There are plenty of hash functions such as: MD2, MD4, MD5, RIPE-MD160, SHA-256, SHA-384, SHA-512 and so forth. As an example, the bitcoin adopts one of them, SHA-256.

The wallet (N−1) acquires the public key (N) as the logical address of the wallet (N) in the network. The public key (N) and the hash value (N−1) are encrypted together by the private key (N−1) to form the electronic signature (N−1). The electronic signature (N−1) and the hash value (N−1) are forwarded to the wallet (N). In the wallet (N), the public key (N), the hash value (N−1) and the electronic signature (N−1) are hashed together to form the hash value (N). The hash value (N) and the electronic signature (N) are forwarded to the wallet (N+1). Since the methods to generate the electronic signature (N−2) and the electronic signature (N) are similar to that to generate the electronic signature (N−1), the description for this may be omitted.

By this way, the description is as same as in FIG. 10 with the exception that the private key is included in the identification core 10000. Accordingly, the present invention has a complete consistency with the conventional block chain.

The decisive difference from FIG. 10 is therefore the identification core 10000. That is, the public keys included in the transaction units 20000 at the bottom row are generated through a designed physical generation process by the identification cores 10000 in the upper row. Furthermore, the identification core 10000 includes at least a physical address.

Subsequently, the operation of the identification core 10000 in the present embodiment is illustrated below.

In the identification core 10000, the output from the identification device is input to the key generator to form a unique pair of the private key and public key. Moreover, it is difficult at least to reproduce the private key from the public key. There are a plurality of algorithms to generate keys like this. One of examples may be illustrated with the Rivest-Shamir-Adelman (RSA) method (which can be seen from an academic paper entitled "A Method for Obtaining Digital Signature and Public-key Cryptsystems"). Hereinafter, a method to generate a unique pair of the private key and public key with a key generator may be called RSA-type.

In the RSA method, an appropriate positive natural number "e" may be given. Usually, it may be preferable to adopt the summation of one and two to the power of 16 (1+2^16) but also possible to give another positive natural number. Next, a set of large prime numbers $\{p, q\}$ is generated in some kind of manner to calculate the product of these numbers, n (=pq). Thus, $\{e, n\}$ is a public key. Subsequently, a positive natural number is found, such that the reminder of dividing it by (p−1)(q−1) is one. A private key "d" is generated by dividing the positive natural number by "e." However, if $\{p, q\}$ is known other than $\{e, n\}$, it may be easy to reproduce "d" by some calculation. Thus, $\{p, q\}$ must be disposed or confined in the identification core 10000 with no leakage. As long as the set of prime numbers $\{p, q\}$ is stored with no leakage, the set of $\{d, p, q\}$ may be regarded as a private key. Like this, the private key may be confined inside the identification core 10000 or may be deleted as necessary after use, whereas only the public key may be forwarded to the transaction unit.

Figure 18:
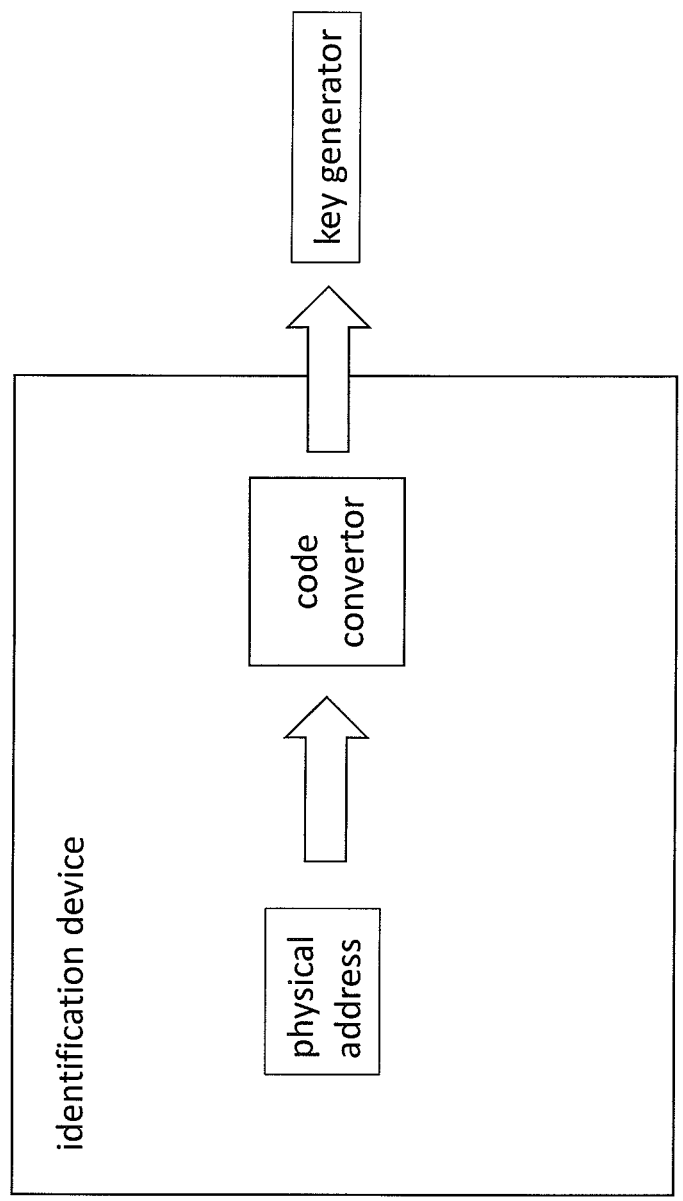
FIG. 18 illustrates an example of the identification device related to the present invention.

In the present invention, as illustrated in FIG. 18, the code convertor in the identification device converts the physical address to generate a variable to be input to the key generator. As an example, the above-mentioned prime numbers $\{p, q\}$ to be used in the RSA method is generated. It may be possible that an appropriately given positive integer "e" is input as an external input from the external input or as an internal input from another part of the internal of the code convertor or the identification device. For example, in FIG. 20, an inner input is added to FIG. 17, while an external input is added to FIG. 17 in FIG. 21. Both the inner and external inputs are added to FIG. 17 in FIG. 22. Or, an appropriately given positive integer "e" may be extracted from a part of the physical address. For example, the "e" can be obtained by adding the unity to several bits cut out from the physical address. The remaining code (not cut out) may be input to the code convertor as a new physical address.

A method to generate the prime number $\{p, q\}$ from a physical address, as an example, to subtract the unity from or add it to the physical address and then it may be checked if the obtained number is a prime number or not. If it is a prime number, it may be "p." If it is not a prime number, the unity is subtracted from or added to the obtained number and then it may be checked if the newly obtained number is a prime number or not. By repeating this procedure, a prime number may finally be defined. After obtaining a prime number "p," another prime number "q" may be also obtained by repeating a similar procedure. Thus, the prime number $\{p, q\}$ may be obtained.

Another example of the method to define a prime number "q" is to subtract two from or add it to a physical address and then it may be checked the obtained number is a prime number or not. If it is a prime number, it may be a prime number "q." Otherwise, two is further subtracted from or added to it, and then it may be checked if the newly obtained number is a prime number or not. By repeating this procedure, a prime number "q" may be obtained.

The number to be subtracted from or added to a physical address may be not only the unity or two but also an arbitrary integer (e.g., k). In this event, the said "k" may be a security parameter. For example, a security parameter "k" may be randomly extracted from a given range of integers by using a physical random number generator or a pseudo-random number. Or, it may be also possible to repeatedly compound a physical address and "k" in some kind of manner, until the compound number becomes a prime number. Anyway, as long as the physical address is large enough as a numeric, both "p" and "q" to be generated may be large enough. This makes various selection of "k".

The physical random number generator to generate a physical random number may be included in the identification device, or may be arranged outside the identification device. In the latter case, a random number may be given the identification device from the exterior. It may be a similar case that the software generates a pseudo-random number for a physical random number. However, the compound method of the physical address and "k" may be all arithmetic processing like the four operations and any combinations of them. Or, it may be any possible bit operations as possible. Anyway, as long as the physical address or the external input is large enough as a numeric, both "p" and "q" to be generated may be large enough.

Figure 19:
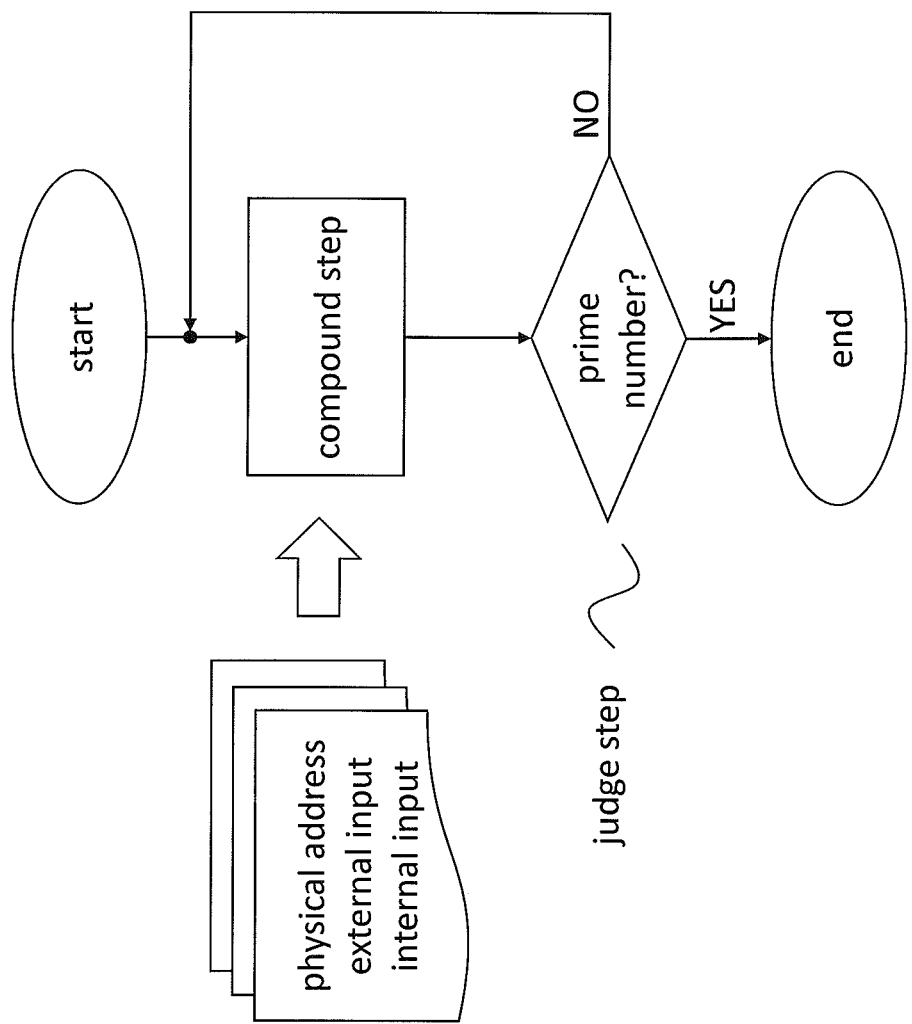
FIG. 19 illustrates an example of the generation method of a prime number, which is related to the present invention.

As an example, a method to obtain a prime number $\{p, q\}$ from a physical address includes the compound step to compound a physical address with an appropriately given variable and the judge step to judge if the compound number is a prime number or not. Then, the compound step and the judge step may be repeated until a prime number is actually obtained. Please see FIG. 19.

The embodiment is discussed below.

Figure 21:
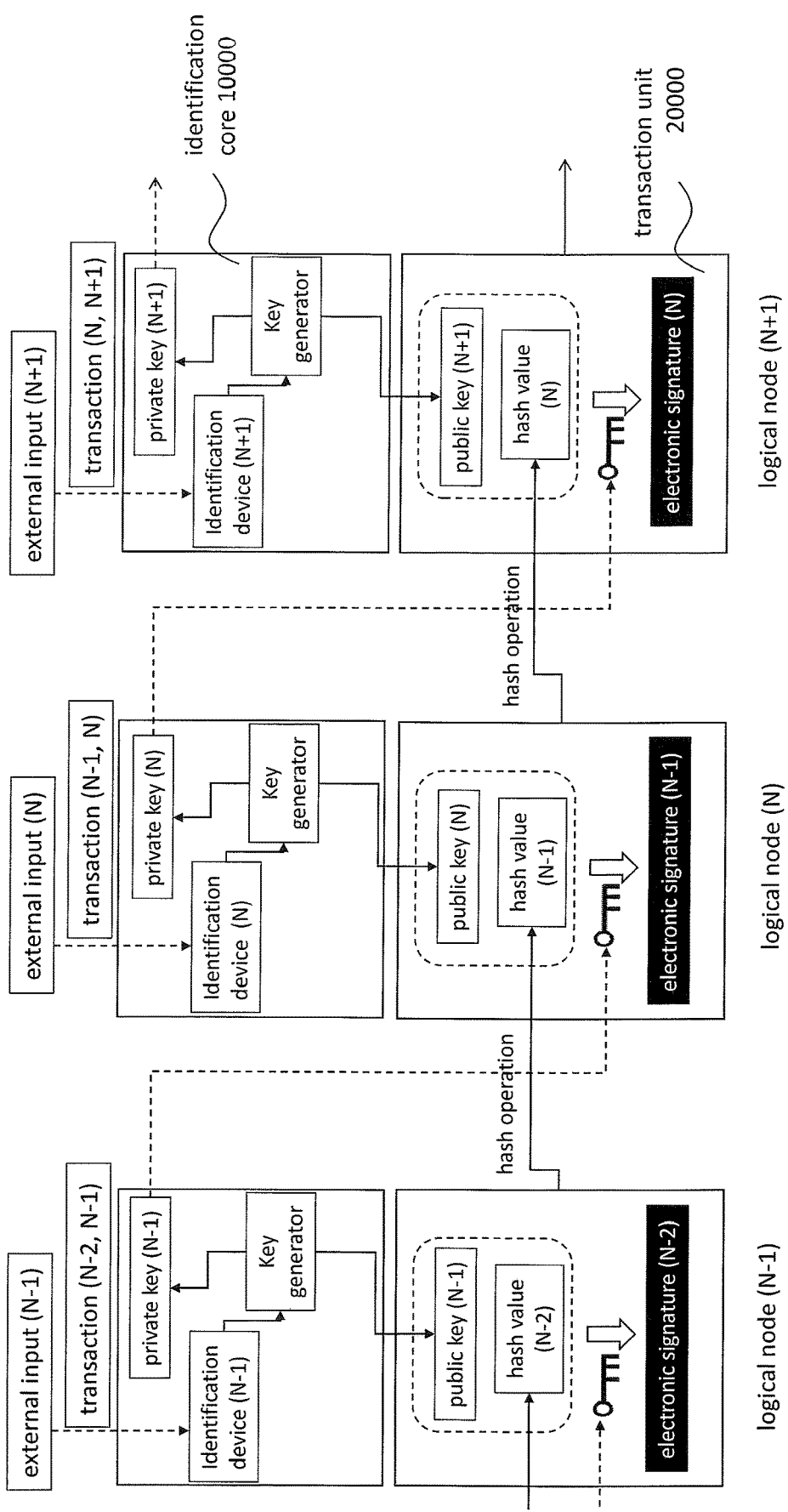
FIG. 21 illustrates an example of the introduction method of the identification core related to the present invention.

As illustrated in FIG. 21, an external input is input to the identification device in the previous embodiment so as to change a generated pair of the private key and public key. The present embodiment is useful for family and friends to share the same terminal. That is, the identification address may be different if the external inputs are different, even though the same terminal is used. Or, the identification address may be different if a different terminal is used, even though an identical external input is used.

As an example, the external input to boot some kind of application executing in the network may be the passcode, the digital code information such as the PIN code, the barcode, and the QR code, some kind of biometric information to identify the regular user of the application (such as the finger print information, the finger vein information, the retina information, the DNA information, and so forth), the voice and image information extracted from the voice and the picture of the regular user to identify an individual person, the physical information extracted from the physical characteristics of the regular user to identify an individual person, and the other personal information to identify a regular user.

As another example, the external input that some kind of application executing in the network requires the users to input as necessary may be the passcode, the digital code information such as the PIN code, the barcode, and the QR code, some kind of biometric information to identify the regular user of the application (such as the finger print information, the finger vein information, the retina information, the DNA information, and so forth), the voice and image information extracted from the voice and the picture of the regular user to identify an individual person, the physical information extracted from the physical characteristics of the regular user to identify an individual person, and the other personal information to identify a regular user.

As another example, the external input to boot the information terminal in which some kind of the application executing in the network is installed may be the passcode, the digital code information such as the PIN code, the barcode, and the QR code, some kind of biometric information to identify the regular user of the application (such as the finger print information, the finger vein information, the retina information, the DNA information, and so forth), the voice and image information extracted from the voice and the picture of the regular user to identify an individual person, the physical information extracted from the physical characteristics of the regular user to identify an individual person, and the other personal information to identify a regular user.

Or, as another example further, the external input is a fetch code for a special mode to obtain a physical random number generated through some kind of physical process in a manner which the physical random number is proper to a semiconductor chip configuring an identification device. However, the fetch code for the special mode is a code to design at least an access mode to the inner data of the chip, address, and the operation mode.

Figure 23:
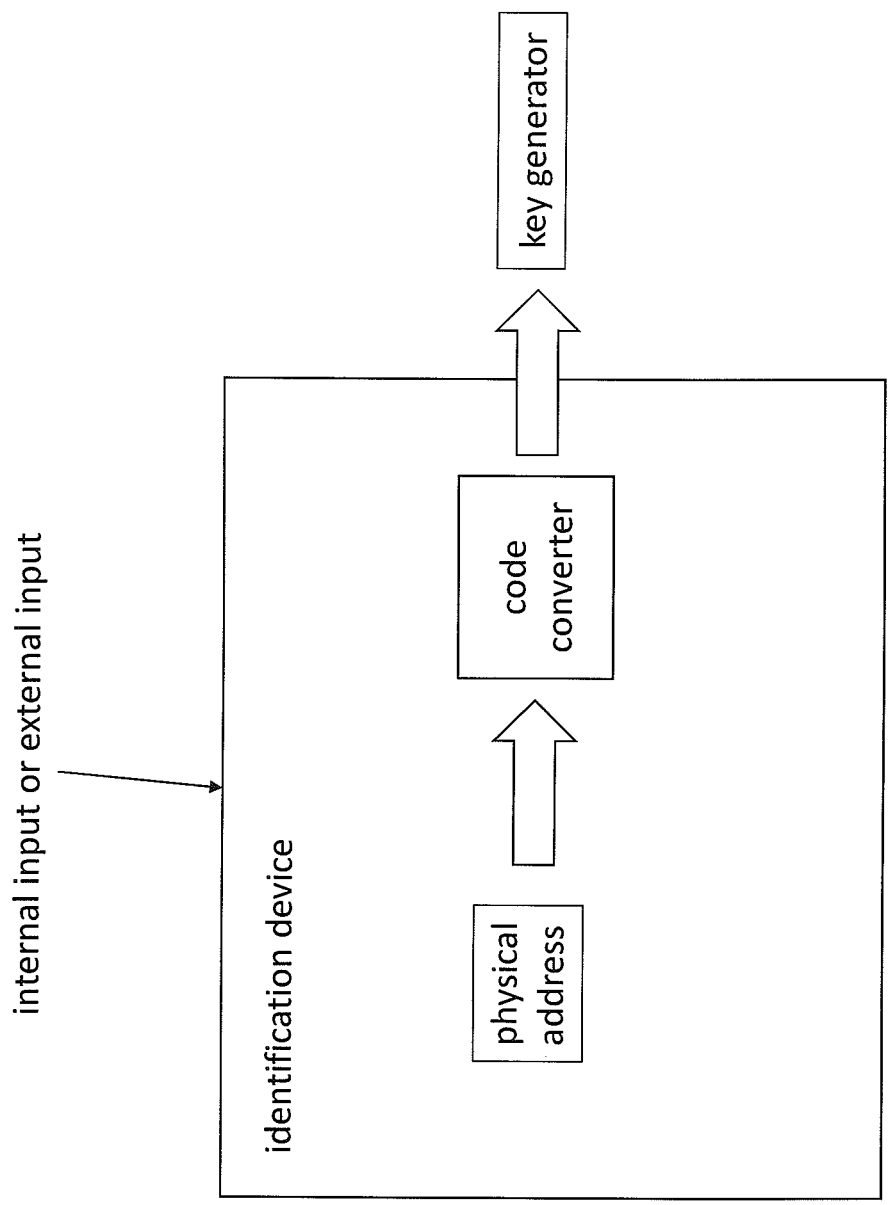
FIG. 23 illustrates an example of the configuration of the identification device related to the present invention.

FIG. 23 is a drawing to illustrate an example where the external or inner input is input to the identification device.

As an example, the physical address and the external input may be compound in some kind of method. This compound method may be the four operations or some combination of those operations, or any possible bit operation as possible. The unity is subtracted from or added to the integer (as is obtained herein). The obtained number may be checked if it is a prime number of not. If it is a prime number, it may be "p." Otherwise, the unity is subtracted from or added to this number, and then the newly obtained number may be checked if it is a prime number of not. By repeating this procedure, a prime number may be obtained finally. After obtaining a prime number "p," a similar procedure is performed to obtain another prime number "q." Thus, the prime numbers {p, q} can be obtained.

Another example to determine the prime number "q" is to compound the physical address and the external input in some kind of method, as mentioned above. This compound method may be the four operations or some combination of the operations, or any possible bit operation as possible. Two is subtracted from or added to this integer (as is obtained herein). The obtained number may be checked if it is a prime number of not. If it is a prime number, it may be "q." Otherwise, two is subtracted from or added to this number, and then the newly obtained number may be checked if it is a prime number or not. By repeating this procedure, a prime number "q" may be obtained finally. However, other than the unity or two, it may be possible that an arbitrary integer (j) is added to or subtract from an integer (i) to be obtained by compounding a physical address and an external input, in order to obtain the prime numbers "p" and "q." Or, it may be also possible to repeat the compound of "I" and "j" until the compound number becomes a prime number.

This compound method may be any arithmetic processing like the four operations and the combinations of those four operations, or, any possible bit operation as possible. Anyway, as the physical address or the external input is large enough as a numeric, both "p" and "q" may be large enough. Anyway, the method to obtain the prime numbers "p" and "q" from the physical address, as an example, comprises the compound step to compound the physical address and the appropriately given variables, as well as the judge step to judge if the compound number is a prime number or not. The compound step and the judge step may be repeated until a prime number is actually obtained. See FIG. 19 for this.

Figure 20:
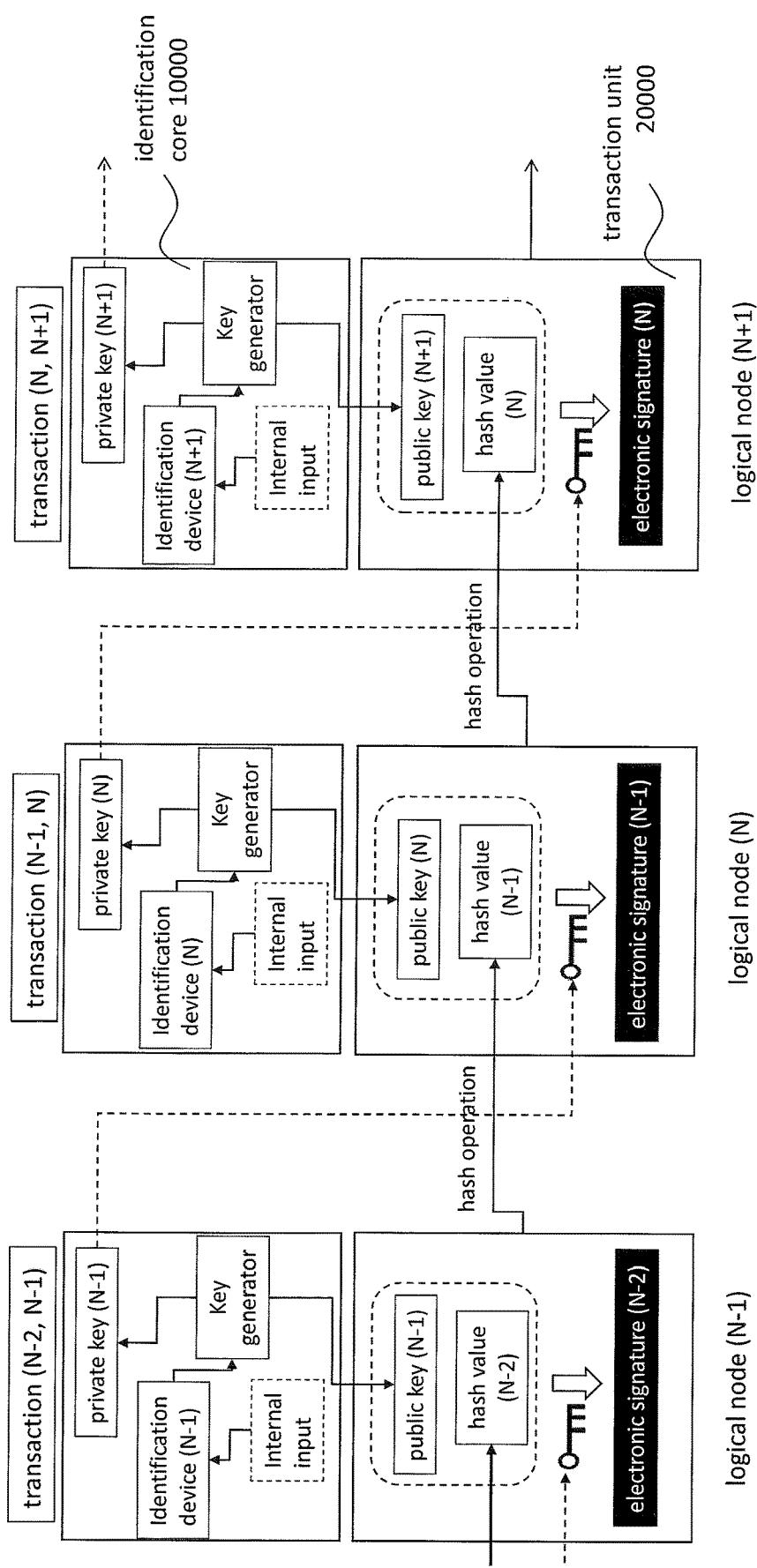
FIG. 20 illustrates an example of the introduction method of the identification core related to the present invention.
Figure 22:
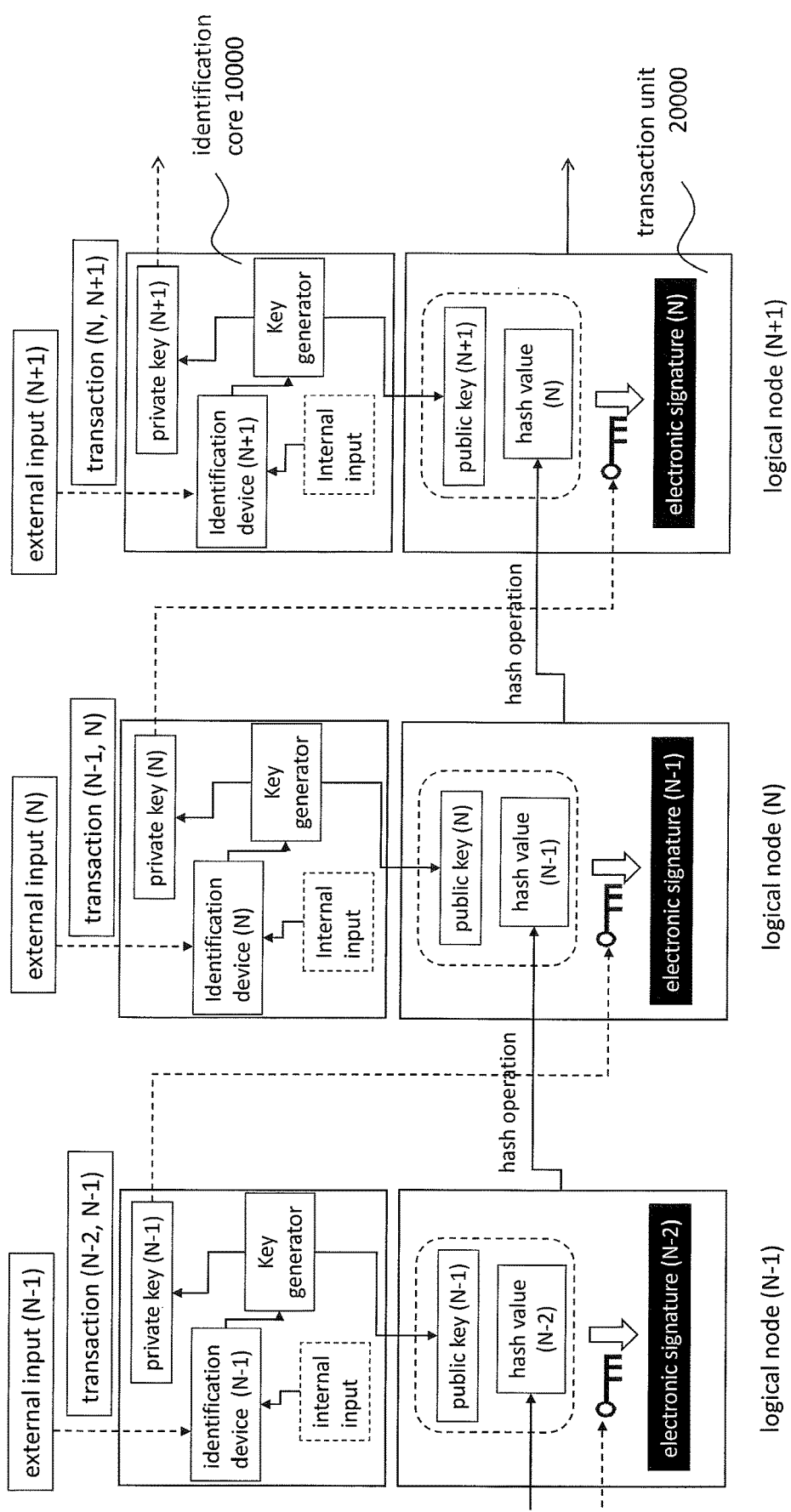
FIG. 22 illustrates an example of the introduction method of the identification core related to the present invention.

By comparing FIG. 21 with FIG. 17, as well as FIG. 22 with FIG. 20, it is obvious that the present embodiment is identical to the second embodiment. Accordingly, other discussions non-related to the external input are all identical and then are omitted here.

In the above, the RSA method to generate the private key and the public key is adopted to explain the second embodiment and the third embodiment. However, this is just an example and not beyond. Any kind of algorithm of key generation may be preferable, as long as the key generator generates a private key and a public key by receiving some kind of input from an identification device.

The fourth embodiment is discussed here.

Figure 24:
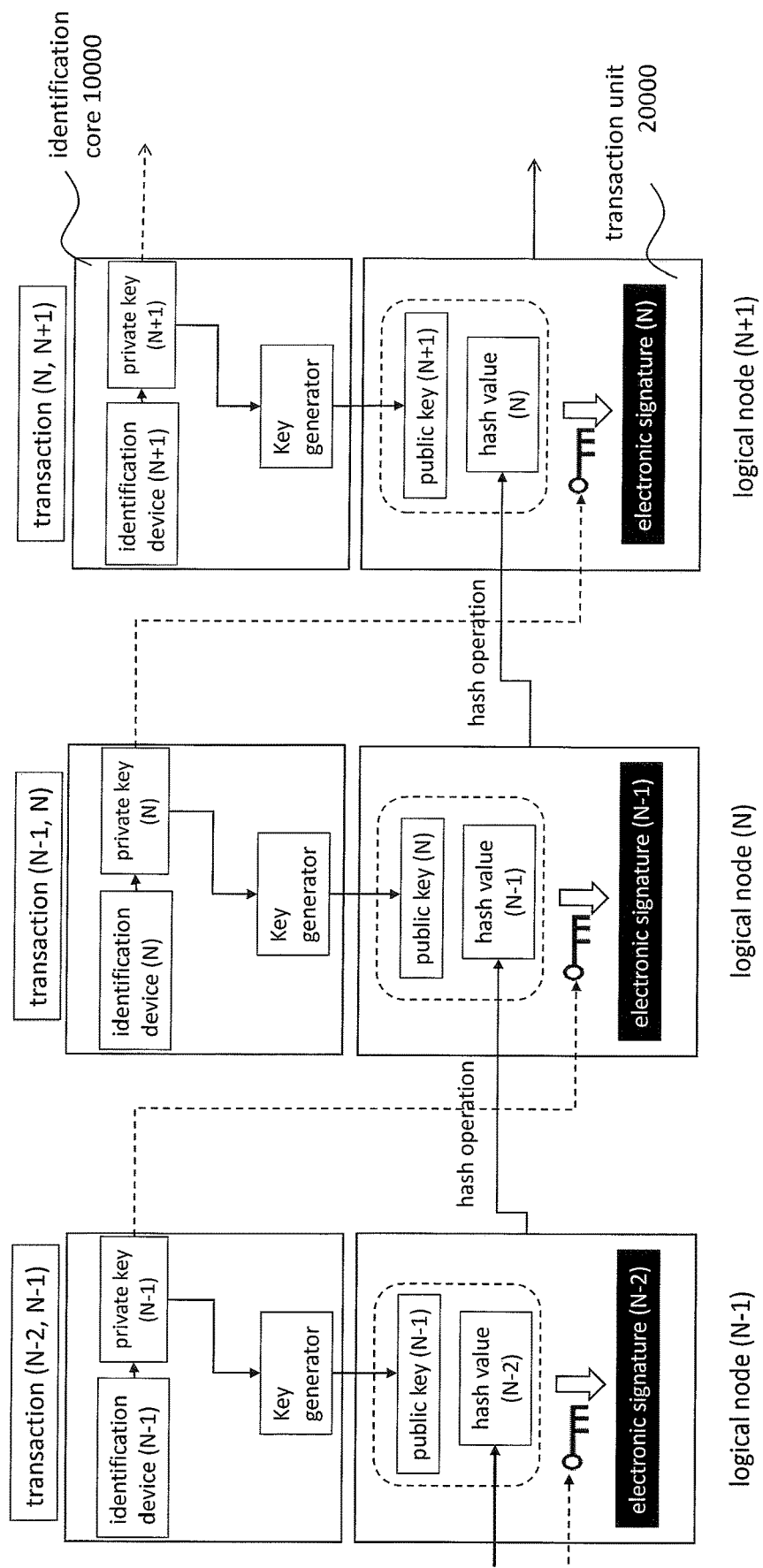
FIG. 24 illustrates an example of the introduction method of the identification core related to the present invention.

FIG. 24 illustrates another example of the identification core 10000.

In the identification core 10000 of the present embodiment, a private key output from the identification device is input to the key generator so as to generate a public key. In this event, the private key and the public key form a unique linkage. There may be a plurality of algorithms of key generation like this. Moreover, it is practically impossible to regenerate a private key from a public key. Among them, one of the most famous ones may be the ElGamal method (which can be seen from an academic paper entitled "A Public-Key Cryptosystem and a Signature Scheme Based on Discrete Logarithms"). Hereinafter, the method that the key generator generates a public key from a private key may be called ElGamal type.

In the ElGamal method, at first, a large prime number "p" and its primitive root "g" may be given. The prime number "p" and the primitive root "g" may be selected according to a designed specification and then can be stored in the key generator or in another module of the identification core. Next, a non-negative integer "x" smaller than p−1 may be randomly selected to be a private key. In the present embodiment, as an example, it may be possible for an appropriate code conversion to obtain the private key from the physical address of the identification device. Thus, the physical address and the private key are able to be linked to each other. Subsequently, the public key may be the reminder of dividing "g" to the power of "x" by "p." The private key may be confined in the interior of the identification core 10000 or deleted as necessary after use, while only the public key may be forwarded to the transaction unit.

FIG. 18 illustrates an example of the identification device. The identification device generates a private key by converting a physical address with the code convertor. In the present embodiment, as an example, the private key may be the reminder of dividing the physical address of the identification device by p−1. This may be input to a key generator to generate a public key.

Figure 25:
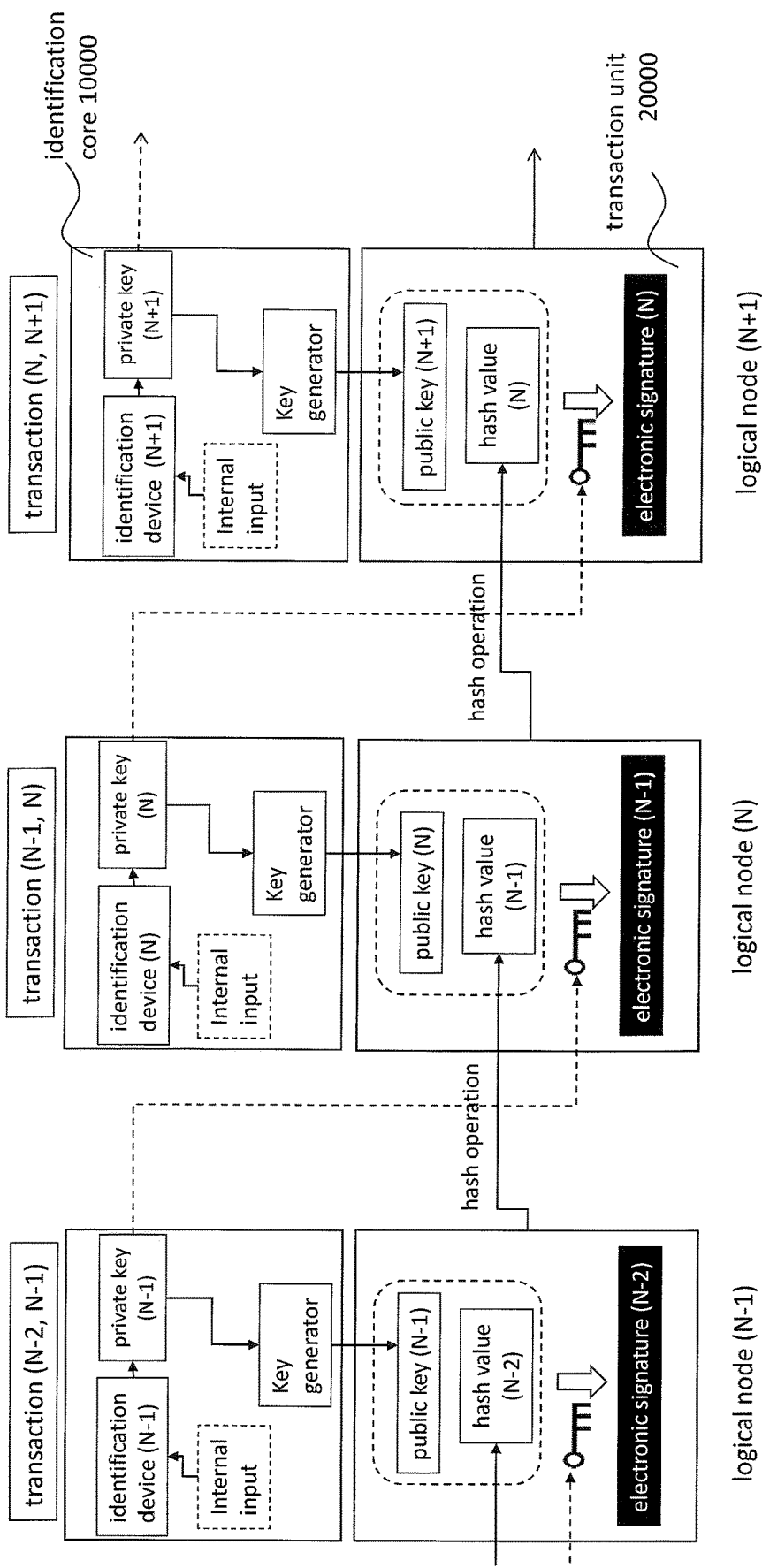
FIG. 25 illustrates an example of the introduction method of the identification core related to the present invention.

As illustrated in FIG. 25, the inner input may be added to an identification device. In other words, the physical address of the identification device and the inner input may be compounded with a certain arithmetic processing. Then, a private key may be generated by dividing it with p−1. This private key may be input to the key generator to generate a public key.

The compound method may be various. For example, it may be the addition, the subtraction, the multiplication and the division, and some combinations of the arithmetic processing, logical operations, and any possible bit operations as possible.

In FIG. 23, the physical address of the identification device and the inner input may be compounded with a certain arithmetic processing. Then, a private key may be generated by dividing it with p−1. This private key may be input to the key generator to generate a public key with the above-mentioned method.

The compound method may be various. For example, it may be the addition, the subtraction, the multiplication and the division, and some combinations of the arithmetic processing, the logical operations, and any possible bit operations as possible.

The fifth embodiment is described below.

Figure 26:
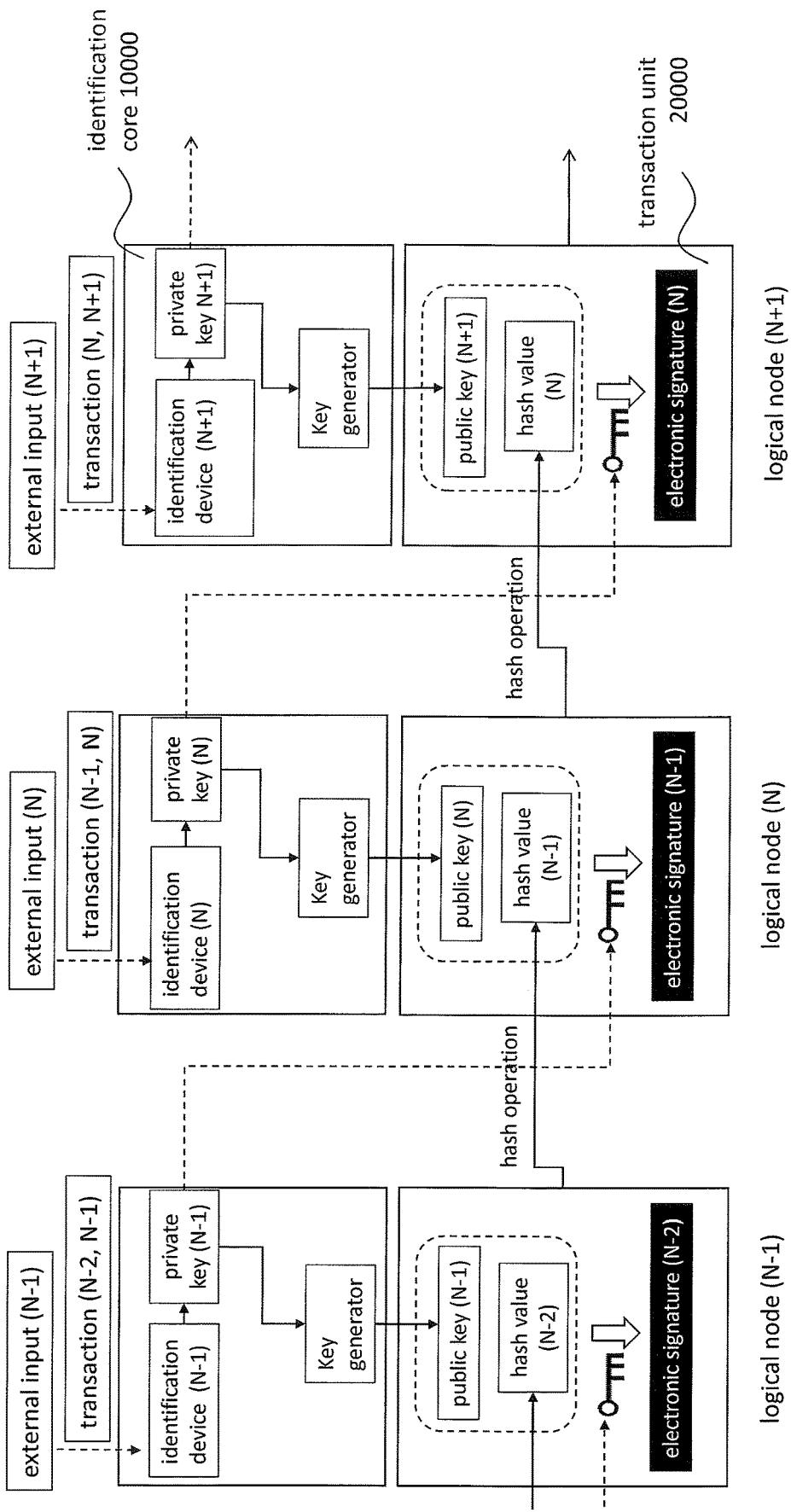
FIG. 26 illustrates an example of the introduction method of the identification core related to the present invention.

As illustrated in FIG. 26, an external input is input to the identification device in the previous embodiment so as to change a generated pair of the private key and the public key. The present embodiment is a modification of the fourth embodiment and is useful for family and friends to share the same terminal. That is, the identification address may be different if the external inputs are different, even though the same terminal is used. Or, the identification address may be different if a different terminal is used, even though an identical external input is used.

Figure 27:
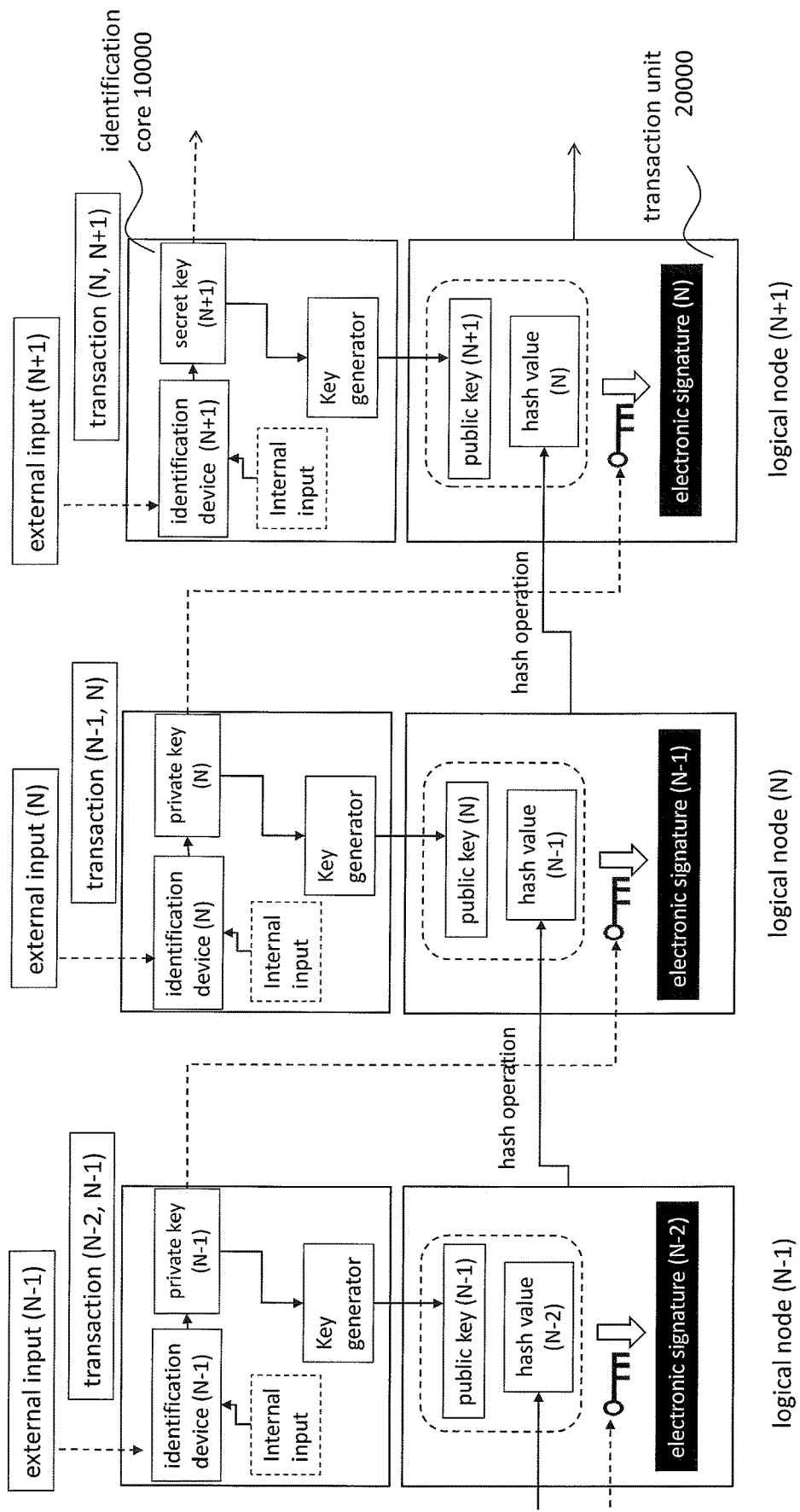
FIG. 27 illustrates an example of the introduction method of the identification core related to the present invention.

The external input is identical to that of the third embodiment and then the detailed explanation is omitted. However, it may be possible to generate the prime number "p" and its primitive root from the external input in the present embodiment, as mentioned below. Moreover, the present embodiment may be used together with an inner input to an identification device, as illustrated in FIG. 27.

In FIG. 23, a physical address of the identification device and an external or inner input may be compounded with a certain arithmetic processing. Thus, a private key may be generated by dividing it with p−1. A public key may be generated with the above-mentioned method by inputting the private key to the key generator.

As an example, at first, a physical address and an external or inner input may be compounded with a certain method. However, this compound method may be all arithmetic processing like the four operations and any combinations of them. The unity may be subtracted from or added to this integer which is obtained herein, and then it may be checked if the obtained number is a prime number or not. If it is a prime number, the obtained number may be a prime number "p." Otherwise, the unity may be further subtracted from or added to it and then it may be checked if the obtained number is a prime number or not. By repeating this procedure, a prime number "p" may be finally defined.

In another example, at first, a physical address and an external or inner input may be compounded with a certain method. Two may be subtracted from or added to the integer which is obtained herein, and then it may be checked if the obtained number is a prime number or not. If it is a prime number, the obtained number may be a prime number "p." Otherwise, two may be further subtracted from or added to it and then it may be checked if the obtained number is a prime number or not. By repeating this procedure, a prime number "p" may be finally defined.

However, other than the unity or two, it may be possible that an arbitrary integer (j) is added to or subtracted from an integer (i) to be obtained by compounding a physical address and an external or inner input, in order to obtain a prime number "p." Or, it may be also possible to repeat the compound of "I" and "j" until the compound number becomes a prime number.

However, the compound method may be all arithmetic processing like the four operations and any combinations of them. Anyway, as long as the physical address or the external or inner input is a sufficiently large figure, "p" may be also a sufficiently large prime number.

It may be able to obtain a sufficiently large prime number with any of the above-mentioned methods or with a further different method.

Moreover, as an example, it may be preferable that an external input is a primitive root "g." Or, as another example, it may be preferable that the external and inner inputs are compounded with a certain method to generate a primitive root "g." However, this compound method may be all arithmetic processing like the four operations and any combinations of them.

In the above, the fourth and fifth embodiments have been illustrated by assuming that the generation method of the public-private keys is an ElGamal type. However, this may be one of the examples and not beyond. It may be preferable to adopt any other algorithm as long as a public key is generated by inputting a private key to a key generator, as illustrated in FIGS. 24, 25, 26, and 27.

It may be obvious by comparing FIG. 26 with FIG. 24, FIG. 27 with FIG. 25, and FIG. 23 with FIG. 18 that, the present embodiment is identical to the fourth embodiment if an external input excluded. Accordingly, the detailed explanations non-related to an external input may be similar to that of the fourth embodiment and then may be omitted here.

Sixth embodiment is discussed below.

The physical address (the physical addresses in FIGS. 18 and 23 as an example) may be a code for the individual authentication of the information apparatuses, which has been set up with some kind of method with or without the ability to edit. As an example, it may be a MAC address.

The Seventh embodiment is discussed below.

The physical address (the physical address of FIGS. 18 and 23 as an example) may be generated from some kind of physical randomness to be extracted from the cell array inside of a semiconductor chip having a physical substance. Such a chip may be called an identification chip.

Figure 28:
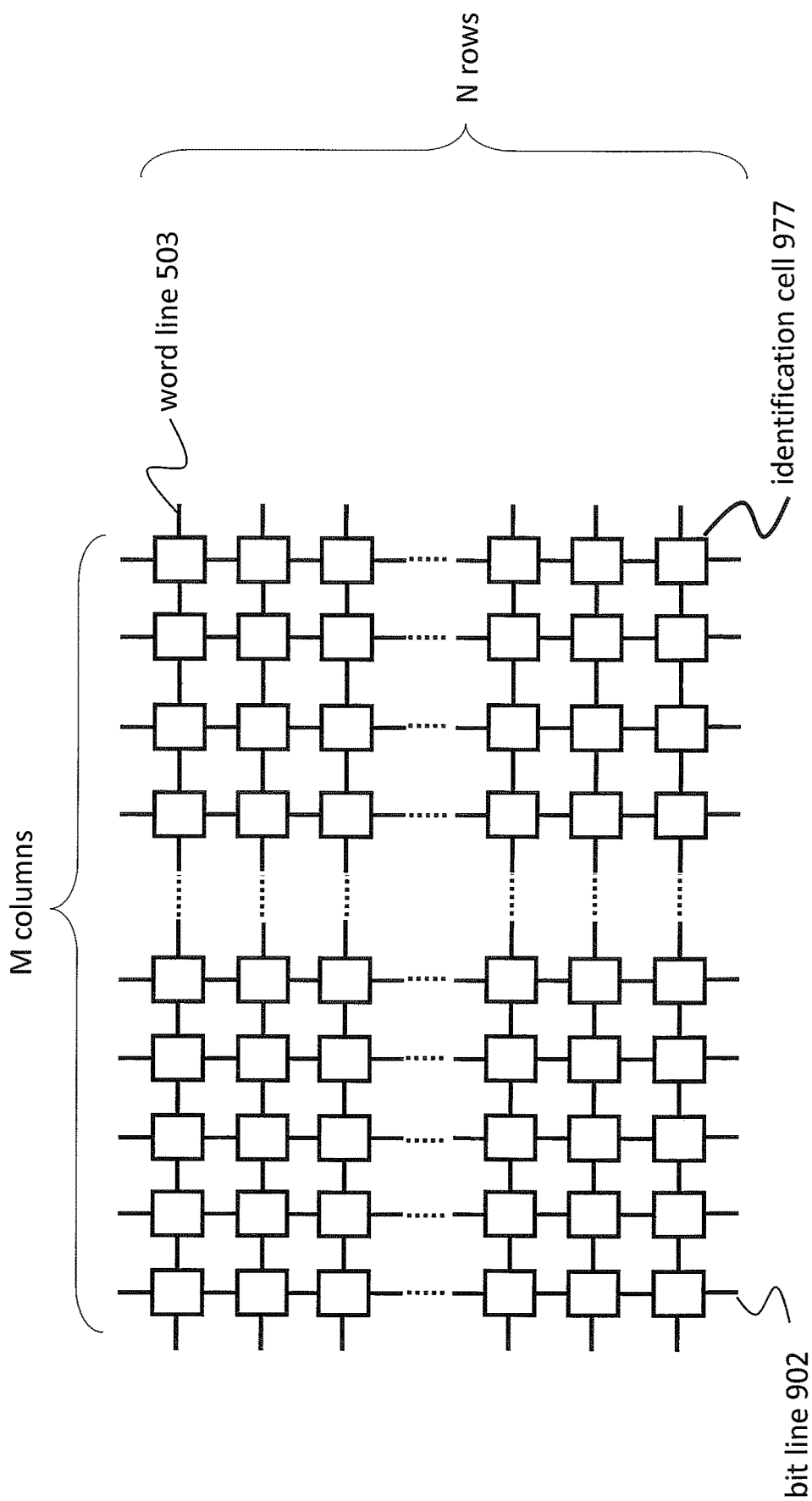
FIG. 28 illustrates an example of the cell array of the identification cells related to the present invention.

FIG. 28 illustrates an example of the cell array including the word lines 503 and the bit lines 902. There are identification cells 977 on the cross points of the word lines 503 and the bit lines 902. In this example, the number of rows (word lines) is N and the number of columns (bit lines) is M. However, it may be able to exchange the rows and the columns.

As an example, the identification cells have at least two terminals (the first and second terminals), respectively. One of a word line 503 and a bit line 902 is connected to the first terminal and the other is connected to the second terminal.

Figure 29:
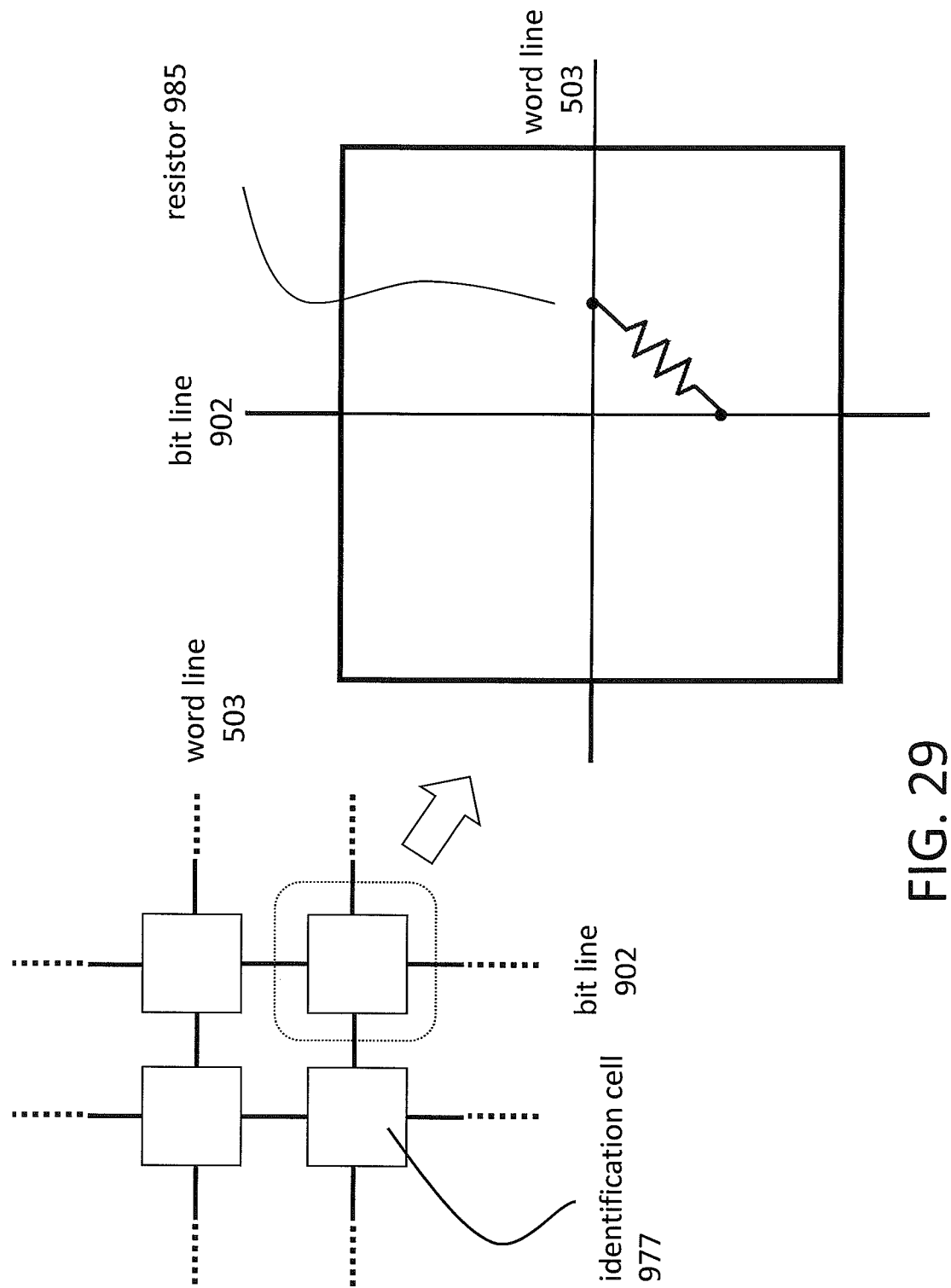
FIG. 29 illustrates an example that an identification cell related to the present invention is a resistor.
Figure 30:
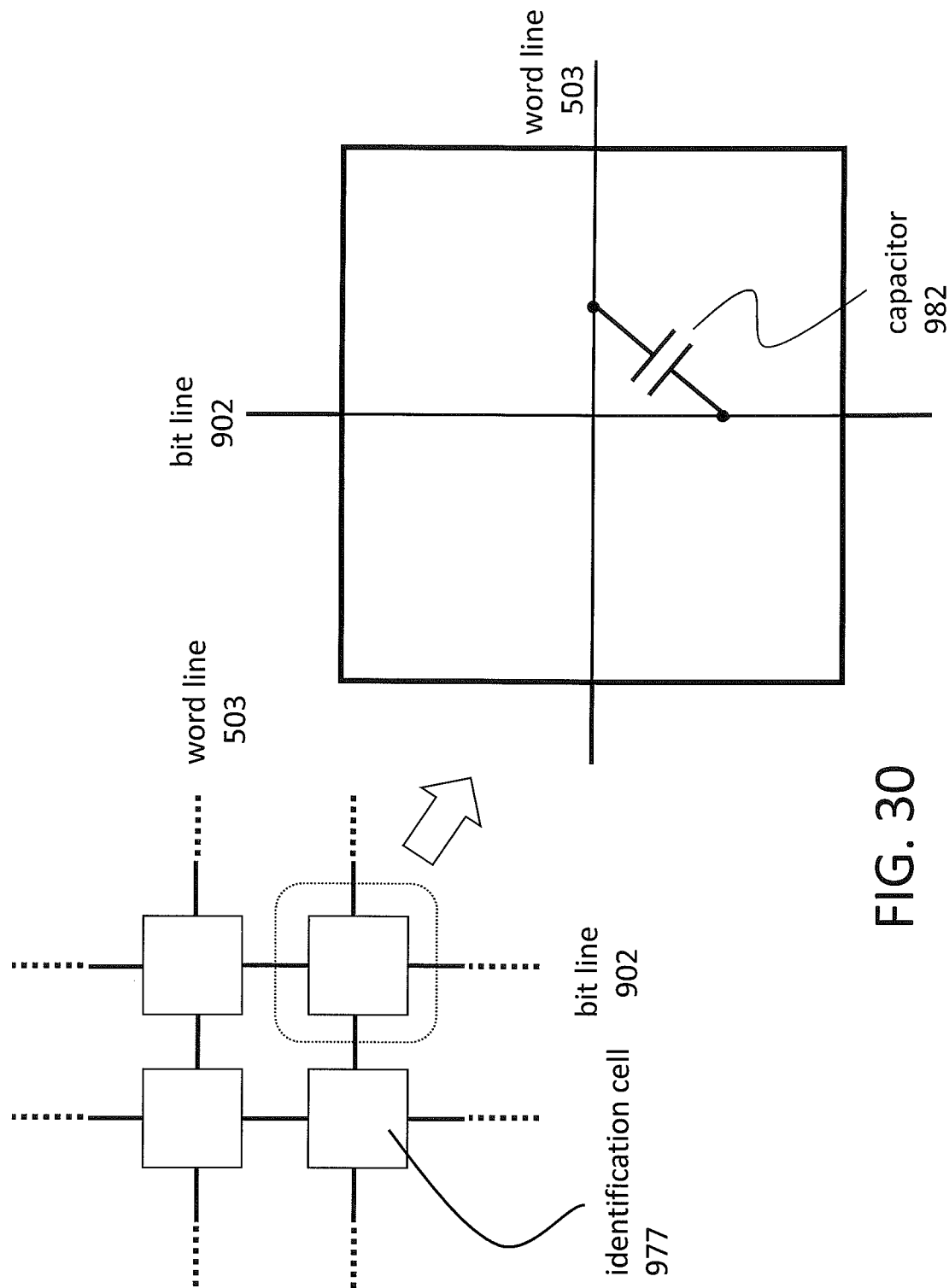
FIG. 30 illustrates an example that an identification cell related to the present invention is a capacitor.
Figure 31:
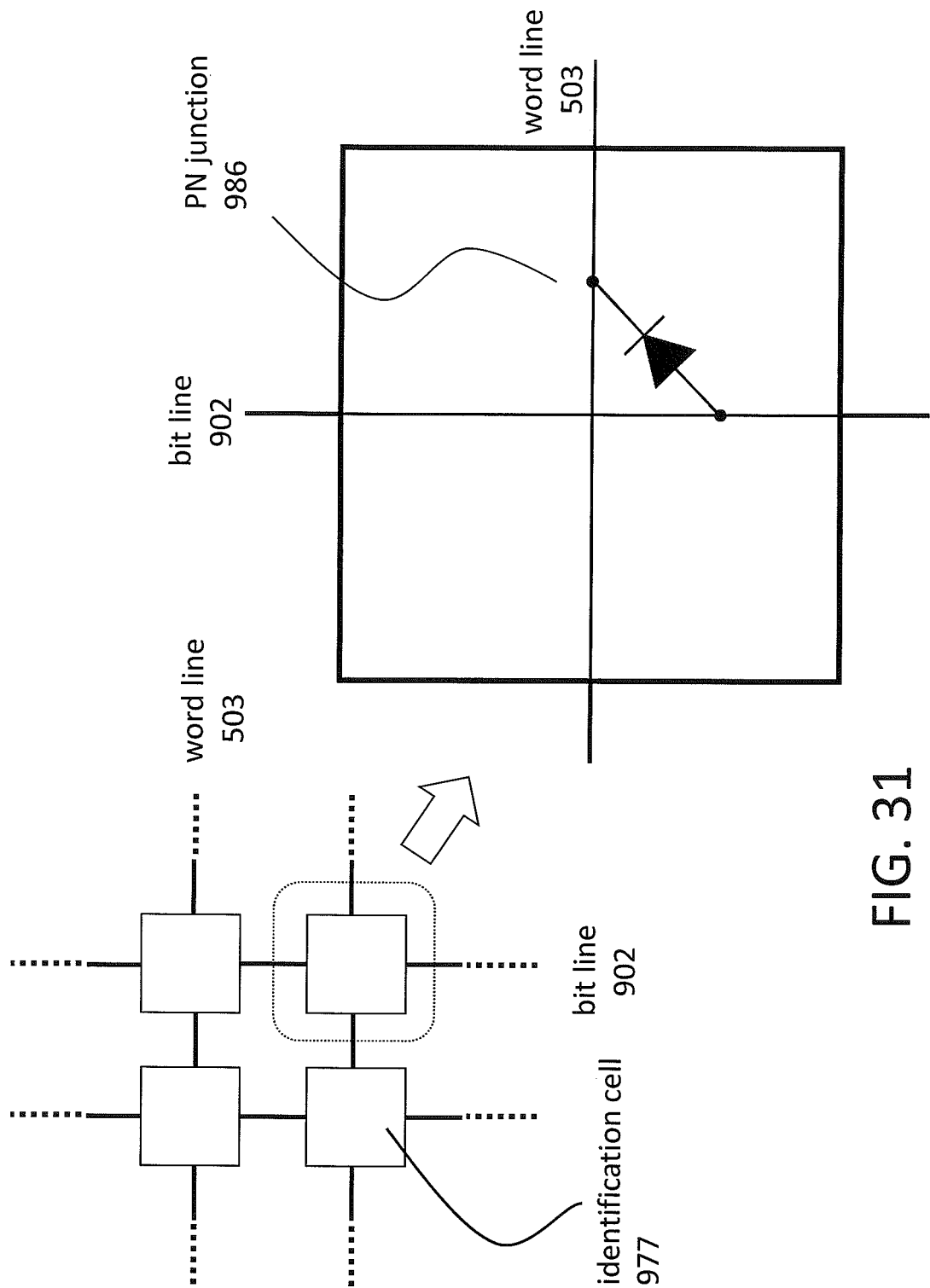
FIG. 31 illustrates an example that an identification cell related to the present invention is a PN junction.
Figure 32:
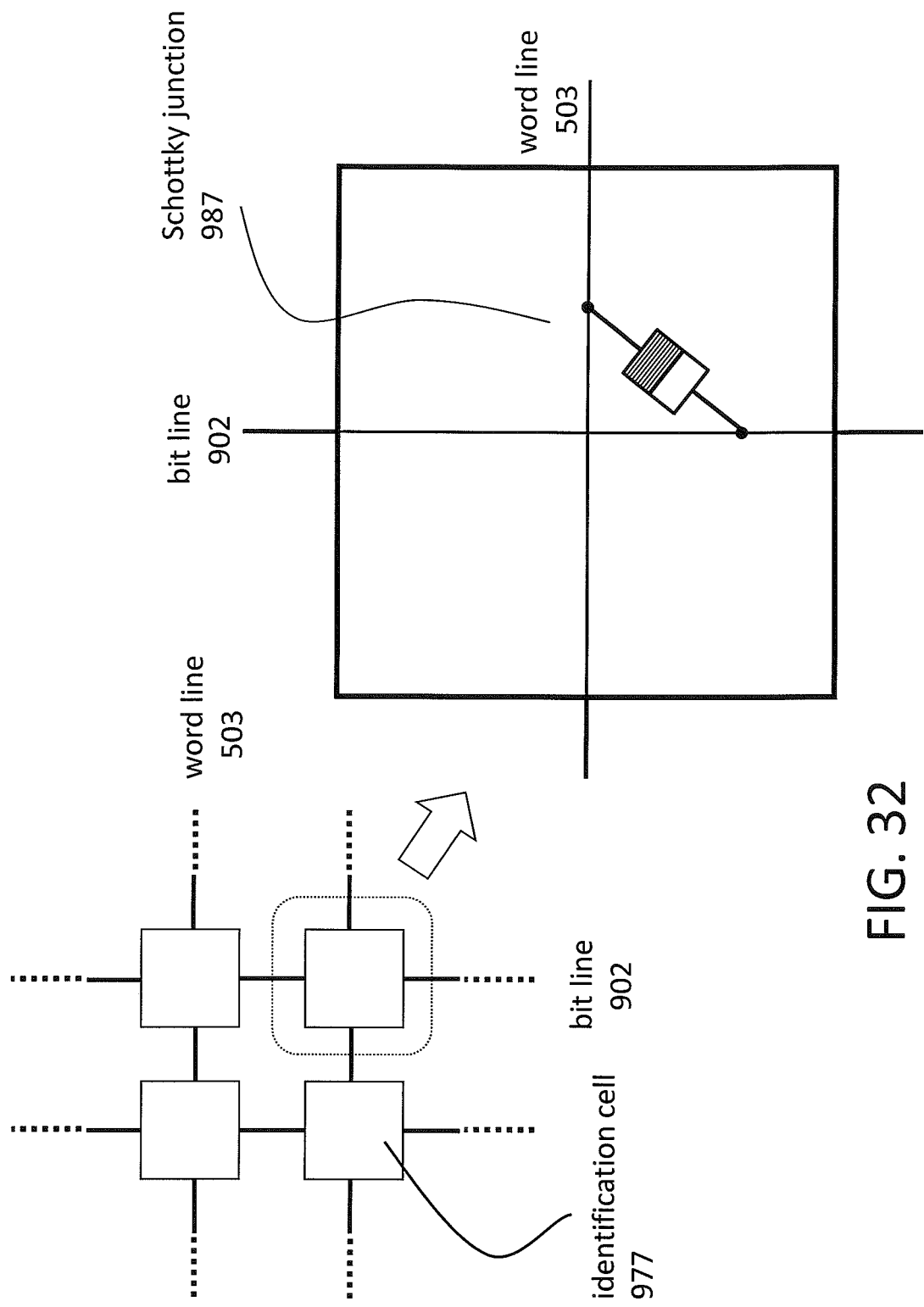
FIG. 32 illustrates an example that an identification cell related to the present invention is a Schottky junction.
Figure 33:
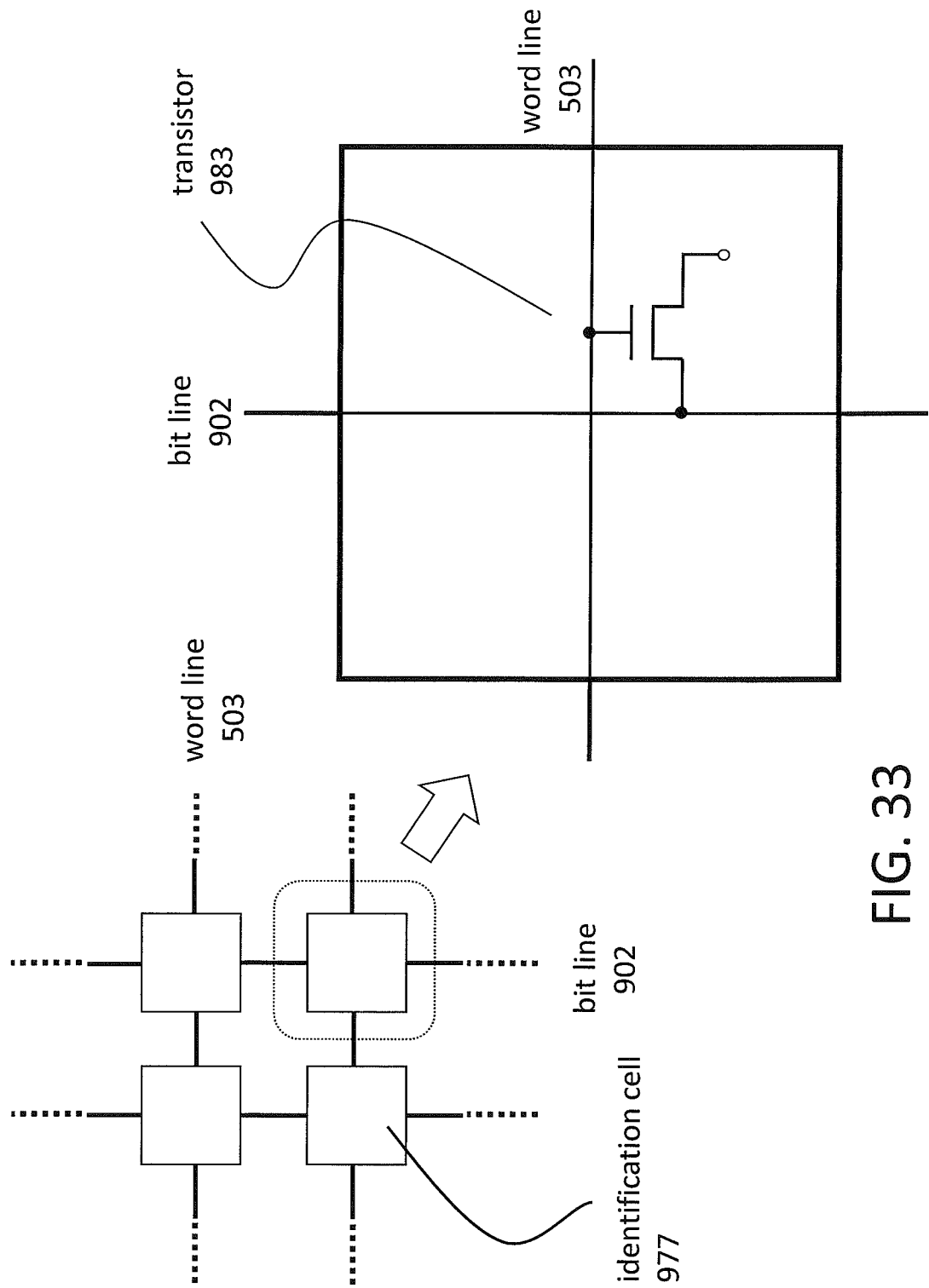
FIG. 33 illustrates an example that an identification cell related to the present invention is a transistor.
Figure 34:
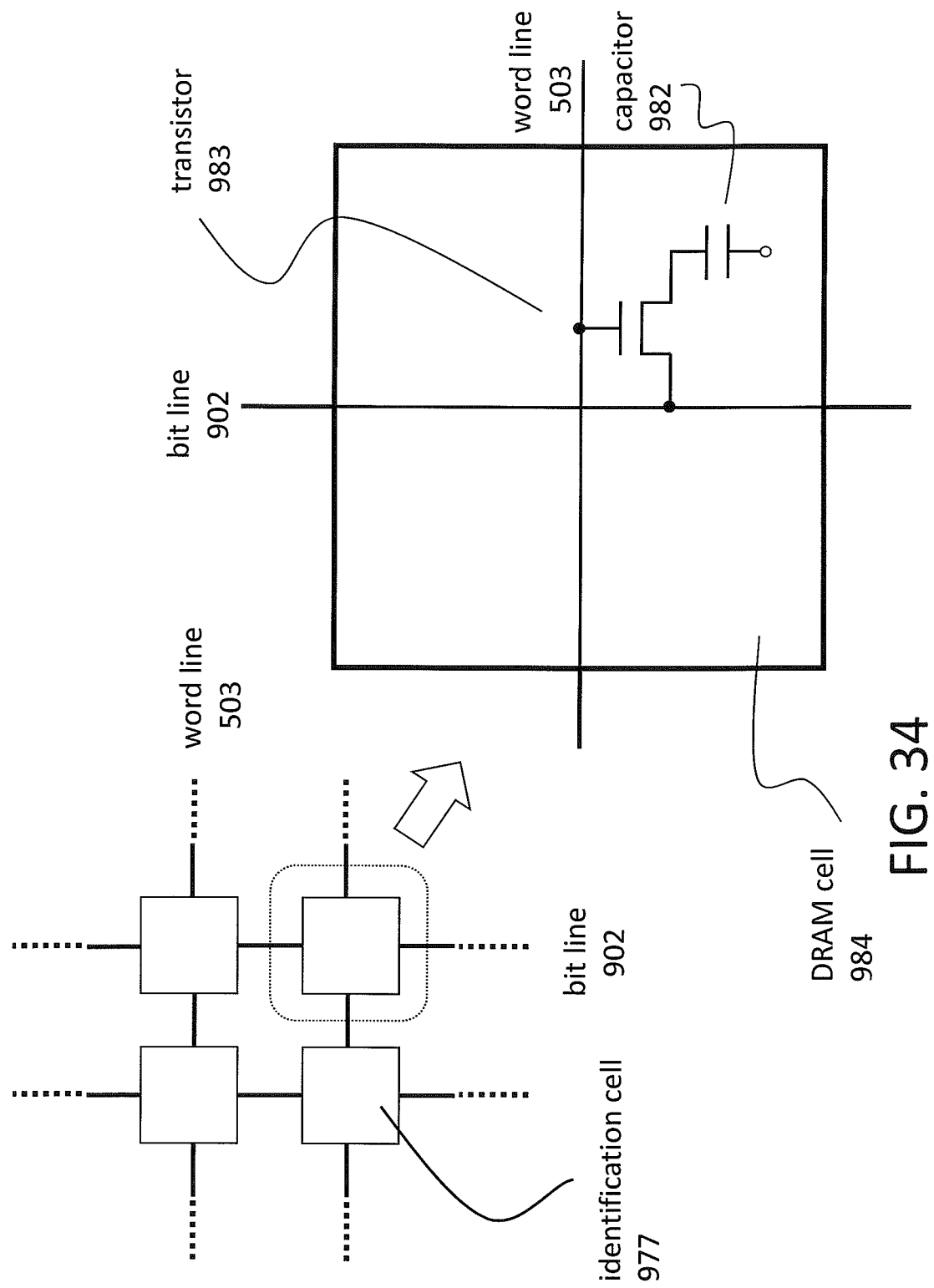
FIG. 34 illustrates an example that an identification cell related to the present invention is a DRAM memory cell including a transistor and a capacitor.
Figure 35:
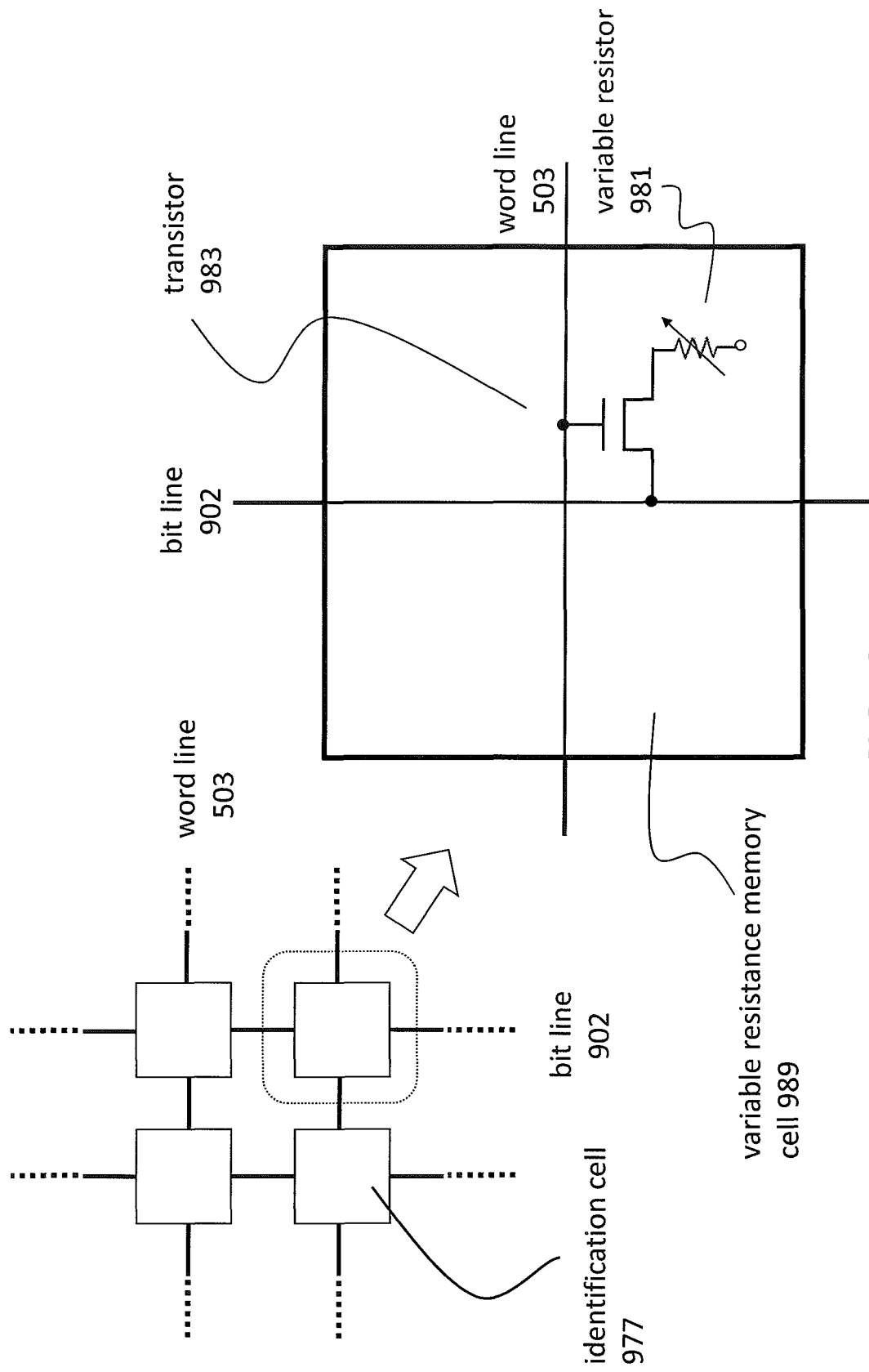
FIG. 35 illustrates an example that an identification cell related to the present invention is a variable resistor memory cell including a transistor and a variable resistor.
Figure 36:
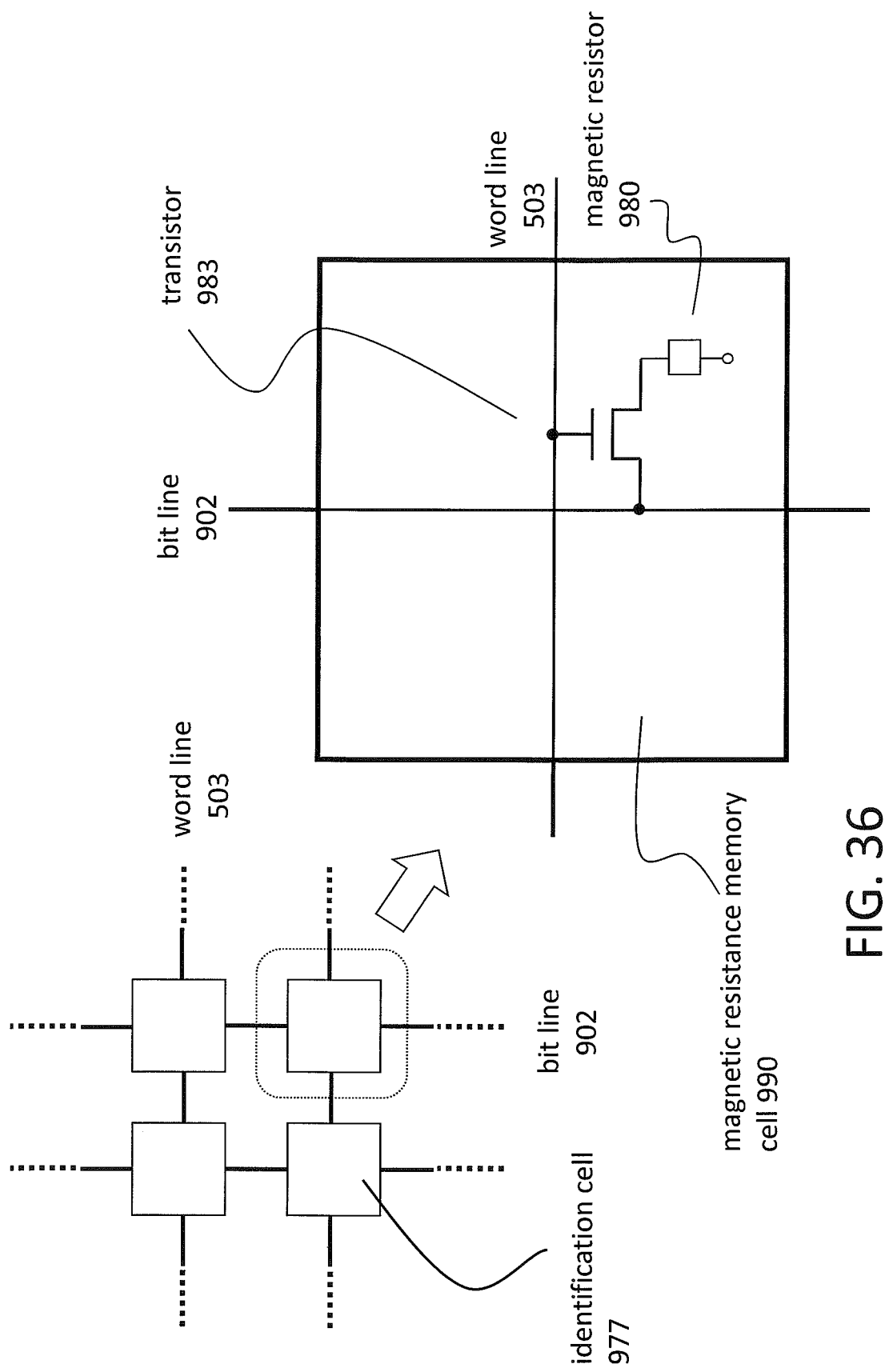
FIG. 36 illustrates an example that an identification cell related to the present invention is a magnetic resistor memory cell including a transistor and a magnetic resistor.
Figure 37:
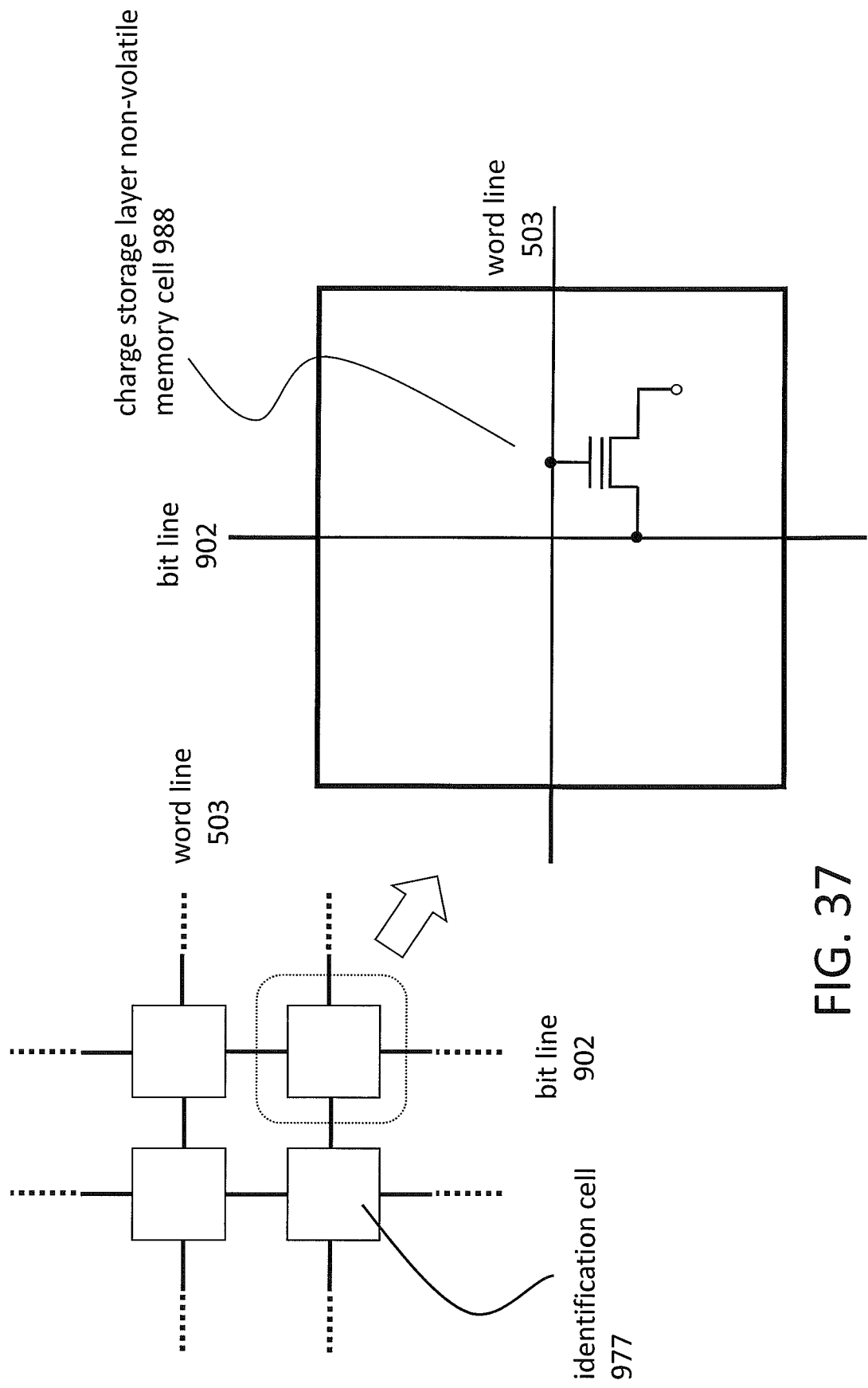
FIG. 37 illustrates an example that an identification cell related to the present invention is a non-volatile memory cell including a transistor having a charge storage layer.

The identification cell 977 may be a resistor 985 as illustrated in FIG. 29, a capacitor 982 as illustrated in FIG. 30, a PN junction 985 as illustrated in FIG. 31, a Schottky junction 987 as illustrated in FIG. 32, a transistor 983 as illustrated in FIG. 33, or a DRAM cell 984 including a transistor 983 and a capacitor 982 as illustrated in FIG. 34. Or, if the capacitor in FIG. 30 or 34 is replaced with a ferroelectric capacitor, it may be a ferroelectric memory cell (FeRAM). Or, it may be a variable resistance memory cell 989 including a transistor 983 and a variable resistor 981 as illustrated in FIG. 35. If this variable resistor 981 is controllable with voltage application, this variable resistance memory cell 989 is ReRAM. Or, if this variable resistor 981 is controllable with heating, the variable resistance memory cell 989 is PCRAM. Or, it may be a magnetic resistance memory cell 990 including a transistor 983 and a magnetic resistor 980 as illustrated in FIG. 36. If this magnetic resistor is a GMR film, this magnetic resistance memory cell 990 is MRAM. Or, if this magnetic resistor is a SIT film, the magnetic resistance memory cell 990 is STT-MRAM. Or, it may be a charge storage layer non-volatile memory cell 988 as illustrated in FIG. 37. The charge storage layer may be a charge trapping layer or floating gate.

However, the register 985 is a resistor cell having a resistance with measurable resistibility, or a conductor cell having a conductance with measurable conductivity. The capacitor 982 has a structure where a dielectric with measurable permittivity is sandwiched between the conductive components. The PN junction 986 is a kind of semiconductor cells having the rectification of junction between the p-type semiconductor and the n-type semiconductor. The Schottky junction 987 is a kind of semiconductor cells of junction between the metal and the semiconductor. The transistor 983 is a kind of solid-state amplifiers having a gate capacitor between the source and drain regions. Or, it is a bipolar type solid-state amplifier having a base region between emitter and collector regions.

Figure 38:
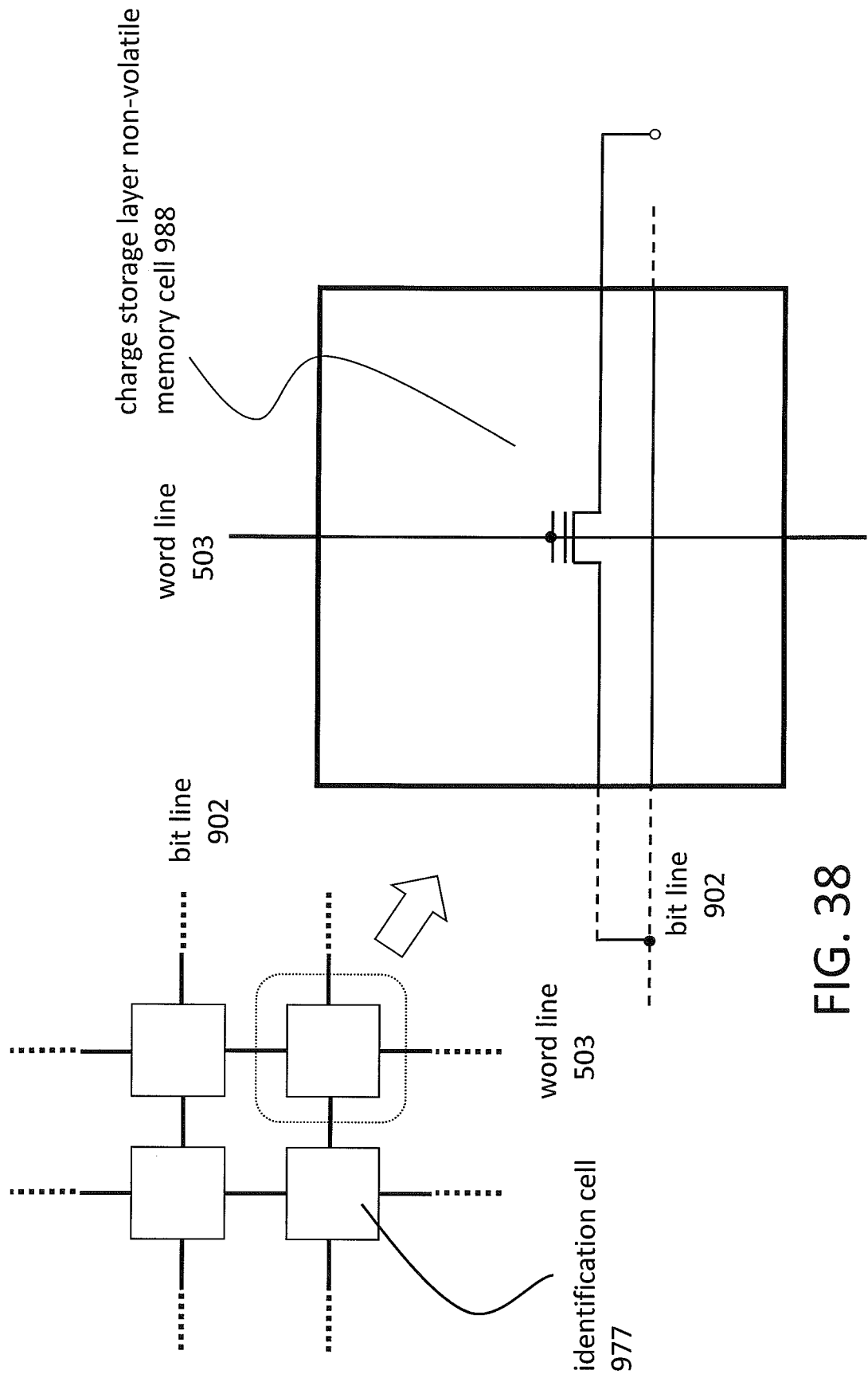
FIG. 38 illustrates an example that the identification cells related to the present invention are a non-volatile memory cell including a transistor having a charge storage layer and distributed on the NAND-type cell array.
Figure 39:
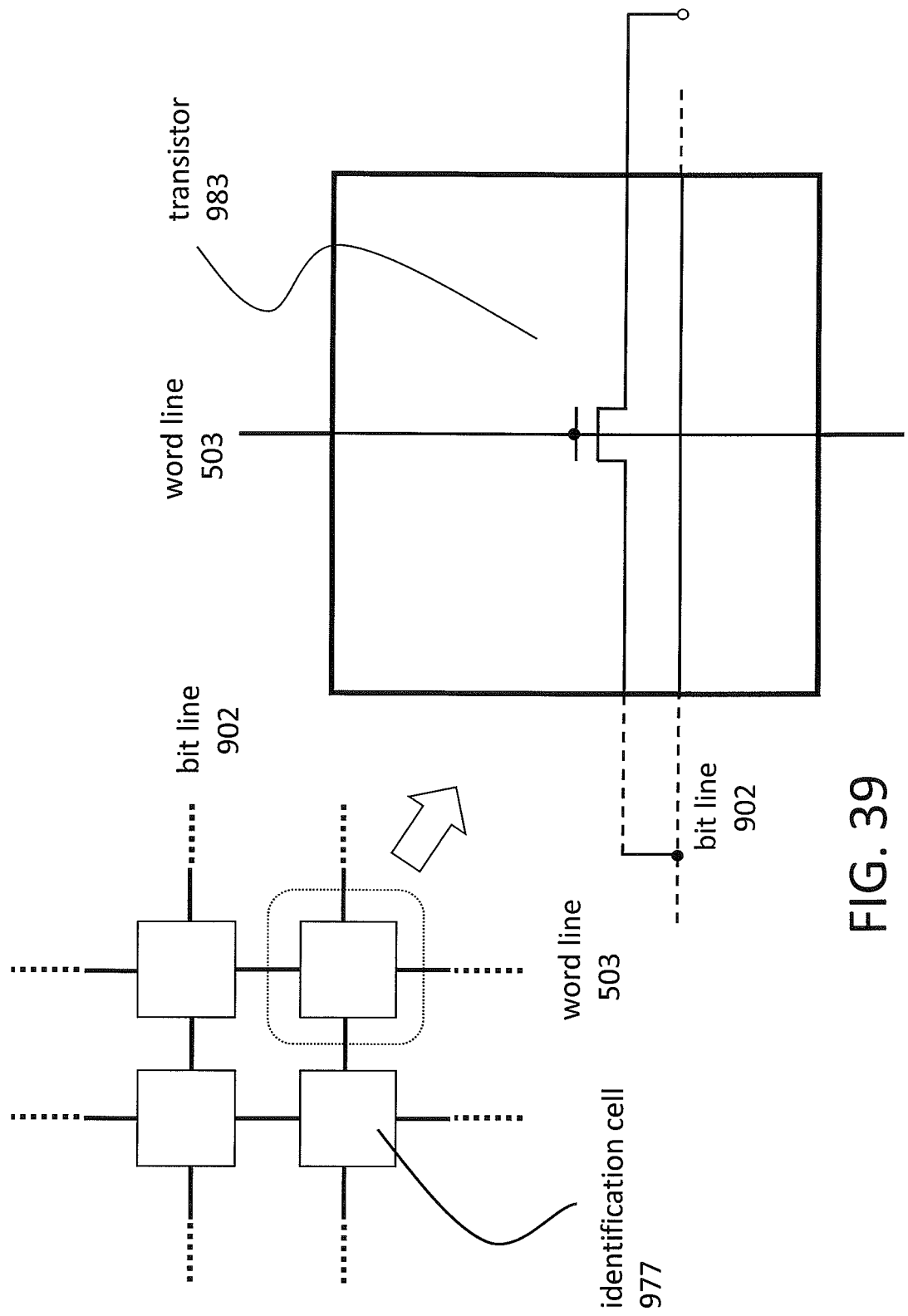
FIG. 39 illustrates an example that the identification cells related to the present invention are transistors and distributed on the NAND-type cell array.

Or, it may be a charge storage layer non-volatile memory cell 988 distributed on the NAND type cell array where the bit line contacts are removed on purpose, as illustrated in FIG. 38. Or, it may be a transistor 983 distributed on the NAND type cell array where the bit line contacts are removed on purpose, as illustrated in FIG. 39.

Figure 40:
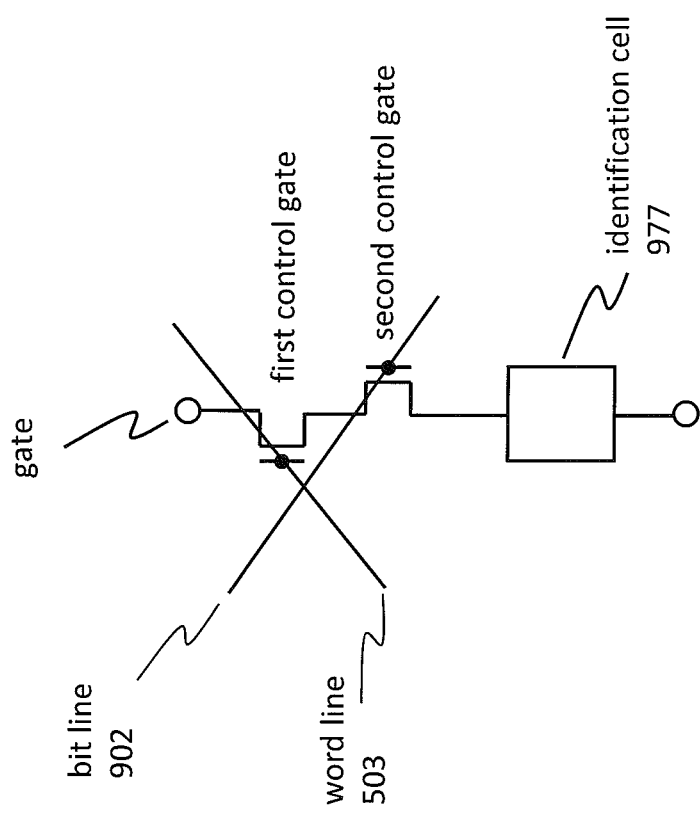
FIG. 40 illustrates an example of the access methods to access the identification cell related to the present invention.
Figure 41:
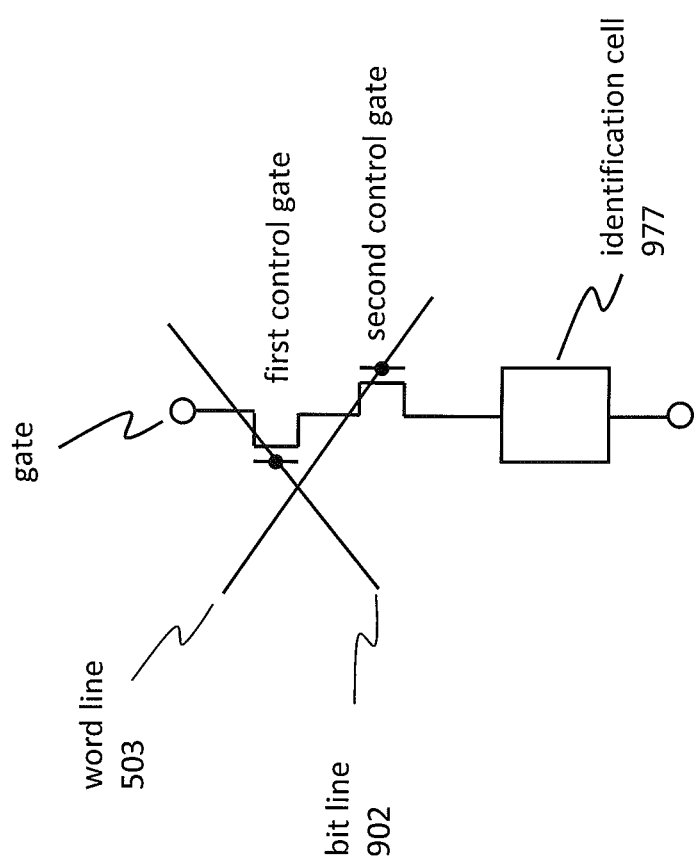
FIG. 41 illustrates an example of the access methods to access the identification cell related to the present invention.

FIGS. 40 and 41 illustrate another example to select the gate and to access an identification cell 977 with the bit line 902 and the word line 503. The identification cell 977 in this example is identical to those mentioned above and then the detailed explanation may be omitted here. In FIG. 40, the first control gate is connected to the word line 503 and the second control gate I connected to the bit line 902. In FIG. 41, the first control gate is connected to the bit line 902 and the second control gate is connected to the word line 503.

Anyway, it may be possible to obtain a physically random identification which is proper to a chip from the cell array including the word lines 503, the bit lines 902 and the identification cell 977.

Below, an example is illustrated.

At first, a word line is selected by the word line decoder and a bit line is selected by the bit line decoder. An identification cell associated to those selected word line and bit line may be a selected cell.

Figure 42:
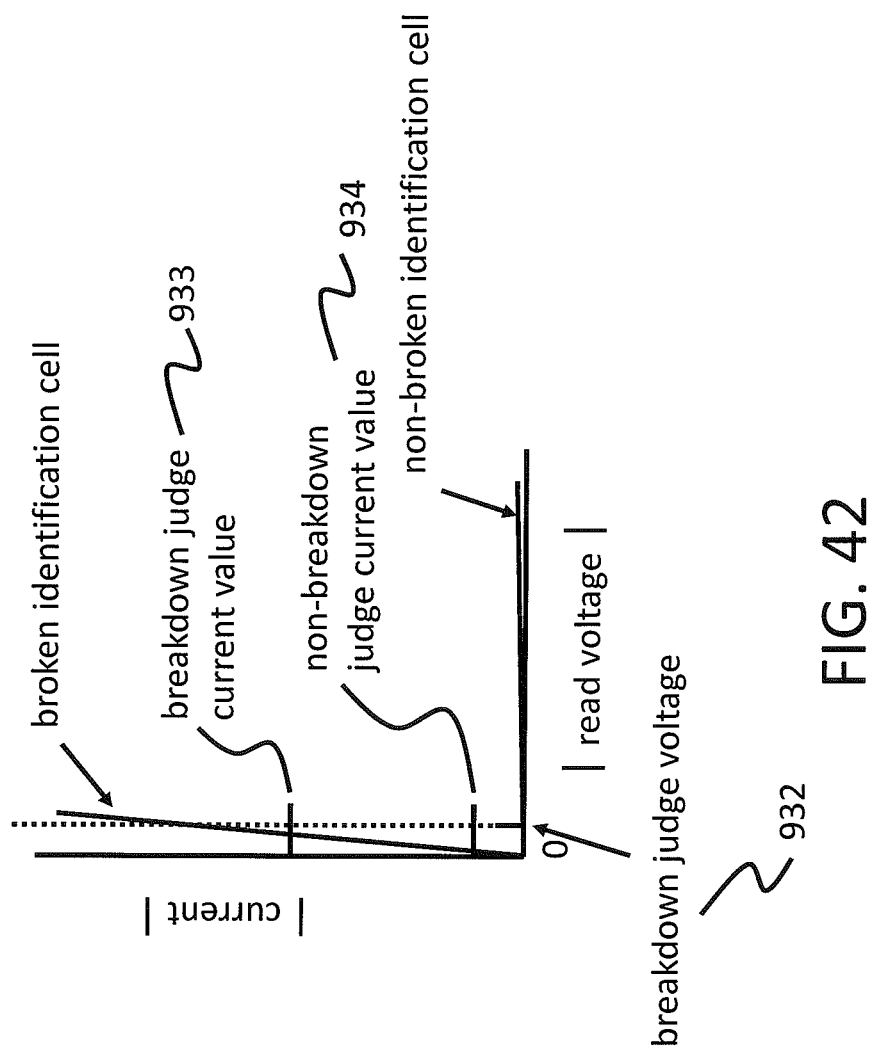
FIG. 42 illustrates an example of the methods to judge if the identification cell related to the present invention is broken or not.

However, there are mainly two kinds of identification cells. The first one is, as illustrated in FIG. 42, easy to flow electric current therethrough when a read voltage is applied if it is broken and hard to flow otherwise. Accordingly, to judge if it is broken or not, it may be checked if the absolute value of the electric current is higher than the breakdown judge current value 933 or lower than the non-breakdown judge current value 934 when the breakdown judge voltage 932 is applied.

Figure 43:
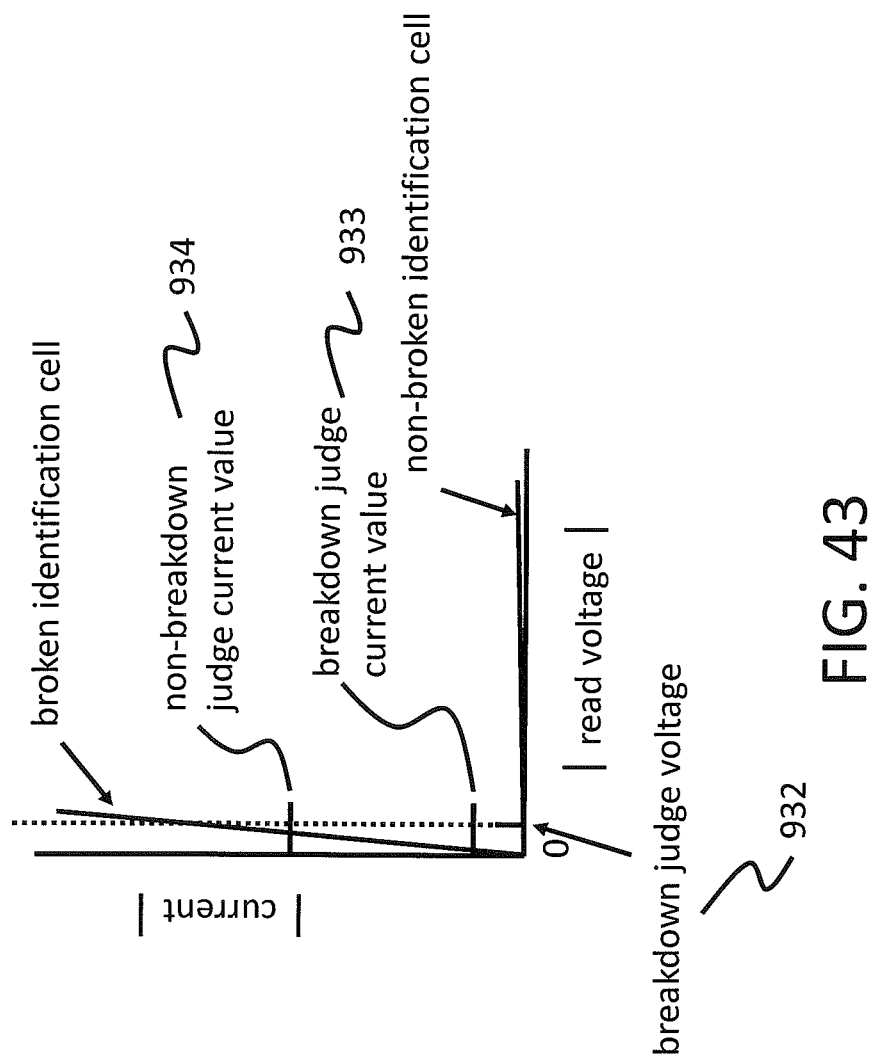
FIG. 43 illustrates an example of the methods to judge if the identification cell related to the present invention is broken or not.

The second one is, as illustrated in FIG. 43, hard to flow electric current therethrough when a read voltage is applied if it is broken and easy to flow otherwise. Accordingly, to judge if it is broken or not, it may be checked if the absolute value of the electric current is higher than the non-breakdown judge current value 934 or lower than the breakdown judge current value 933 when the breakdown judge voltage 932 is applied. It is noted that the breakdown judge current value 933 is lower than the non-breakdown judge current value 934 in the second type; and vice-versa in the first one.

Note the address of the bit cell including an identification cell which has been judged as broken (broken bit) is a sequence of the word line number and the bit line number. If a plurality of cells is selected among a group of identification cells on the cell array and then read out with the method illustrated in FIGS. 42 and 43, a plurality of broken bits may be generally found. If the addresses of the plurality of broken bits are layout and represented by code, the code corresponding to the distribution of the broken bits (identification code) is obtained. As long as the generation of the broken bits is physically random, it may be able to obtain an identification code which is proper to a chip and physically random.

Suppose Q is the number of the broken bits and R is the number of the selected cells. However, Q is smaller than R. In this event, the number of the cases for the identification code is the same as the number of the cases to select Q among R. In other words, the number of the cases for the identification code may be extremely large, as long as R is large enough and the generation rate of the broken bits is not negligibly small.

In the case that R is 1 G (1,000,000,000) and Q is 1 K (1,000), the number of the cases for the identification code is about 2.5 times ten to the power of 6,432. In other words, when one trillion (ten to the power of 12) chips are manufactured to satisfy the condition of the trillion nodes, the possibility that two different chips accidentally have an identical identification code is the inverse of 2.5 times ten to the power of 6,420 (4E−6,421). Even though one hundred trillion chips are manufactured, the possibility that two different chips accidentally have an identical identification code is the inverse of 4.0 times ten to the power of −6,419 (4E−6,419). This is practically about zero.

Moreover, R=1G and Q=1K is identical to the failure rate of one over one million. That is, even if the bit failure rate of the identification chip is lower than the six sigma (less than 3.4/one million), the possibility that any two different identification chips have an identical physical random number code by chance is regarded as almost zero.

Moreover, according to the idea of the six sigma (less than 3.4/one million), it may not be any problem that 1 k bits are used for a different aim, which is equivalent to one over one million in 1G bits chip products. Accordingly, 1 k bits may be allocated to the identification cells. A half of those cells may be randomly broken by applying some kind of stress to the cell array for the identification cells. In this event, the number of the cases for the identification code is 2.7 times 10 to the power of 299. Even if 100 trillion identification chips are distributed, the possibility that any two different identification chips have an identical identification code by chance would be 2.7 times 10 to the power of −285 (3.7E−286). This is practically almost zero.

The stress may be various such as an electrical stress, an optical stress, a mechanical stress, an electro-magnetic stress, and so forth.

In an example of the electrical stress, at first, the whole cell array for the identification cells are selected simultaneously and then all those cells are applied with a high voltage pulse. Next, those cells are read. If the number of the non-broken bits is smaller than that of the broken ones, only the non-broken bits are selected and a second high voltage pulse may be applied to them. This procedure may be repeated until the number of the non-broken bits is identical to that of the broken-bits.

In an example of the optical stress, x-ray or ultra-violet ray may be irradiated to the cell array for the identification cells before the assembly. The quantity of the irradiation may be tuned to make the numbers of the non-broken and broken bits almost identical. However, the stress may be also applied to the cell arrays other than that of the identification cells. It may be a useful method, if the whole chip is used for the cell array for the identification cells.

In an example of the mechanical stress, an identification chip may be bent. However, the stress may also be applied to the cell arrays other than that of the identification cells. It may be a useful method, if the whole chip is used for the cell array for the identification cells.

In an example of the electro-magnetic stress, the identification chip may be exposed to a strong electro-magnetic field. However, the stress may also be applied to the cell arrays other than that of the identification cells. It may be a useful method, if the whole chip is used for the cell array for the identification cells.

Moreover, it may be preferable to tune the process target in the semiconductor chip manufacturing process; such that more failures are generated. As an example, in the case that an identification cell includes a transistor (see FIGS. 33-39), a channel resistance may be increased by tuning the ion implantation condition to increase the threshold voltage (Vth). Or in the case of another example where an identification cell includes a transistor (see FIGS. 33-39.), the gate capacitance of the transistor may be reduced. For example, the thickness of the gate insulating film may be increased, a dielectric having a lower dielectric constant may be inserted into the gate capacitor, the gate area may be decreased and so forth. Or in the case that another capacitor is also included in the identification cell with a transistor (see FIG. 34.), the capacitance of the capacitor may be decreased. For example, the thickness of the insulating film may be increased, a dielectric having a lower dielectric constant may be inserted into the capacitor, the capacitor area may be decreased and so forth.

Moreover, in the case where an identification cell includes a transistor (see FIGS. 33-39.), it may be preferable to vary the circuit parameters of the circuits to be printed in a semiconductor chip, such that more failures are generated. As an example, a switching resistance of an identification cell may be increased by decreasing a potential of a selected line such as a word line. Or, the generation rate of the failures may be increased by shortening the period to detect the data to be read. Anyway, the addresses where those failures are to be generated may be stored in an inner special memory.

Anyway, as long as an identification cell breaks probabilistically, this identification code is physically-randomly generated. In addition, as long as the possibility that any two different identification chips have an identical identification code is practically zero, the identification codes are validated as physical address. Such a physical address may be adopted in the identification device, as illustrated in FIGS. 18 and 21. To this aim, the identification device may include an identification chip.

Like this, it may be possible to generate an identification code by intentionally randomly breaking the identification cells.

Strictly speaking, the broken bits that have been artificially generated should be distinguished from the fail bits that are not necessarily generated artificially. However, they are similar in that they are similar to neither broken bits nor fail bits. In short, the bits may be called the fail bits that are generated artificially or non-artificially, as long as they exhibit a characteristic that has a certain level of deviation larger than a predetermined range.

The eighth embodiment is described below.

In some of the memory chip products, taking into account that the fail bits occur among the memory cells by less than a designed rate, a redundant bit line is saved to take a place of a bit line which has a fail bit. The reason for the fail bits like this is various and diverse, such as the manufacturing variation in the manufacturing process or the components' dispersion spontaneously generated during the forming process. Those redundant bit lines are usually not included in the bit quantity of the memory products. Meanwhile, bit is defined as information quantity which is equivalent to 2-values. If an identification cell can have a value of 0 or 1, the identification cell can have information quantity by 1-bit. The fail bit means that it is unable to read this information quantity of 1-bit from the identification cell under consideration due to some kind of the reasons. Moreover, the method to replace the word lines may be also possible; but the explanation may be omitted because it may be similar. As an example, see FIG. 44.

Figure 44:
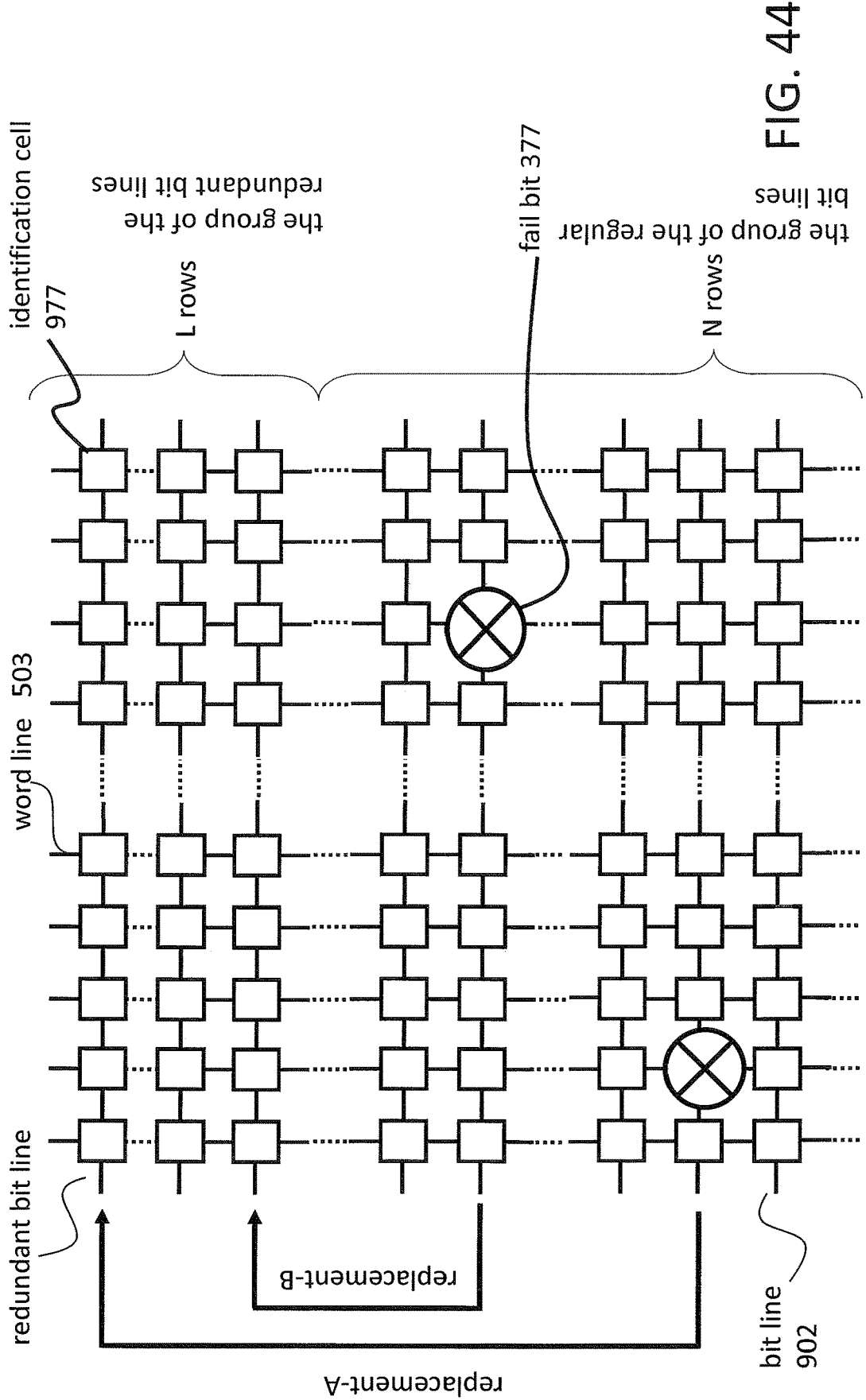
FIG. 44 illustrates an example of the usage methods to use a fail bit among the memory cells.

In FIG. 44, a group of bit lines aligned in the row direction is divided into two groups. One is the group of the redundant bit lines, which includes a plurality of redundant bit lines. The other is the group of the regular bit lines, which includes a plurality of regular bit lines. The number of the rows in the group of the regular bit lines is N, while the row of the group of the redundant bit lines is L. Both N and L are a non-negative integer and N is larger than L. The bit capacity of the memory products corresponds to the number of the cells included in this group of the regular bit lines.

If a fail bit 377 satisfying a given condition is found in the group of the regular bit lines at the pre-shipment inspection, an address of a regular bit line including the fail bit may be replaced by a redundant bit line in the group of the redundant bit lines. Such replacements (the replacement-A and the replacement-B in the drawing) of the regular bit lines including fail bits may be executed so as to effectively exclude those fail bits.

More concretely, it may be preferable to record the bit line numbers of the bit line where a fail bit is found at the pre-shipment inspection and the redundant bit line to replace that bit line in a periphery memory embedded in the peripheral region (such as a fuse memory as an example). In the present embodiment, the information recorded in this periphery memory can serve identically as an identification code or correspond to a physical address in the first-to-sixth embodiment. This physical address may be adopted to the identification device, as illustrated in FIGS. 18 and 21. The identification device may include a memory chip.

The DRAM may be considered as an example to satisfy such a condition. Other examples may be flash memories, ferroelectric memories (FeRAM), phase-change memories (PCRaM), resistivity-change memories (ReRAM), magnetic resistance memories (MRAM), and spin-torque (STT-MRAM) and so forth.

"m" is the number of the regular bit lines including the fail bits to be found at the pre-shipment inspection. The number of the cases for that is identical to the combination of selecting "m" among N, that is, C(N, m). Considering the bit lines including those fail bits may be replaced with which redundant bit lines, the number of the cases must be further produced with the permutation of selecting and lining up "m" among "L." In other words, it is C(N, m)P(L, m). Accordingly, the number of the cases may be about at least C(N, m) even at the lower estimation.

In the case of a typical DRAM product with 4G bits, for example, the number of the redundant bit lines may be 153,000 while the number of the whole bit lines is 6,550,000. That is, at most 153,000 bit lines including the fail bits due to some kind of reason may be acceptable in the group of regular bit lines in the mass-product level. Thus, the number of the cases of the re-allocation to the redundant bit lines may be identical to the combination number of selecting 153,000 among 6,550,000. By the calculation, it can be turned out 10 to the power of 315,289. In other words, even though one hundred trillion identification chips are manufactured, the possibility that two different identification chips accidentally have an identical identification code is 10 to the power of −315,275 (1E−315,275). This is practically almost zero.

Meanwhile, in the present embodiment, the bit lines and the word lines can replace each other. Accordingly, in the case that the word lines are aligned in the row direction for the bit lines, the number of the case of selecting 3,044 word lines among 4,400,000 may be calculated. This is estimated about 2.9 times 10 to the power of 10,938. It is smaller than in the former case but is still an extremely large number. In other words, even though one hundred trillion identification chips are manufactured, the possibility that two different identification chips accidentally have an identical identification code is 10 to the power of −10,924 (1E−10,924). This is practically almost zero.

Thus, it may be possible to generate an identification code having an extremely huge information entropy. It should be noted that no extra bit is consumed to generate the identification code in the present embodiment. That is, the redundant bit lines (or the redundant word lines) have been installed in the memory chip products and the periphery memory to record the information related to the replacement.

The hash values of FIGS. 17, 20, 21, 22, 24, 25, 26 and 27 are transaction information with signature, which are forwarded among the wallets as logical nodes. If the transaction information with the signature has currency quantity, it may be the bitcoin. But it may be an exceptional example and not beyond. Additionally, in any method among FIGS. 17, 20, 21, 22, 24, 25, 26 and 27, the entire works necessary to be executed for the transaction (N, N+1) is completed in the wallet (N). Accordingly, a private key is unnecessary to be exposed into the exterior of the identification core 10000. The private key may be disposed after being used or confined within the identification core 10000.

Referring to FIGS. 17, 20, 21, 22, 24, 25, 26 and 27, it may be illustrated concretely. For example, the electronic signature (N) is generated with the private key (N) as follows. First, the wallet (N) may hash the hash value (N−1) which is a content of the wallet (N) together with the public key (N) and the electronic signature (N−1) so as to generate the hash value (N). This may be temporarily stored in the wallet (N). Next, the wallet (N) may obtain the public key (N+1) which is the logical address of the wallet (N+1) as the destination of the transaction in the network. Subsequently, by using the private key (N) in or confined within the chip of the identification core 10000 linking to the wallet (N), the key generator in the identification core 10000 may encrypt the hash value (N) together with the public key (N+1), so as to generate the electronic signature (N). Finally, the generated electronic signature (N) and the hash value (N) may be forwarded to the wallet (N+1).

The code converter in FIGS. 18 and 23 may be used to convert a physical address into a value suitable to be input to the key generator. Although not illustrating it by the drawing since it is self-evident, the code converter may be a dummy device to do nothing in the case that such a conversion is unnecessary. In this event, the identification device may input a physical address directly to the key generator.

Figure 45:
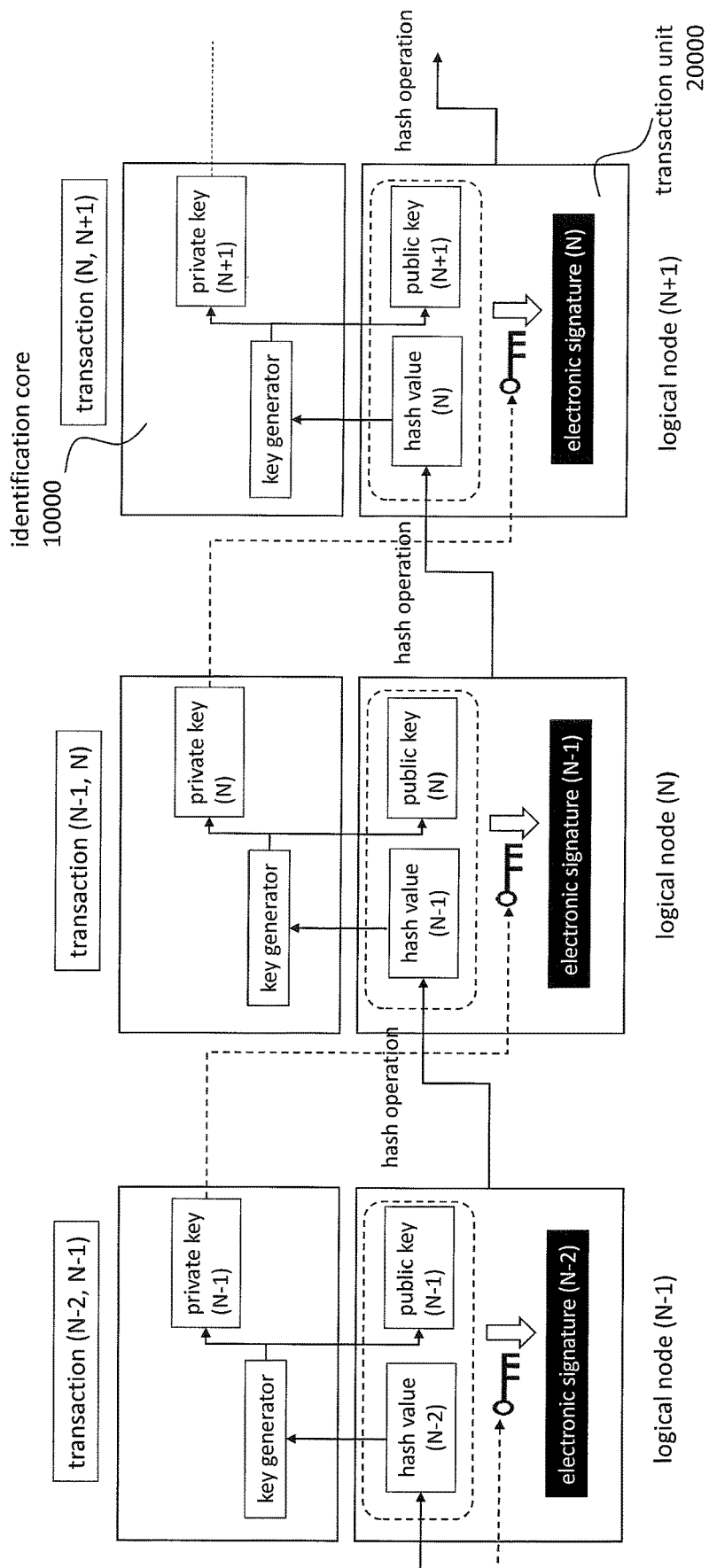
FIG. 45 illustrates an example of the usage method of the key generator related to the present invention.

FIG. 45 illustrates another example to adopt an RSA-type key generator. Each logical node includes an identification core 10000 and a transaction unit 20000. The identification core includes an RSA-type key generator. The key generator generates a unique pair of private key and public key from a hash value included in the transaction unit. The public key is forwarded to the transaction unit 20000 and the private key is confined within the identification core 10000 or deleted after being used as necessary. The public key serves as a logical address of a respectively corresponding logical node. In the transaction unit 20000, an electronic signature is generated by encrypting the hash value and the public key with the private key of the logical node having forwarded the hash value. Thus, the transaction unit 20000 includes the hash value, the public key, and the electronic signature.

Figure 46:
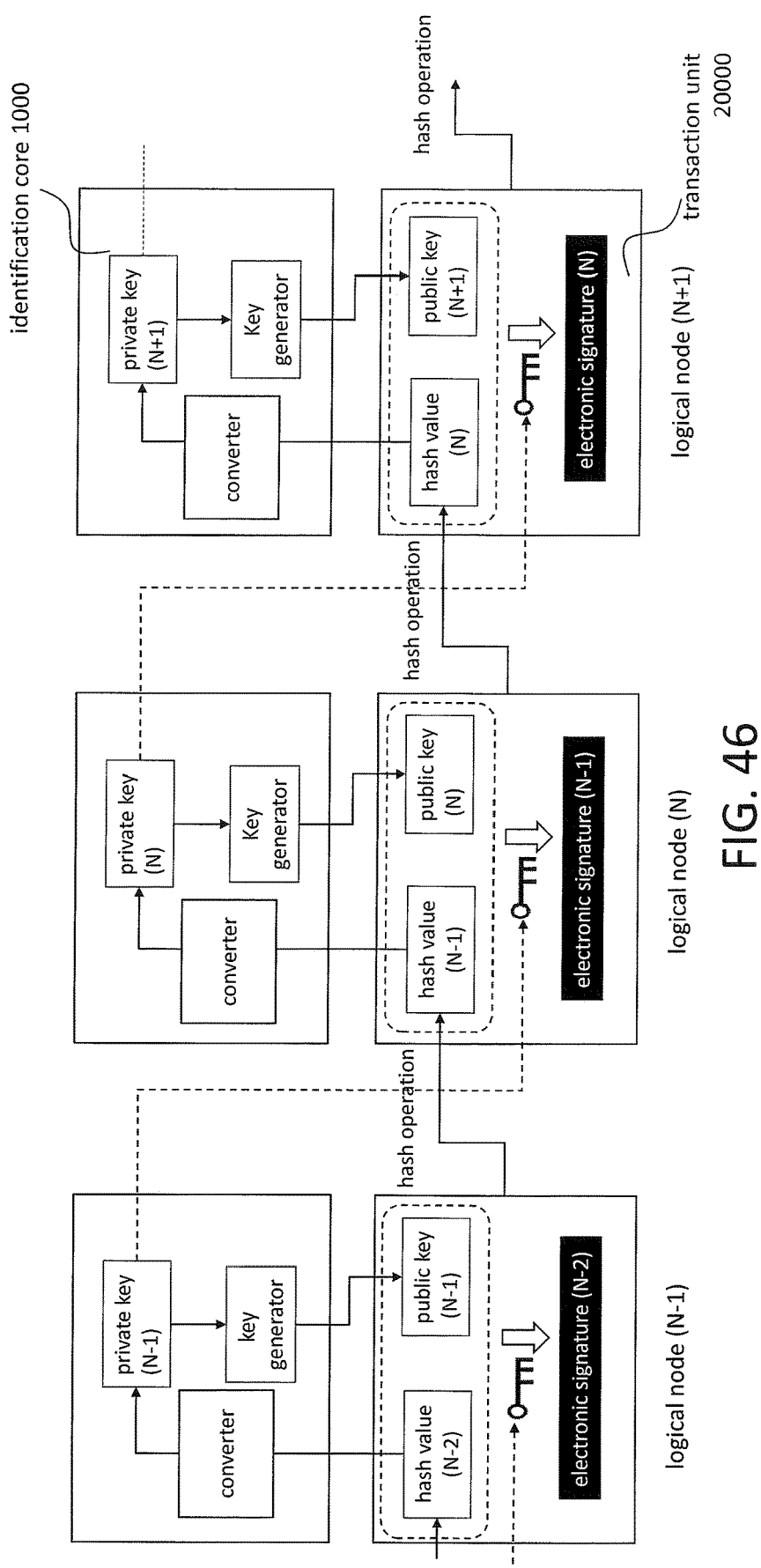
FIG. 46 illustrates an example of the usage method of the key generator related to the present invention.

FIG. 46 illustrates another example to adopt an ElGamal-type key generator. Each logical node includes an identification core and a transaction unit 20000. The identification core 20000 includes an ElGamal-type key generator and a converter. The converter generates a private key from a hash value included in the transaction unit to confine the private key within the identification core. Or the private key may be deleted after being used as necessary. The key generator generates a public key from the private key to forward the public key to the transaction unit 20000. The public key serves as a logical address of a respectively corresponding logical node. In the transaction unit 20000, an electronic signature is generated by encrypting the hash value and the public key with the private key of the logical node having forwarded the hash value. Thus, the transaction unit 20000 includes the hash value, the public key, and the electronic signature.

In the present embodiment, any physical address is unnecessary to be prepared. Instead, when a logical node is initially registered or re-registered to the network, a unique pair of private key and public key may be generated with a temporal hash value. After that the hash value is changed every time the information is exchanged among the logical nodes. However, once the unique pair of private key and public key is generated, the changing of the hash value may be approved. In addition, it may be possible for the re-registration to revise the configuration of the network anytime. It may be convenient to form a closed network as necessary. In other words, only the registered logical nodes survey each other with block chain such that a closed network is configured as necessary.

Thus, a unique pair of private key and public key may be generated from a physical address or a hash value to be allocated to a chip with some kind of method. The public key may serve as a logical address in the network and the private key may be confined within the identification code 10000 or disposed after being used as necessary. By this way, the identification core 10000 of the present invention organically links a semiconductor chip (hardware) to be a physical substance and the logical network (software).

Furthermore, it may become possible for an identification core to organically incorporate hardware and a kind of public ledger system represented by block chain together with an electronic signature technology. As a result, it can effectively improve the security and the reliability of the network system.

There are a plurality of concrete algorithms in both types of RSA and ElGamal. Among them, the DSA method and its revised version (ECDSA) are extensively used in today's electronic signature. Other than these, there are many and various methods such as: the Schnorr method, the random-oracle method, the Cramer-Shoup method and so forth. It is, however, practically difficult for those methods to generate a private key from a public key. It is impossible to prove it in terms of mathematics but it can be regarded as being difficult to execute it practically. Additionally, it is a common property in those methods to generate an electronic signature by encrypting a hash value and so forth with a private key. Difference in those methods is to generate a public key from a private key or to generate a pair of public key and private key from a different variable. Or, there may be an arithmic (arithemtical) difference to be used for the conversion among them. For example, it may be to adopt the factorization in prime numbers, the discrete logarithm problem, the random oracle assumption, the elliptic curve problem and so forth.

On the other hand, the identification controller related to the present invention can serve as the controller of the memory cell array of the memory chip to be adopted as the whole or a part of the identification device as well.

Furthermore, the scope of the technology of the present invention may not be limited to the above-mentioned embodiments. Without surpassing the aim or concept of the present invention, various revisions may be able to be added.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. An authenticated network comprising:
a plurality of nodes, wherein each of the plurality of nodes comprises a transaction unit and an identification core, wherein the identification core comprises a key generator, wherein the key generators of the identification cores of the plurality of nodes generate a plurality of unique pairs of secret and public keys, wherein the public key serves as a logical address of the transaction unit, wherein the transaction unit manages information communication among the plurality of nodes, wherein the identification core manages an authentication of the plurality of nodes,
wherein the identification core further includes an identification device, wherein the identification device has a physical address, and
wherein the physical address and the logical address are associated with each other to form an identification address based on the unique pair of the private key and the public key.
2. The authenticated network as claimed in claim 1, wherein the transaction unit further includes a hash value, and wherein the key generator generates the secret and public keys from the hash value.

3. The authenticated network as claimed in claim 1, wherein the identification device further includes a code converter generating a variable from the physical address, and wherein the variable is input to the key generator.
4. The authenticated network as claimed in claim 3, wherein the code converter is executed to comprise:
a compound step configured to compound the physical address and a given number; and
a judge step configured to judge if a number given in the compound step is a prime number,
wherein the compound step and the judge step are repeated until the number given in the compound step is determined to be the prime number.
5. The authenticated network as claimed in claim 3, wherein an external input is input to the identification device from an exterior of the identification core, wherein the code converter generates a variable from the external input and the physical address, and wherein the variable input to the key generator.
6. The authenticated network as claimed in claim 3, wherein an internal input is input to the identification device from a different part in an interior of the identification core, wherein the code converter generates a variable from the internal input and the physical address, and wherein the variable is input to the key generator.
7. The authenticated network as claimed in claim 1, wherein the physical addresses of the identification devices of the identification cores of the plurality of nodes are code information to be respectively allocated to the plurality of nodes and recorded in a non-volatile memory which is an accessory of the identification core.
8. The authenticated network as claimed in claim 1, wherein the physical address is generated from a semiconductor chip composing the identification core with a given procedure.
9. The authenticated network claimed in claim 8, wherein the semiconductor chip includes a cell array, wherein the cell array comprises a plurality of identification cells respectively distributed on a plurality of addresses, wherein a part of the plurality of identification cells are fail bits exhibiting characteristics deviating more than a designed range, regardless whether the fail bits are generated artificially or non-artificially, and wherein the physical address is generated from a batch of the addresses of the fail bits that are distributed on the cell array.
10. The authenticated network as claimed in claim 1, wherein the plurality of nodes comprises a first node and a second node, wherein the plurality of unique pairs of secret and public keys comprises a first private key and a first public key corresponding to the first node, as well as a second private key and a second public key corresponding to the second node, wherein the transaction unit of the first node configures the first public key, a first hash value, and a first electronic signature, wherein the transaction unit of the second node configures the second public key, a second hash value, and a second electronic signature, wherein the identification core of the first node comprises a first physical address, the first private key, and a first one of the key generators, wherein the identification core of the second node comprises a second physical address, the second private key, and a second one of the key generators, wherein the second hash value is generated by hashing the transaction unit of the first node, and a part of information forwarded from the first node to the second node, wherein the second electronic signature is generated by encrypting the second hash value and the second public key with the first private key, and another part of the information that is forwarded together with the second hash value from the first node to the second node, wherein the first one of the key generators generates a first one of the plurality of unique pairs of secret and public keys from the first physical address, and wherein the second one of the key generators generates a second one of the plurality of unique pairs of secret and public keys from the second physical address.

11. An authenticated network comprising:
a plurality of nodes, wherein each of the plurality of nodes comprises a transaction unit and an identification core, wherein the identification core comprises a key generator and a private key, wherein the key generators of the identification cores of the plurality of nodes generate a plurality of public keys from the private keys of the identification cores of the plurality of nodes, wherein each of the plurality of public keys serves as a logical address of the transaction unit of a corresponding one of the plurality of nodes, wherein one of the plurality of public keys and one of the private keys form a unique pair, wherein the transaction unit manages information communication among the plurality of nodes, wherein the identification core manages an authentication of the plurality of nodes,
wherein the identification core further comprises an identification device having a physical address and a code converter, wherein the code converter generates the private key from the physical address, and wherein the physical address and the logical address are associated with each other to form an identification address.

12. The authenticated network as claimed in claim 11, wherein the identification core further comprises a converter, wherein the transaction unit further comprises a hash value, and where the converter generates the private key from the hash value.

13. The authenticated network as claimed in claim 11, wherein the code converter is executed to comprise:
a compound step configured to compound the physical address and a given number; and
a judge step configured to judge if a number given in the compound step is a prime number,
wherein the compound step and the judge step are repeated until the number given in the compound step is determined to be the prime number.

14. The authenticated network as claimed in claim 13, wherein the private key is a remainder obtained by dividing a number, which is generated by subtracting 1 from the prime number, by the physical address.

15. The authenticated network as claimed in claim 11, wherein the physical addresses of the identification devices of the identification cores of the plurality of nodes are code information to be respectively allocated to the plurality of nodes and recoded in a non-volatile memory which is an accessory of the said identification core.

16. The authenticated network as claimed in claim 11, wherein an external input is input to the identification device from an exterior of the identification core, wherein the code converter generates a variable from the external input and the physical address, and wherein the variable is input to the key generator.

17. The authenticated network as claimed in claim 11, wherein an internal input is input to the identification device from a different part in an interior of the identification core, wherein the code converter generates a variable from the internal input and the physical address, and wherein the variable is input to the key generator.

18. The authenticated network as claimed in claim 12, wherein the physical address is generated from a semiconductor chip composing the identification core with a given procedure.

19. The authenticated network as claimed in claim 18, wherein the semiconductor chip includes a cell array, wherein the cell array comprises a plurality of identification cells respectively distributed on a plurality of addresses, wherein a part of the plurality of identification cells are fail bits exhibiting characteristics deviating more than a designed range, regardless whether the fail bits are generated artificially or non-artificially, and wherein the physical address is generated from a batch of the addresses of the fail bits that are distributed on the cell array.

20. The authenticated network as claimed in claim 11, wherein the plurality of nodes comprises a first node and a second node, wherein the plurality of public keys comprises a first public key corresponding to the first node, as well as a second public key corresponding to the second node, wherein the transaction unit of the first node configures the first public key, a first hash value, and a first electronic signature, wherein the transaction unit of the second node configures the second public key, a second hash value, and a second electronic signature, wherein the identification core of the first node comprises a first physical address, a first private key, and a first one of the key generators, wherein the identification core of the second node comprises a second physical address, a second private key, and a second one of the key generators, wherein the second hash value is generated by hashing the transaction unit of the first node, and a part of information forwarded from the first node to the second node, wherein the second electronic signature is generated by encrypting the second hash value and the second public key with the first private key, and another part of the information that is forwarded together with the second hash value from the first node to the second node, wherein the first one of the key generators generates the first public key from the first private key, wherein the second one of the key generators generates the second public key from the second private key, wherein the first private key and the first public key form the unique pair, wherein the second private key and the second public key form another unique pair, wherein the first private key is generated from the first physical address, and wherein the second private key is generated from the second physical address.

* * * * *